United States Patent
Jin et al.

(10) Patent No.: US 11,985,538 B2
(45) Date of Patent: *May 14, 2024

(54) METHOD AND APPARATUS FOR CLASSIFYING AND PROCESSING SDAP CONTROL PDU IN NEXT GENERATION MOBILE COMMUNICATION SYSTEM

(71) Applicant: Samsung Electronics Co., Ltd., Suwon-si (KR)

(72) Inventors: Seungri Jin, Suwon-si (KR); Soenghun Kim, Suwon-si (KR); Sangyeob Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/316,976

(22) Filed: May 12, 2023

(65) Prior Publication Data

US 2023/0284080 A1 Sep. 7, 2023

Related U.S. Application Data

(63) Continuation of application No. 17/532,847, filed on Nov. 22, 2021, now Pat. No. 11,653,254, which is a
(Continued)

(30) Foreign Application Priority Data

May 21, 2018 (KR) .................. 10-2018-0057803

(51) Int. Cl.
H04W 28/02 (2009.01)
H04L 45/74 (2022.01)
(Continued)

(52) U.S. Cl.
CPC ......... *H04W 28/0268* (2013.01); *H04L 45/74* (2013.01); *H04L 69/04* (2013.01); *H04W 28/10* (2013.01)

(58) Field of Classification Search
CPC .... H04W 12/741; H04W 28/02; H04W 76/10
See application file for complete search history.

(56) References Cited

U.S. PATENT DOCUMENTS

2011/0188408 A1 8/2011 Yi et al.
2018/0083688 A1 3/2018 Agiwal et al.
(Continued)

FOREIGN PATENT DOCUMENTS

EP 3682673 A1 7/2020
KR 101831448 B1 2/2018
(Continued)

OTHER PUBLICATIONS

ISA/KR, International Search Report and Written Opinion of the International Searching Authority, International Application No. PCT/KR2019/005538, Aug. 14, 2019, 9 pages.
(Continued)

*Primary Examiner* — Sulaiman Nooristany

(57) ABSTRACT

Disclosed are a communication scheme and a system thereof for converging an IoT technology and a 5G communication system for supporting a high data transmission rate beyond that of a 4G system. The disclosure can be applied to intelligent services (for example, services related to a smart home, smart building, smart city, smart car, connected car, health care digital education, retail business, security, and safety) based on the 5G communication technology and the IoT-related technology. Disclosed are a method and an apparatus for supporting a multimedia telephony (MMTEL) system, a method and an apparatus for efficiently operating a new QoS layer (service data access protocol (SDAP)), and a method and an apparatus for efficiently supporting a
(Continued)

bandwidth part in the SCell in carrier aggregation or in dual connectivity.

20 Claims, 40 Drawing Sheets

Related U.S. Application Data continuation of application No. 16/755,467, filed as application No. PCT/KR2019/005538 on May 9, 2019, now Pat. No. 11,184,792.

(51) Int. Cl.
*H04L 69/04* (2022.01)
*H04W 28/10* (2009.01)

(56) References Cited

U.S. PATENT DOCUMENTS

| | | | |
|---|---|---|---|
| 2018/0227793 A1 | 8/2018 | Kim et al. | |
| 2019/0116483 A1 | 4/2019 | Ryu et al. | |
| 2019/0364541 A1 | 11/2019 | Ryu | |
| 2020/0169916 A1* | 5/2020 | Gholmieh | H04W 12/106 |
| 2020/0245184 A1* | 7/2020 | Jin | H04W 28/22 |

FOREIGN PATENT DOCUMENTS

| | | |
|---|---|---|
| KR | 10-2018-0091548 A | 8/2018 |
| KR | 10-2019-0085454 A | 7/2019 |
| WO | 2017/164679 A1 | 9/2017 |
| WO | 2018008980 A1 | 1/2018 |

OTHER PUBLICATIONS

3GPP TS 38.323 V15.1.0 (Mar. 2018), Technical Specification, 3rd Generation Partnership Project; Technical Specification Group Radio Access Network; NR; Packet Data Convergence Protocol (PDCP) specification (Release 15), Mar. 2018, 25 pages.
Huawei, et al., "End Marker Procedures," R2-1807180, 3GPP TSG-RAN WG2 Meeting#102, Busan, South Korea, May 21-25, 2018, 2 pages.
LG Electronics Inc., "SDAP Control PDU for end marker," R2-1808543, 3GPP TSG-RAN WG2 #102, Busan, South Korea, May 21-25, 2018, 2 pages.
Qualcomm Incorporated, "SDAP end marker PDU," R2-1808173, 3GPP TSG-RAN WG2 Meeting #102, Busan, South Korea, May 21-25, 2018, 2 pages.
Supplementary European Search Report dated Mar. 4, 2021 in connection with European Patent Application No. EP 19 80 7225, 5 pages.
Huawei (Email discussion Rapporteur), "Email discussion of [101bis#76][UP] SDAP end marker solutions", 3GPP TSG RAN WG2 Meeting #102, May 21-25, 2018, R2-1807179, 16 pages.
Office Action dated Jul. 21, 2022 in connection with India Patent Application No. 202037043842, 7 pages.
The First Office Action dated Sep. 13, 2023, in connection with Chinese Application No. 201980034327.1, 13 pages.
Decision of Patent dated Jun. 26, 2023, in connection with Korean Application No. 10-2018-0057803, 10 pages.
3GPP TS 38.331 V15.1.0 (Mar. 2018), Technical Specification, 3rd Generation Partnership Project; Technical Specification Group Radio Access Network; NR; Radio Resource Control (RRC) protocol specification (Release 15), Mar. 2018, 268 pages.
Huawei, et al., "UL SDAP Header Format," R2-1807178, 3GPP TSG-RAN WG2 Meeting#102, Busan, Korea, May 21-25, 2018, 5 pages.
Decision of Patent issued Jan. 12, 2024, in connection with Korean Patent Application No. 10-2018-0057803, 9 pages.
Huawei et al., "Cause values for NGAP," 3GPP TSG-RAN WG3#99 meeting, R3-181558, Athens, Greece, Feb. 26-Mar. 2, 2018, 10 pages.
Huawei, "UE History Information introduction NG," 3GPP TSG-RAN3 Meeting #100, R3-183263, Busan, Korea, May 2018, 57 pages.
Huawei et al., "Summary of email discussion [NR-AH1#13][NR] UL data in Inactive," 3GPP TSG-RAN WG2 #97 R2-1701125, Athens, Greece, Feb. 2017, 50 pages.
Nokia et al., "SDAP header," 3GPP TSG-RAN WG2 Meeting #97bis R2-1702644, Spokane, USA, Apr. 2017, 2 pages.

\* cited by examiner

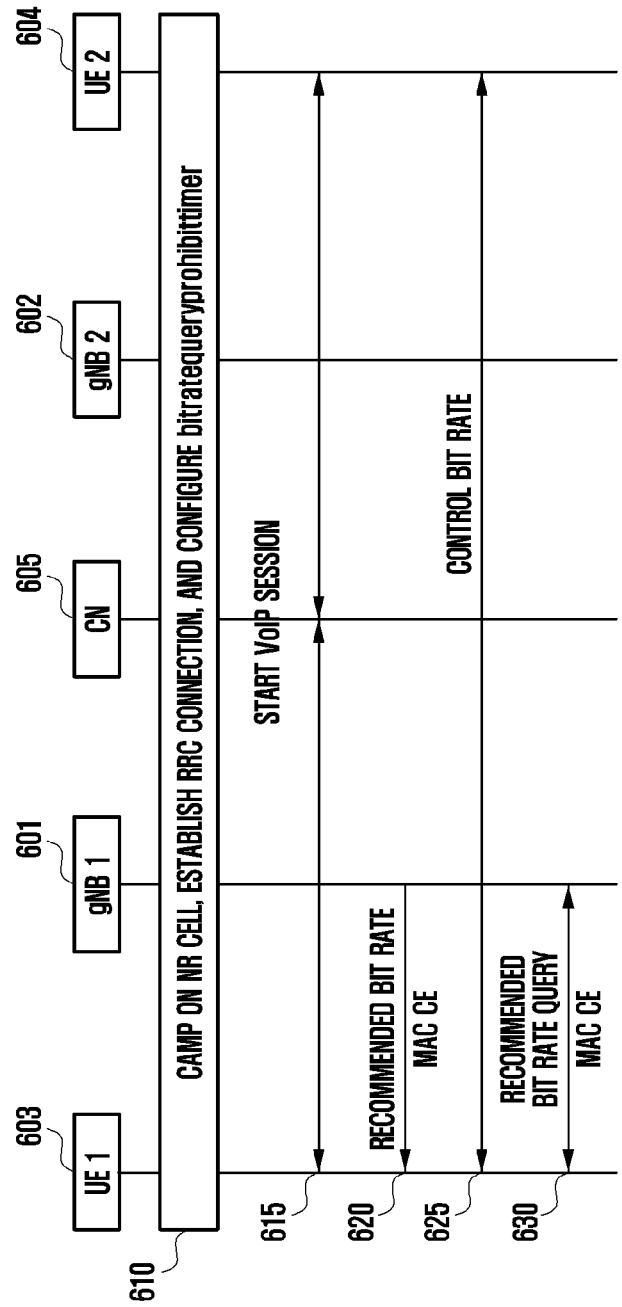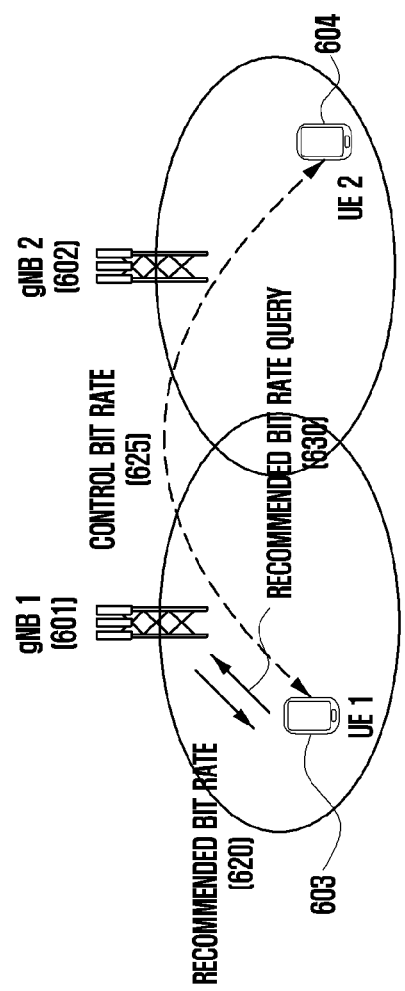
FIG. 6

FIG. 7
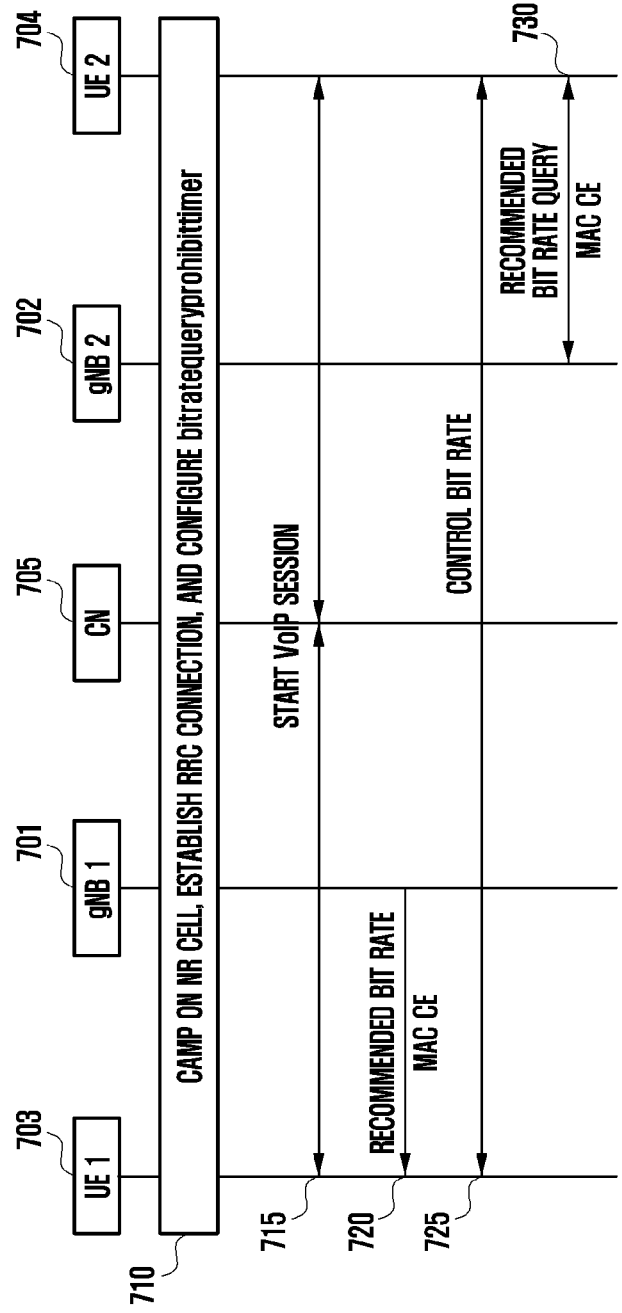
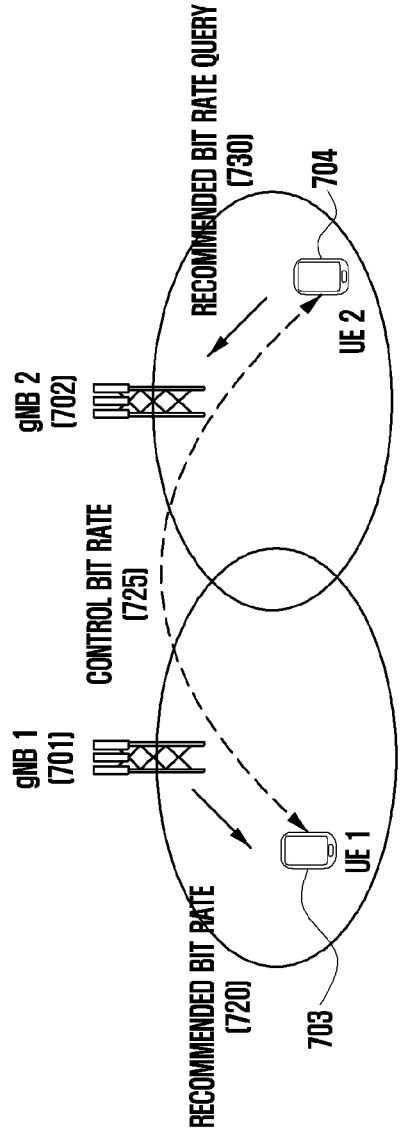

FIG. 19
SDAP CONTROL PDU
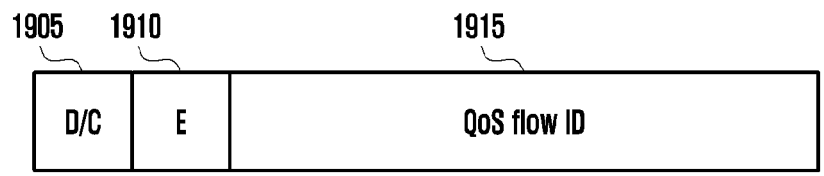
(a) Type 1
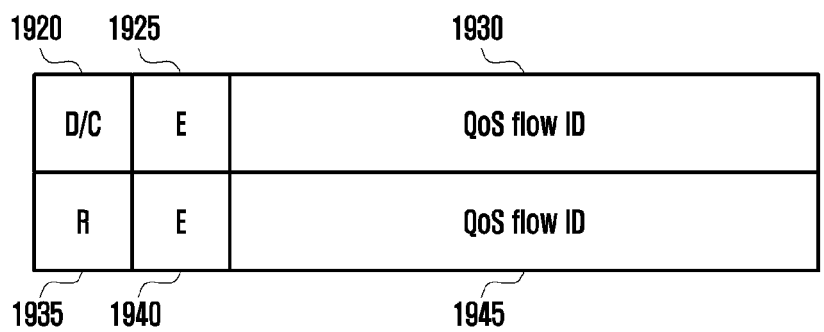
(b) Type 2

METHOD AND APPARATUS FOR CLASSIFYING AND PROCESSING SDAP CONTROL PDU IN NEXT GENERATION MOBILE COMMUNICATION SYSTEM

CROSS-REFERENCE TO RELATED APPLICATIONS

This application is a continuation of application Ser. No. 17/532,847, filed Nov. 22, 2021, which is a continuation of application Ser. No. 16/755,467, now U.S. Pat. No. 11,184,792, which is the 371 National Stage of International Application No. PCT/KR2019/005538, filed May 9, 2019, which claims priority to Korean Patent Application No. 10-2018-0057803, filed May 21, 2018, the disclosures of which are herein incorporated by reference in their entirety.

BACKGROUND

1. Field

The disclosure relates to a mobile communication system and, more particularly, to UE and BS operation in a mobile communication system.

2. Description of Related Art

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post LTE system. In order to achieve a high data transmission rate, an implementation of the 5G communication system in a mmWave band (for example, 60 GHz band) is being considered. In the 5G communication system, technologies such as beamforming, massive MIMO, Full Dimensional MIMO (FD-MIMO), array antenna, analog beam-forming, and large scale antenna are being discussed as means to mitigate a propagation path loss in the mm Wave band and increase a propagation transmission distance. Further, the 5G communication system has developed technologies such as an evolved small cell, an advanced small cell, a cloud Radio Access Network (RAN), an ultra-dense network, Device to Device communication (D2D), a wireless backhaul, a moving network, cooperative communication, Coordinated Multi-Points (CoMP), and received interference cancellation to improve the system network. In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Meanwhile, the Internet has been evolved to an Internet of Things (IoT) network in which distributed components such as objects exchange and process information from a human-oriented connection network in which humans generate and consume information. An Internet of Everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, Machine-to-Machine (M2M) communication, Machine-Type Communication (MTC), and the like for connection between objects has recently been conducted. In an IoT environment, through collection and analysis of data generated in connected objects, an intelligent Internet Technology (IT) service to create a new value for peoples' lives may be provided. The IoT may be applied to fields, such as a smart home, smart building, smart city, smart car, connected car, smart grid, health care, smart home appliance, or high-tech medical service, through the convergence of the conventional Information Technology (IT) and various industries.

Accordingly, various attempts to apply the 5G communication to the IoT network are made. For example, the 5G communication technology, such as a sensor network, machine-to-machine (M2M) communication, and machine-type communication (MTC), has been implemented by a technique, such as beamforming, MIMO, and array antennas. The application of a cloud RAN as the big data processing technology may be an example of convergence of the 5G technology and the IoT technology.

Unlike in the conventional communication system, in the 5G communication system, a service data access protocol (SDAP) that is a new layer has been introduced, multimedia telephony (MMTEL) using the 5G communication system may be supported, and communication between a UE and an eNB using a bandwidth part (BWP) may be performed.

SUMMARY

The disclosure proposes a method of transmitting and receiving a MAC CE for codec adaptation in order to effectively support a multimedia telephony (MMTEL) system in a next-generation mobile communication system.

The disclosure proposes a method of configuring, processing, and transmitting/receiving an SDAP control PDU for effectively supporting the dynamic mapping relationship between QoS flow and a DRB in a next-generation mobile communication system.

The disclosure proposes a BWP configuration method of the UE according to a state of a secondary cell (SCell) configured in the UE and operations of the eNB and the UE in a BWP according to the configuration in a next-generation mobile communication system.

In accordance with an aspect of the disclosure, a method of transmitting a signal by a transmitter in a wireless communication system is provided. The method includes: generating a service data access protocol (SDAP) control protocol data unit (PDU); when integrity protection is configured, calculating message authentication code-integrity (MAC-I) on the basis of the SDAP control PDU; concatenating the MAC-I with the SDAP control PDU; concatenating a packet data convergence protocol (PDCP) header with the SDAP control PDU; and transmitting the SDAP control PDU with which the PDCP header and the MAC-I are concatenated to a receiver, wherein the SDAP control PDU includes a QoS flow ID (QFI) and indicates that a mapping relationship between a QoS flow indicated by the QFI and a data radio bearer (DRB) for transmitting the SDAP control PDU ends.

The SDAP control PDU may include information indicating a format of an SDAP PDU and the QFI, and have a size of 1 byte. Ciphering and header compression do not applied to the SDAP control PDU, and the SDAP control PDU may be generated when a set mapping relation between a QoS flow and a DRB is different from a stored mapping relation between a QoS flow and a DRB.

In accordance with another aspect of the disclosure, a method of receiving a signal by a receiver in a wireless communication system is provided. The method includes: receiving a packet including a service data access protocol (SDAP) control protocol data unit (PDU) from a transmitter; removing a packet data convergence protocol (PDCP) header from the packet; calculating MAC-I (X-MAC) on the basis of the SDAP control PDU; and when the X-MAC corresponds to MAC-I included in the packet, identifying that integrity protection is successful, wherein the SDAP control PDU includes a QoS flow ID (QFI) and indicates that a mapping relationship between a QoS flow indicated by the QFI and a data radio bearer (DRB) for transmitting the SDAP control PDU ends.

In accordance with another aspect of the disclosure, a transmitter in a wireless communication system is provided. The transmitter includes: a transceiver; and a controller configured to perform control to generate a service data access protocol (SDAP) control protocol data unit (PDU), when integrity protection is configured, calculate message authentication code-integrity (MAC-I) on the basis of the SDAP control PDU, concatenate the MAC-I with the SDAP control PDU, concatenate a packet data convergence protocol (PDCP) header with the SDAP control PDU, and transmit the SDAP control PDU with which the PDCP header and the MAC-I are concatenated to a receiver, the controller being connected to the transceiver, wherein the SDAP control PDU includes a QoS flow ID (QFI) and indicates that a mapping relationship between a QoS flow indicated by the QFI and a data radio bearer (DRB) for transmitting the SDAP control PDU ends.

In accordance with another aspect of the disclosure, a method of receiving a signal by a receiver in a wireless communication system is provided. The receiver includes: a transceiver; and a controller configured to perform control to receive a packet comprising a service data access protocol (SDAP) control protocol data unit (PDU) from a transmitter, remove a packet data convergence protocol (PDCP) header from the packet, calculate MAC-I (X-MAC) on the basis of the SDAP control PDU, and when the X-MAC corresponds to MAC-I included in the packet, identify that integrity protection is successful, the controller being connected to the transceiver, wherein the SDAP control PDU includes a QoS flow ID (QFI) and indicates that a mapping relationship between a QoS flow indicated by the QFI and a data radio bearer (DRB) for transmitting the SDAP control PDU ends.

The disclosure can provide a method by which the UE efficiently transmits and receives a recommended bit rate MAC CE in uplink and downlink, so that the eNB and the UE can embody an operation of transmitting a voice and a video to an Internet protocol and controlling a data rate, thereby providing clarity of implementation.

Further, it is possible to support a flow-based QoS through a wireless interface in a next-generation mobile communication system and guarantee an in-order delivery when a QoS flow is transmitted through a new data radio bearer (DRB) via an SDAP control PDU in uplink transmission. A detailed UE operation due to introduction of the SDAP control PDU is defined and a UE implementation operation is defined.

The disclosure can support an operation according to a BWP in the SCell in a dormant state in the next-generation mobile communication system, so the eNB can rapidly configure carrier aggregation or dual connectivity and the eNB and the UE can manage the SCell without any signaling overhead, and thus a larger amount of data can be effectively serviced to the UE.

BRIEF DESCRIPTION OF THE DRAWINGS

FIG. 6 illustrates embodiment 1-1 to which the disclosure is applied;

FIG. 7 illustrates embodiment 1-2 to which the disclosure is applied;

FIG. 19 illustrates a structure of the SDAP control PDU applied to the disclosure;

DETAILED DESCRIPTION

Figure 1:
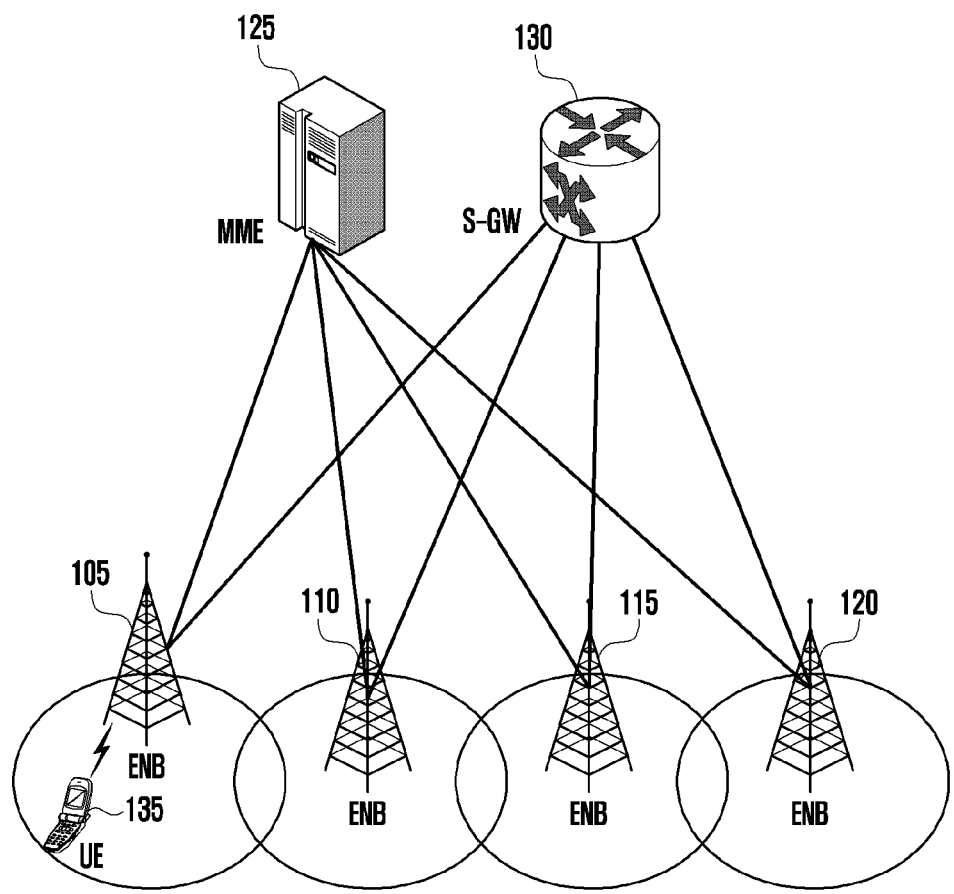
FIG. 1 illustrates a structure of an LTE system for a technology according to the disclosure.

Hereinafter, the operating principle of the disclosure will be described in detail with reference to the accompanying drawings. In describing the disclosure below, a detailed description of related known configurations or functions incorporated herein will be omitted when it is determined that the detailed description thereof may unnecessarily obscure the subject matter of the disclosure. The terms which will be described below are terms defined in consideration of the functions in the disclosure, and may be different according to users, intentions of the users, or customs. Therefore, the definitions of the terms should be made based on the contents throughout the specification. In the following description, terms for identifying an access node, terms referring to network entities, terms referring to messages, terms referring to interfaces between network entities, and terms referring to various pieces of identification information are used for convenience of description. Therefore, the disclosure may not be limited by the terminologies provided below, and other terms that indicate subjects having equivalent technical meanings may be used.

For convenience of description, the disclosure uses terms and names defined in a 3rd-generation partnership project long-term evolution (3GPP LTE) standard and new radio (NR) or terms and names changed on the basis thereof. However, the disclosure is not limited to the terms and names, and may be equally applied to a system following another standard.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card. Also, in an embodiment, the '~ unit' may include one or more processors.

Embodiment 1

FIG. 1 illustrates a structure of an LTE system for a technology according to the disclosure.

Referring to FIG. 1, a radio access network of the LTE system includes next-generation Evolved Node Bs 105, 110, 115 and 120 (hereinafter, referred to as eNBs, Node Bs, or base stations), an Mobility Management Entity (MME) 125, and a Serving-Gateway (S-GW) 130. A User Equipment 135 (hereinafter, referred to as a UE or a terminal) accesses an external network through the eNBs 105, 110, 115, and 120 and the S-GW 130.

In FIG. 1, the eNBs 105, 110, 115, and 120 correspond to the existing node Bs of the UMTS system. The eNB is connected with the UE 135 through a radio channel, and performs a more complicated role than the conventional node B. In the LTE system, since all user traffic including a real-time service such as a voice over IP (VoIP) through an Internet protocol are serviced through a shared channel, a device for collecting and scheduling status information of buffer statuses, available transmission power statuses, and channel statuses of UEs is required, and the eNBs 105, 110, 115, and 120 serve as this device.

One eNB generally controls a plurality of cells. For example, in order to implement a transmission rate of 100 Mbps, the LTE system uses orthogonal frequency division multiplexing (OFDM) as the radio access technology in a bandwidth of 20 MHz. Further, an adaptive modulation and coding (hereinafter, referred to as an AMC) scheme of determining a modulation scheme and a channel coding rate in accordance with the channel status of the UE is applied. The S-GW 130 is a device for providing a data bearer, and generates or removes the data bearer under a control of the MME 125. The MME is a device for performing various control functions as well as a function of managing mobility of the UE and is connected to a plurality of eNBs.

Figure 2:
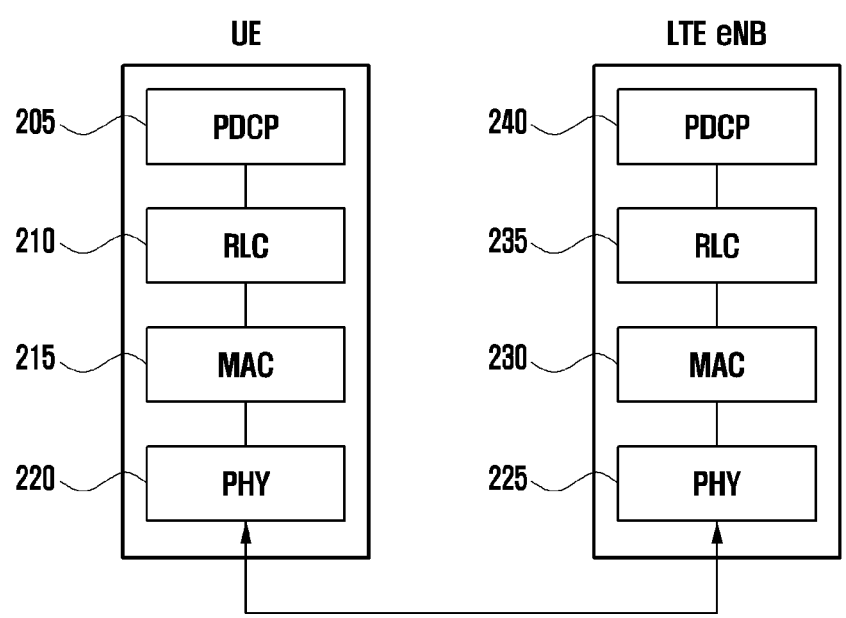
FIG. 2 illustrates a wireless protocol structure in the LTE system for the technology according to the disclosure.

FIG. 2 illustrates a wireless protocol structure in an LTE system for the technology according to the disclosure.

Referring to FIG. 2, the UE and the eNB include packet data convergence protocols (PDCPs) 205 and 240, radio link controls (RLCs) 210 and 235, medium access controls (MACs) 215 and 230, respectively, in the wireless protocol of the LTE system.

The PDCPs 205 and 240 perform an operation such as compressing and decompressing an IP header. Main functions of the PDCP are described below.

- Header compression and decompression function ((Header compression and decompression: ROHC only)
- User data transmission function (Transfer of user data)
- Sequential delivery function (in-sequence delivery of upper layer packet data units (PDUs) at PDCP re-establishment procedure for RLC acknowledge mode (AM))
- Reordering function (For split bearers in dual connectivity (DC) (only support for RLC AM): PDCP PDU routing for transmission and PDCP PDU reordering for reception)
- Duplicate detection function (duplicate detection of lower layer Service Data Units (SDUs) at PDCP re-establishment procedure for RLC AM)
- Retransmission function (Retransmission of PDCP SDUs at handover and, for split bearers in DC, of PDCP PDUs at PDCP data-recovery procedure, for RLC AM)
- Ciphering and deciphering function (Ciphering and deciphering)
- Timer-based SDU removal function (Timer-based SDU discard in uplink)

The RLCs 210 and 235 reconfigure the PDCP PDU to be a proper size and perform an automatic repeat request (ARQ) function. Main functions of the RLC are described below.

- Data transmission function (Transfer of upper layer PDUs)
- ARQ function (Error Correction through ARQ (only for AM data transfer))
- Concatenation, segmentation, and reassembly function (concatenation, segmentation, and reassembly of RLC SDUs (only for unacknowledged mode (UM) and AM data transfer))
- Re-segmentation function (Re-segmentation of RLC data PDUs (only for AM data transfer))
- Reordering function (Reordering of RLC data PDUs (only for UM and AM data transfer)
- Duplication detection function (only for UM and AM data transfer))
- Error detection function (Protocol error detection (only for AM data transfer))
- RLC SDU deletion function (RLC SDU discard (only for UM and AM data transfer))
- RLC re-establishment function (RLC re-establishment)

The MACs 215 and 230 are connected with various RLC layer entities configured in one UE, and perform a multiplexing of RLC PDUs to MAC PDU and a demultiplexing of the RLC PDUs from the MAC PDU. Main functions of the MAC are described below.

- Mapping function (Mapping between logical channels and transport channels)
- Multiplexing and demultiplexing function (multiplexing/demultiplexing of MAC SDUs belonging to one or different logical channels into/from Transport Blocks (TB) delivered to/from the physical layer on transport channels)
- Scheduling information report function (scheduling information reporting)
- HARQ function (Error correction through HARQ)
- Logical channel priority control function (Priority handling between logical channels of one UE)
- UE priority control function (Priority handling between UEs by means of dynamic scheduling)
- MBMS service identification function (MBMS service identification)
- Transport format selection function (Transport format selection)
- Padding function (Padding)

The physical layers 220 and 225 perform an operation of channel-coding and modulating higher layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Figure 3:
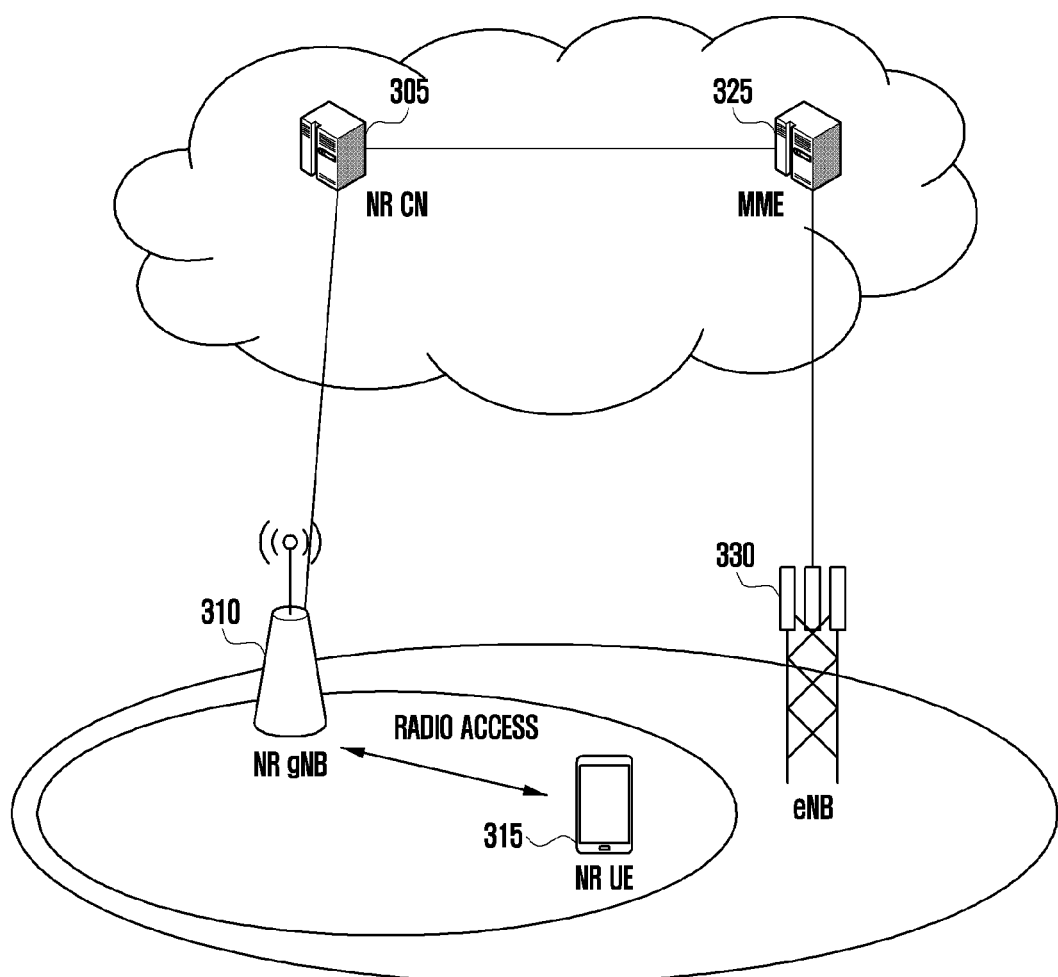
FIG. 3 illustrates a structure of a next-generation mobile communication system to which the disclosure is applied.

FIG. 3 illustrates a structure of an LTE system to which the disclosure is applied.

Referring to FIG. 3, a radio access network of the next-generation mobile communication system includes a next-generation base station 310 (hereinafter, referred to as a new radio node B (NR NB) or NR gNB) and a new radio core network (NR CN) 305. A user terminal 315 (hereinafter, referred to as a new radio user equipment (NR UE) or a terminal) accesses an external network through the NR gNB 310 and the NR CN 305.

The NR gNB 310 of FIG. 3 corresponds to an evolved Node B (eNB) in a conventional LTE system. The NR gNB may be connected to the NR UE 315 through a radio channel and may provide better service than the conventional node B. Since all user traffic is served through a shared channel in the next-generation mobile communication system, a device for collecting and scheduling status information of buffer statuses, available transmission power statuses, and channel statuses of UEs is required, which corresponds to the NR gNB 310.

One NR gNB generally controls a plurality of cells. The NR system may have a bandwidth wider than or equal to the conventional maximum bandwidth in order to implement a super-high data transmission compared to the conventional LTE system and a beamforming technology may be additionally grafted thereon through the radio access technology as an OFDM scheme. The NR gNB applies an adaptive modulation and coding scheme for determining a modulation scheme and a channel coding rate in accordance with a channel state of the UE. The NR CN 305 performs a function of supporting mobility, configuring a bearer, and configuring QoS. The NR CN is a device which performs not only a function of managing mobility of the UE but also various control functions and is connected to a plurality of eNBs. Further, the next-generation mobile communication system may be linked to the conventional LTE system, and the NR CN is connected to an MME 325 through a network interface. The MME is connected to an eNB 330, which is a conventional base station.

Figure 4:
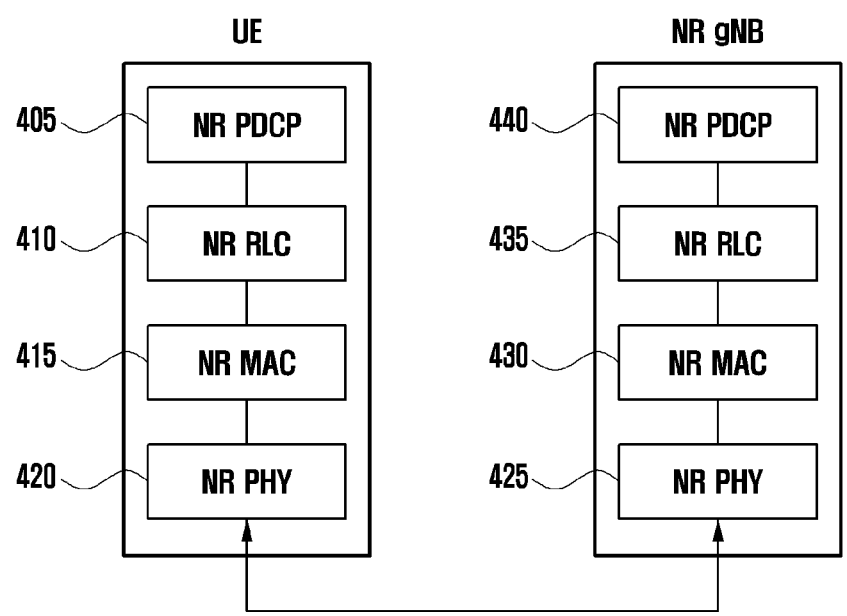
FIG. 4 illustrates a wireless protocol structure in the next-generation mobile communication system to which the disclosure can be applied.

FIG. 4 illustrates a wireless protocol structure in the next-generation mobile communication system to which the disclosure can be applied.

Referring to FIG. 4, the UE and the NR gNB include NR PDCPs 405 and 440, NR RLCs 410 and 435, and NR MACs 415 and 430, respectively, in the wireless protocol of the next-generation mobile communication system.

The main function of the NR PDCPs 405 and 440 may include some of the following functions.
- Header compression and decompression function ((Header compression and decompression: ROHC only)
- User data transmission function (Transfer of user data)
- Sequential delivery function (In-sequence delivery of upper layer PDUs)
- Reordering function (PDCP PDU reordering for reception)
- Duplicate detection function (Duplicate detection of lower layer SDUs)
- Retransmission function (Retransmission of PDCP SDUs)
- Ciphering and deciphering function (Ciphering and deciphering)
- Timer-based SDU removal function (Timer-based SDU discard in uplink)

The reordering function of the NR PDCP device is a function of sequentially reordering PDCP PDUs received from a lower layer on the basis of a PDCP sequence number (SN), and may include a function of sequentially transferring the reordered data to a higher layer, a function of recording PDCP PDUs lost due to the reordering, a function of reporting statuses of the lost PDCP PDUs to a transmitting side, and a function of making a request for retransmitting the lost PDCP PDUs.

The main functions of the NR RLCs 410 and 435 may include some of the following functions.
- Data transmission function (Transfer of upper layer PDUs)
- Sequential delivery function (In-sequence delivery of upper layer PDUs)
- Non-sequential delivery function (Out-of-sequence delivery of upper layer PDUs)
- ARQ function (Error correction through ARQ)
- Concatenation, segmentation, and reassembly function (Concatenation, segmentation, and reassembly of RLC SDUs)
- Re-segmentation function (Re-segmentation of RLC data PDUs)
- Reordering function (Reordering of RLC data PDUs)
- Duplicate detection function (Duplicate detection)
- Error detection function (Protocol error detection)
- RLC SDU deletion function (RLC SDU discard)
- RLC re-establishment function (RLC re-establishment)

The sequential delivery function (In-sequence delivery) of the NR RLC device is a function of sequentially transferring PDCP PDUs received from a lower layer to a higher layer, and may include, when one original RLC SDU is divided into a plurality of RLC SDUs and then received, a function of reassembling and transmitting the RLC SDUs, a function of reordering the received RLC PDUs on the basis of an RLC sequence number (SN) or a PDCP SN, a function of recording PDCP PDUs lost due to the reordering, a function of reporting statuses of the lost PDCP PDUs to a transmitting side, a function of making a request for retransmitting the lost PDCP PDUs, a function of, if there is a lost RLC SDU, sequentially transferring only RLC SDUs preceding the lost RLC SDU to the higher layer, if a predetermined timer expires even though there is a lost RLC SDU, a function of sequentially transferring all RLC SDUs received before the timer starts to the higher layer, or if a predetermined timer expires even though there is a lost RLC SDU, a function of sequentially transferring all RLC SDUs received up to that point in time to the higher layer. Further, the NR RLC device may process the RLC PDUs sequentially in a reception order thereof (according to an arrival order regardless of a serial number or an SN) and may transfer the RLC PDUs to the PDCP device regardless of the sequence thereof (out-of-sequence delivery). If the RLC SDU is a segment, the NR RLC device may receive segments which are stored in the buffer or will be received in the future, reconfigure the segments to be one complete RLC PDU, process the RLC PDU, and then transmit the same to the PDCP device. The NR RLC layer may not include a concatenation function, and the function may be performed by the NR MAC layer, or may be replaced with a multiplexing function of the NR MAC layer.

The non-sequential function (Out-of-sequence delivery) of the NR RLC device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MACs 415 and 430 may be connected to a plurality of NR RLC layer entities configured in one UE and main functions of the NR MAC may include some of the following functions.
- Mapping function (Mapping between logical channels and transport channels)
- Multiplexing and demultiplexing function (Multiplexing/demultiplexing of MAC SDUs)
- Scheduling information report function (scheduling information reporting)
- HARQ function (Error correction through HARQ)
- Logical channel priority control function (Priority handling between logical channels of one UE)
- UE priority control function (Priority handling between UEs by means of dynamic scheduling)
- MBMS service identification function (MBMS service identification)
- Transport format selection function (Transport format selection)
- Padding function (Padding)

The PHY layers 420 and 425 perform an operation for channel-coding and modulating higher layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Figure 5:
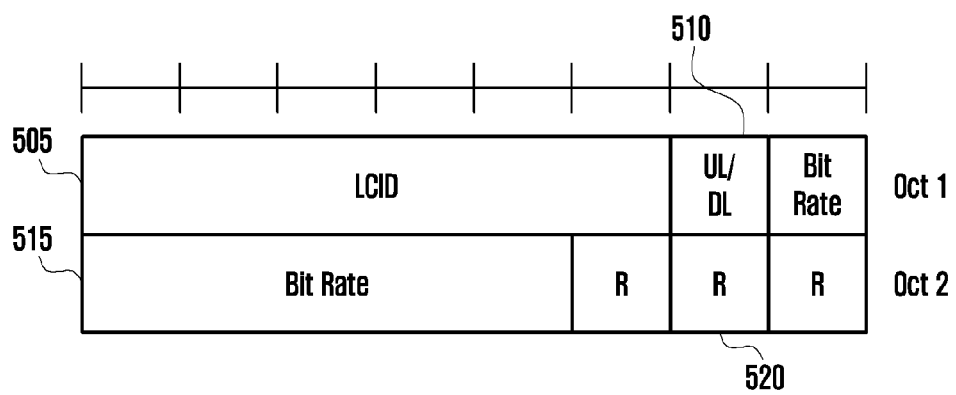
FIG. 5 illustrates formats of a recommended bit rate MAC control element (CE) and a recommended bit rate query MAC CE applied to the disclosure.

FIG. 5 illustrates formats of a recommended bit rate MAC control element (CE) and a recommended bit rate query MAC CE applied to the disclosure.

Under a situation in which a call is performed through a VoIP between UEs, a codec that satisfies a specific data rate may be determined to achieve a predetermined call quality, and a voice and data may be compressed by the corresponding codec and then transmitted. In such a situation, a procedure for controlling a bit rate in general multimedia telephony (MMTEL) including both a voice and a video may be performed through the corresponding MAC CE. The MAC CE for controlling the bit rate may start from both the UE and the eNB, and a logical channel ID (LCD) 505 is needed to distinguish the MAC CEs. That is, the recommended bit rate MAC CE and the recommended bit rate query MAC CE are distinguished by the LCID 505. Further, in order to indicate directions in which the recommended bit rate MAC CE and the recommended bit rate query MAC CE are applied, application of the MAC CE to uplink or downlink may be indicated by a 1-bit indicator 510. For example, downlink may be indicated if a UL/DL field is set as 0, and uplink may be indicated if the UL/DL field is set as 1. What value is indicated by a requested bit rate may be accurately indicated through a bit rate field 515. The bit rate field may have a size of 6 bits and may be mapped to an index value of a predetermined data rate table. Alternatively, a size of the table may be larger than or equal to 6 bits. Reserved bits (R) 520 may be left for future expansion.

FIG. 6 illustrates a method by which one UE performing a VoIP session receives recommended bit rate information and performs a recommended bit rate query according to embodiment 1-1 to which the disclosure is applied.

The embodiment is applied to the case in which the UE attempts a voice and video call and the eNB or the UE performs codec adaptation in order to start a corresponding VoIP session, transmit/receive data, and improve the performance of a call quality. In the disclosure, the VoIP is defined as general MMTEL including both a voice and a video. In general, under a situation in which a call is performed through a VoIP between UEs, a codec that satisfies a specific data rate may be determined to achieve a predetermined call quality, and a voice and data may be compressed using the corresponding codec and then transmitted.

In the embodiment, it is assumed that UE #1 603 and UE #2 604 belonging to eNB #1 601 and eNB #2 602, respectively, are performing VoIP service in one NR CN 605. In step 610, UEs camp on a corresponding serving cell, perform an RRC connection procedure, and then receive a configuration of a data radio bearer (DRB) related to the VoIP and a logical channel (LCH). If the corresponding DRB and LCH are related to the VoIP, the configuration may further include BitRateQueryProhibitTimer information. The BitRateQueryProhibitTimer is triggered when the UE transmits the recommended bit rate query MAC CE, and serves to prevent the UE from continuously transmitting the corresponding recommended bit rate query MAC CE for a preset time. That is, it is to prevent indiscriminate transmission of the recommended bit rate query MAC CE.

If the UE determines to start a VoIP session or receives an indication of start of the VoIP session from the eNB, the UE starts the corresponding VoIP session and transmits/receives data in step 615. The start of the VoIP session means that traffic corresponding to the VoIP is generated and data is transmitted/received using a defined DRB and LCH. If an IP address corresponding to the VoIP is generated at a NAS end of the UE, the UE receives an IP address corresponding to the VoIP, or the UE receives a VoIP from a higher layer, the UE may start the VoIP session.

When eNB #1 601 considers that a change in the codec type or a change in the bit rate is needed for the corresponding VoIP session, or when the change is requested by a peer UE or by an eNB to which the peer UE belongs due to a request from the peer UE, eNB #1 601 may transmit the recommended bit rate MAC CE to UE #1 603 in step 620. A format of the recommended bit rate MAC CE is illustrated in FIG. 5, and the eNB indicates a bit rate value and an application direction (uplink or downlink) and generates and transmits the MAC CE. In step 625, UE #1 603 receiving the MAC CE controls a call quality of the VoIP session with the peer UE by applying the configured direction and bit rate (bit rate adaptation). Since transmission of data at a bit rate faster than or equal to the configured bit rate is not allowed, UE #1 603 configures a bit rate, which is the closest to the configuration value, to determine a codec so that the corresponding codec is applied to the indicated direction. That is, a voice and video compression rate may be determined, and the voice and video may be transmitted at the determined bit rate. It may be understood that the codec determined as described above is applied on an application layer.

In step 630, in a specific situation, UE #1 603 may determine a change in the quality of the VoIP which is currently performed is needed and make a request for changing the call quality to the eNB. The reason may correspond to delay latency received by the UE, detection of a change in a channel quality, or determination of a change in the call quality according to a call policy by the UE. That is, UE #1 603 may transmit the recommended bit rate query MAC CE including information on a desired bit rate and call direction to eNB #1 601, and the eNB may perform an operation of receiving and applying the recommended bit rate query MAC CE. The operation which can be performed by eNB #1 603 includes an operation in which eNB #1 603 informs peer eNB #2 602 of the information transmitted by UE #1 603 and makes eNB #2 602 transmit the recommended bit rate MAC CE to UE #2 604 to control the recommended bit rate MAC CE or the eNB changes a codec and performs a VoIP.

FIG. 7 illustrates a method by which one UE performing a VoIP session receives recommended bit rate information and another corresponding UE performs a recommended bit rate query according to embodiment 1-2 to which the disclosure is applied.

The embodiment may be applied to the case in which the UE attempts a voice and video call and the eNB or the UE controls a codec to start the corresponding VoIP session, transmit/receive data, and improve the performance of a call quality. In the disclosure, the VoIP is defined as general MMTEL including both a voice and a video. In general, under a situation in which a call is performed through a VoIP between UEs, a codec that satisfies a specific data rate may be determined to achieve a predetermined call quality, and a voice and data may be compressed using the corresponding codec and then transmitted.

In the embodiment, it is assumed that UE #1 703 and UE #2 704 belonging to eNB #1 701 and eNB #2 702, respectively, perform VoIP service in one NR CN 705. In step 710, UEs camp on a corresponding serving cell, perform an RRC connection procedure, and then receive a DRB and LCH configuration related to a VoIP. If the corresponding DRB and LCH are related to the VoIP, the configuration may further include BitRateQueryProhibitTimer information. The BitRateQueryProhibitTimer is triggered when the UE transmits the recommended bit rate query MAC CE, and serves to prevent the UE from continuously transmitting the corresponding recommended bit rate query MAC CE for a preset time. That is, it is to prevent indiscriminate transmission of the recommended bit rate query MAC CE.

If the UE determines to start a VoIP session or receives an indication of start of the VoIP session from the eNB, the UE starts the corresponding VoIP session and transmits/receives data in step 715. The start of the VoIP session means that traffic corresponding to the VoIP is generated and data is transmitted/received using a defined DRB and LCH. If an IP address corresponding to the VoIP is generated at a UE NAS end, the UE receives the IP address corresponding to the VoIP, or a higher layer indicates the VoIP, the UE may start a VoIP session.

If the eNB considers that a change in the codec type or a change in the bit rate is needed for the corresponding VoIP session, or if the change is requested by a peer UE or by an eNB to which the peer UE belongs due to a request from the peer UE, eNB #1 701 may transmit the recommended bit rate MAC CE to UE #1 703 in step 720. A format of the recommended bit rate MAC CE is illustrated in FIG. 5, and eNB #1 701 indicates a desired bit rate value and application direction (uplink or downlink) and generates and transmits the MAC CE. In step 725, the UE receiving the MAC CE controls the call quality of the VoIP session with the peer UE by applying the configured direction and bit rate. Since transmission of data at a bit rate faster than or equal to the configured bit rate is not allowed, the UE configures a bit rate, which is the closest to the configuration value, to determine a codec in the indicated direction. That is, a voice and video compression rate may be determined, and the voice and video may be transmitted at the determined bit rate. It may be understood that the codec determined as described above is applied on an application layer.

In step 730, in a specific situation, UE #2 704 may determine a change in the quality of the VoIP which is currently performed is needed and make a request for changing the call quality to the eNB. The reason may correspond to delay latency received by the UE, detection of a change in a channel quality, or determination of a change in the call quality according to a call policy by the UE. That is, UE #2 704 may transmit the recommended bit rate query MAC CE including information on a desired bit rate and call direction to eNB #2 702, and eNB #2 702 may perform an operation of receiving and applying the recommended bit rate query MAC CE. The operation which can be performed by the eNB includes an operation in which the eNB transmits corresponding information to eNB #1 701 and transmits the recommended bit rate MAC C to UE #1 703 to control the recommended bit rate MAC CE or the corresponding eNB changes a codec and performs a VoIP.

Figure 8:
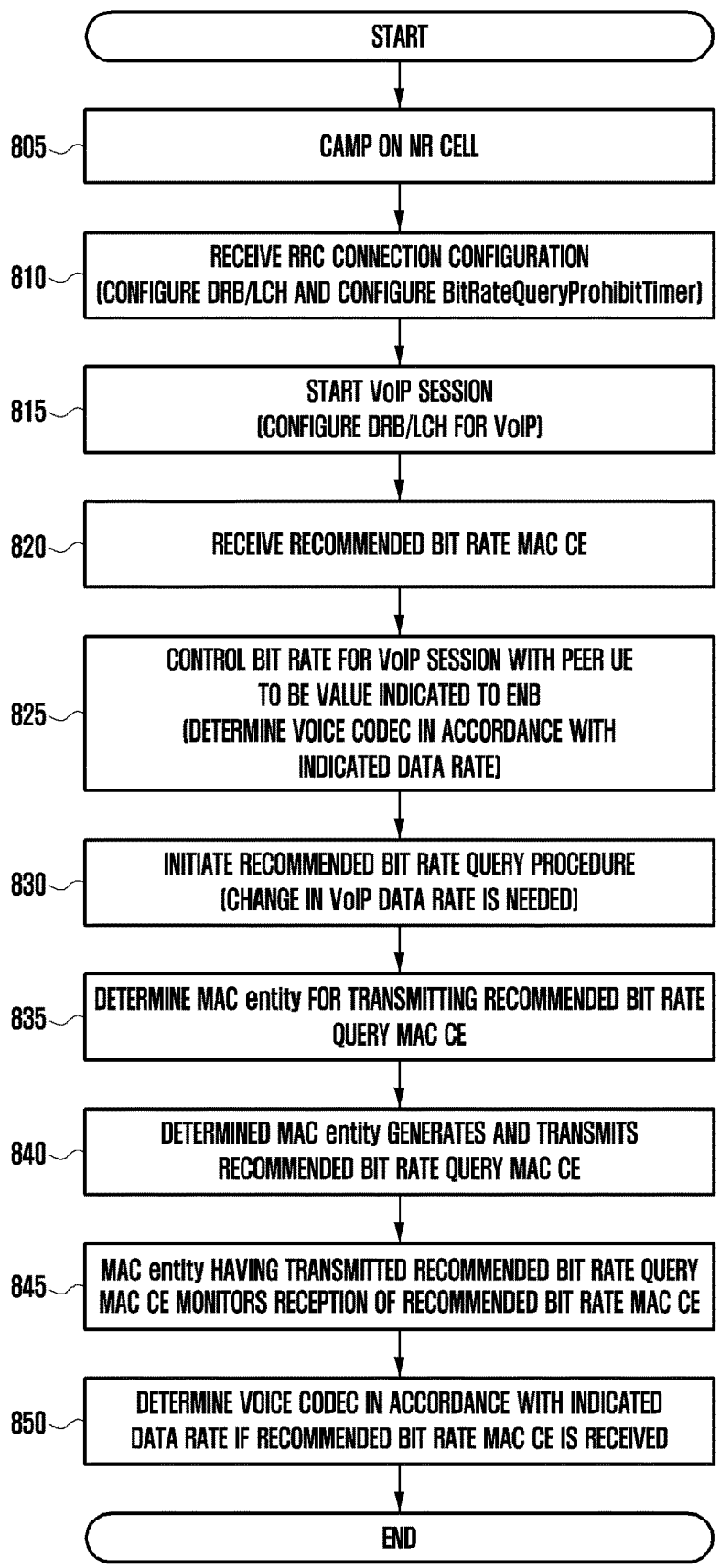
FIG. 8 illustrates the overall operation of the UE to which the disclosure is applied.

FIG. 8 illustrates the overall operation of the UE to which the disclosure is applied.

In step 805, the UE camps on a corresponding serving cell, performs an RRC connection procedure, and then receives a DRB and LCH configuration related to a VoIP in step 805. If the corresponding DRB and LCH are related to the VoIP, the configuration may further include BitRateQueryProhibitTimer information. The BitRateQueryProhibitTimer is triggered when the UE transmits the recommended bit rate query MAC CE, and serves to prevent the UE from continuously transmitting the corresponding recommended bit rate query MAC CE for a preset time. That is, it is to prevent indiscriminate transmission of the recommended bit rate query MAC CE.

If the UE determines to start a VoIP session or receives an indication of start of the VoIP session from the eNB, the UE starts the corresponding VoIP session and transmits/receives data in step 815. The start of the VoIP session means that traffic corresponding to the VoIP is generated and data is transmitted/received using a defined DRB and LCH. If an IP address corresponding to the VoIP is generated at a UE NAS end, the UE receives the IP address corresponding to the VoIP, or a higher layer indicates the VoIP, the UE may start a VoIP session.

If the eNB considers that a change in the codec type or a change in the bit rate is needed for the corresponding VoIP session, or if the change is requested by a peer UE or by an eNB to which the peer UE belongs due to a request from the peer UE, the eNB may transmit the recommended bit rate MAC CE to the UE and the UE receives the recommended bit rate MAC CE in step 820. A format of the recommended bit rate MAC CE is illustrated in FIG. 5, and the eNB indicates a bit rate value and an application direction (uplink or downlink) and generates and transmits the MAC CE to the UE. In step 825, the UE receiving the MAC CE controls the call quality of the VoIP session with the peer UE by applying the configured direction and bit rate. Since transmission of data at a bit rate faster than or equal to the configured bit rate is not allowed, the UE configures a bit rate, which is the closest to the configuration value, to determine a codec in the indicated direction. That is, a voice and video compression rate may be determined, and the voice and video may be transmitted at the determined bit rate.

If a specific UE (corresponding to a UE which receives or does not receive the recommended bit rate MAC CE from the eNB) may determine that a change in the quality of the VoIP currently performed in a specific situation is needed and initiate a recommended bit rate query procedure to make a request for changing the call quality to the eNB in step 830. The reason may correspond to delay latency received by the UE, detection of a change in a channel quality, or determination of a change in the call quality according to a call policy by the UE. In step 835, the UE determines a MAC entity for transmitting the recommended bit rate query MAC CE. Particularly, in the case of EUTRAN and NR dual connectivity (EN-DC), a plurality of MAC entities may exist, an operation indicating a MAC entity (or cell group) which transmits the corresponding recommended bit rate query MAC CE and a MAC entity which receives the recommended bit rate MAC CE should be specified. In the disclosure, one of the following conditions may be considered.

1. Cell group/MAC entity in which LCH corresponding to VoIP is configured is selected
2. Cell group/MAC entity in which PDCP of DRB corresponding to VoIP is configured is selected
3. Predetermined cell group and/or MAC entity is selected (specific MAC entity is designated in standard document) in which case master cell group (MCG) and secondary cell group (SCG) may be included in cell group If a MAC entity of a MCG is designated and a VoIP service is performed by an SCG, the SCG may transmit a scheduling request for the VoIP and a buffer status report (BSR), but the recommended bit rate MAC CE and the recommended bit rate query CE may be transmitted and received by the MAC entity of the MCG.

In step 840, the UE may transmit the recommended bit rate query MAC CE including information on a desired bit rate and call direction to the eNB, and the eNB may perform an operation of receiving and applying the recommended bit rate query MAC CE. The UE detects reception of the recommended bit rate MAC CE by the MAC entity which has transmitted the recommended bit rate MAC CE in step 845 and, when the recommended bit rate MAC CE is received through corresponding MAC entity, determines a voice or/and video codec in accordance with the indicated data rate in step 850.

Figure 9:
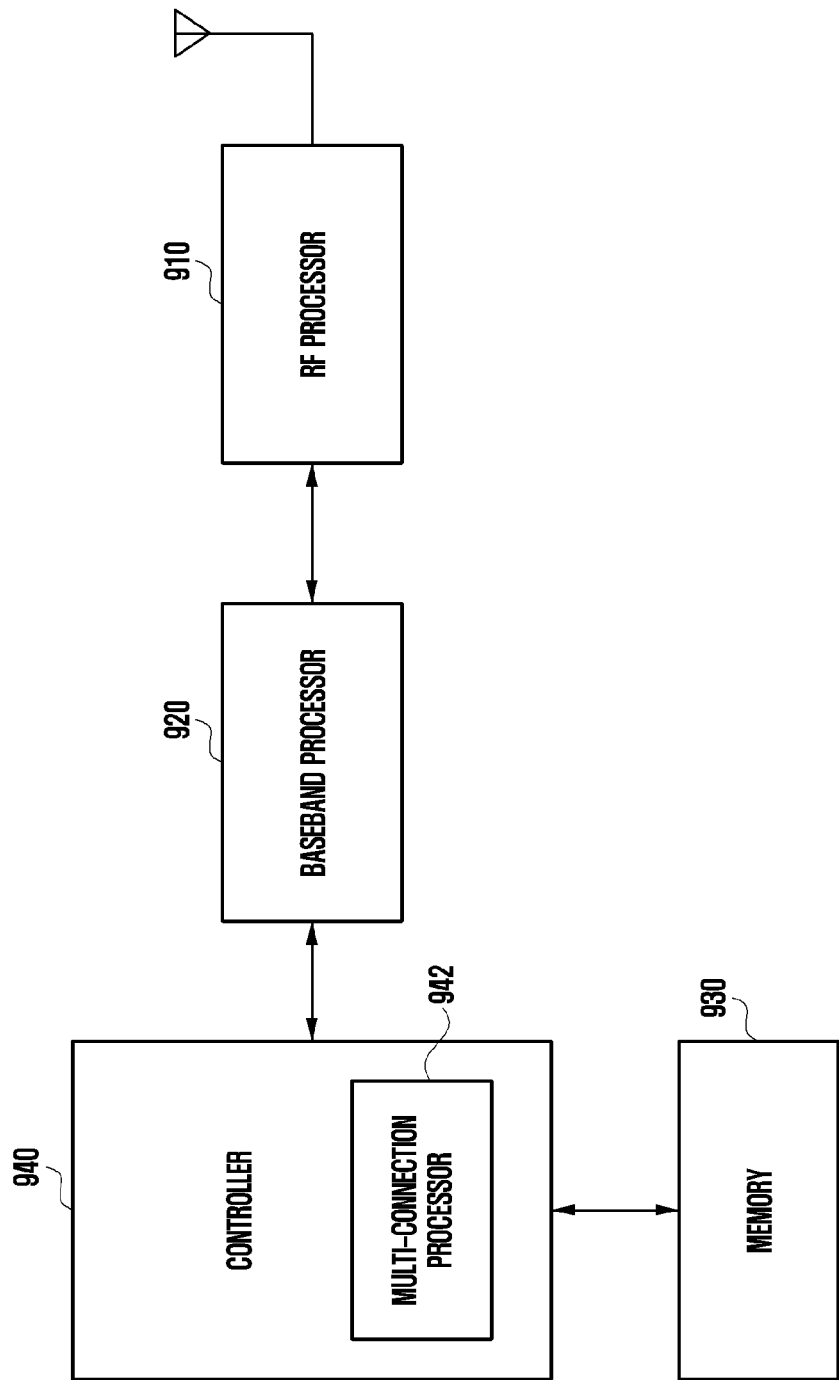
FIG. 9 is a block diagram illustrating an internal structure of the UE to which the disclosure is applied.

FIG. 9 is a block diagram illustrating an internal structure of the UE to which the disclosure is applied.

Referring to FIG. 9, the UE includes a radio frequency (RF) processor 910, a baseband processor 920, a memory 930, and a controller 940.

The RF processor 910 performs a function for transmitting and receiving a signal through a radio channel, such as band conversion and amplification of a signal. That is, the RF processor 910 up-converts a baseband signal provided from the baseband processor 920 into an RF band signal, transmits the RF band signal through an antenna, and then down-converts the RF band signal received through the antenna into a baseband signal. For example, the RF processor 910 may include a transmission filter, a reception filter, an amplifier, a mixer, an oscillator, a digital-to-analog converter (DAC), an analog-to-digital converter (ADC), and the like. Although FIG. 9 illustrates only one antenna, the UE may include a plurality of antennas. In addition, the RF processor 910 may include a plurality of RF chains. Moreover, the RF processor 910 may perform beamforming. For the beamforming, the RF processor 910 may control a phase and a size of each of the signals transmitted/received through a plurality of antennas or antenna elements. The RF processor may perform MIMO and may receive a plurality of layers while the MIMO operation is performed.

The baseband processor 920 performs a function for a conversion between a baseband signal and a bitstream according to a physical layer standard of the system. For example, in data transmission, the baseband processor 920 generates complex symbols by encoding and modulating a transmission bitstream. In data reception, the baseband processor 920 reconstructs a reception bitstream by decoding and demodulating a baseband signal provided from the RF processor 910. For example, in an orthogonal frequency division multiplexing (OFDM) scheme, when data is transmitted, the baseband processor 920 generates complex symbols by encoding and modulating a transmission bitstream, maps the complex symbols to subcarriers, and then configures OFDM symbols through an inverse fast Fourier transform (IFFT) operation and a cyclic prefix (CP) insertion. Further, when data is received, the baseband processor 920 divides the baseband signal provided from the RF processor 910 in the unit of OFDM symbols, reconstructs the signals mapped to the subcarriers through a fast Fourier transform (FFT) operation, and then reconstructs the reception bitstream through demodulation and decoding.

The baseband processor 920 and the RF processor 910 transmit and receive signals as described above. Accordingly, the baseband processor 920 or the RF processor 910 may be referred to as a transmission unit, a reception unit, a transmission/reception unit, or a communicator. At least one of the baseband processor 920 and the RF processor 910 may include a plurality of communication modules in order to support a plurality of different radio access technologies. In addition, at least one of the baseband processor 920 and the RF processor 910 may include different communication modules to process signals of different frequency bands. For example, the different radio access technologies may include a wireless LAN (for example, IEEE 802.11) and a cellular network (for example, LTE). Further, the different frequency bands may include a super-high-frequency (SHF) (for example, 2.5 GHz and 5 GHz) band and a millimeter (mm) wave (for example, 60 GHz) band.

The memory 930 stores data such as a basic program, an application program, and setting information for the operation of the UE. Particularly, the memory 930 may store information related to a second access node for performing wireless communication using a second radio access technology. In addition, the memory 930 provides data stored therein according to a request from the controller 940.

The controller 940 controls the overall operation of the UE. For example, the controller 940 transmits and receives a signal through the baseband processor 920 and the RF processor 910. In addition, the controller 940 may record data in the memory 940 and read the data. To this end, the controller 940 may include at least one processor. For example, the controller 940 may include a communication processor (CP) that performs a control for communication, and an application processor (AP) that controls a higher layer such as an application.

Figure 10:
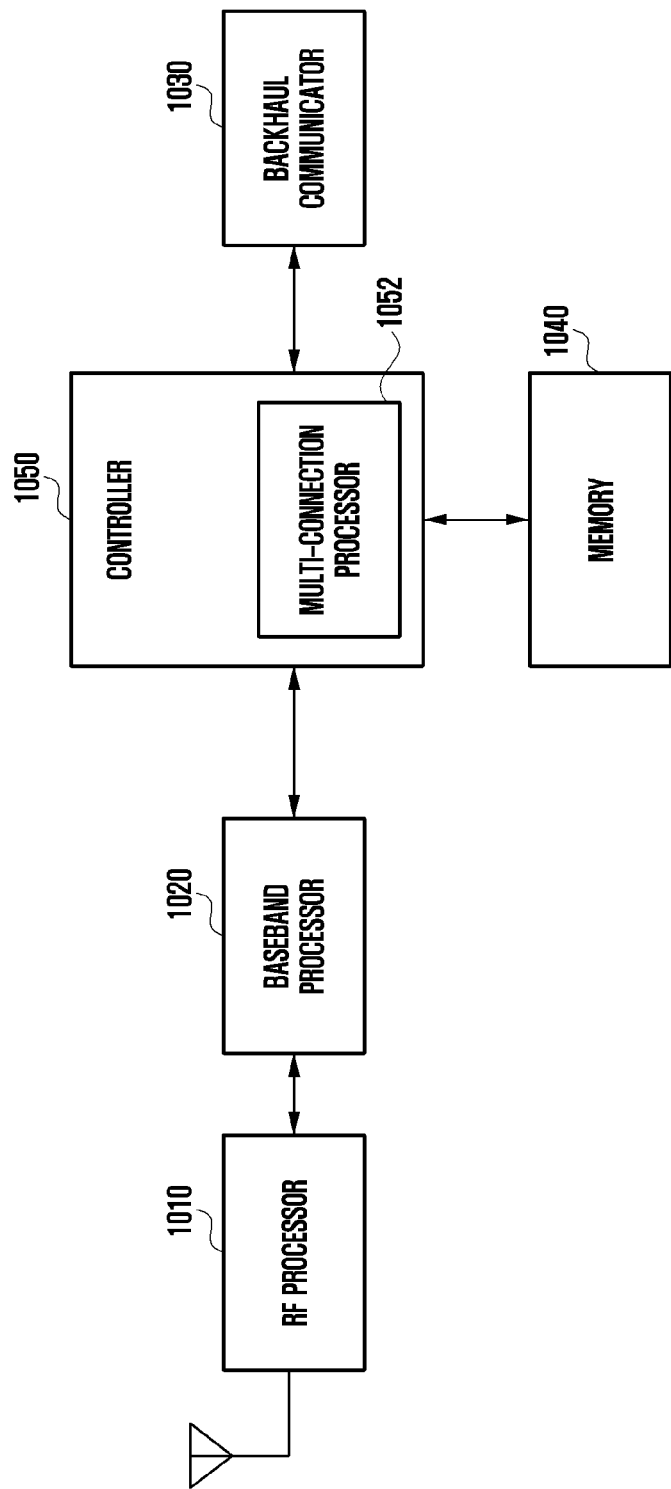
FIG. 10 is a block diagram illustrating a configuration of the eNB according to the disclosure.

FIG. 10 is a block diagram illustrating a configuration of the eNB according to the disclosure.

As illustrated in FIG. 10, the eNB includes an RF processor 1010, a baseband processor 1020, a backhaul communicator 1030, a memory 1040, and a controller 1050.

The RF processor 1010 performs a function for transmitting and receiving a signal through a radio channel, such as band conversion and amplification of a signal. That is, the RF processor 1010 up-converts a baseband signal provided from the baseband processor 1020 into an RF band signal, transmits the RF band signal through an antenna, and then down-converts the RF band signal received through the antenna into a baseband signal. For example, the RF processor 1010 may include a transmission filter, a reception filter, an amplifier, a mixer, an oscillator, a DAC, and an ADC. Although only one antenna is illustrated in FIG. 10, the eNB may include a plurality of antennas. In addition, the RF processor 1010 may include a plurality of RF chains. Moreover, the RF processor 1010 may perform beamforming. For the beamforming, the RF processor 1010 may control a phase and a size of each of the signals transmitted and received through a plurality of antennas or antenna elements. The RF processor may perform a downlink MIMO operation by transmitting one or more layers.

The baseband processor 1020 performs a function of performing conversion between a baseband signal and a bitstream according to a physical layer standard of the radio access technology. For example, in data transmission, the baseband processor 1020 generates complex symbols by encoding and modulating a transmission bitstream. In addition, the baseband processor 1020, when receiving data, reconstructs the reception bitstream by demodulating and decoding the baseband signal provided from the RF processor 1010. For example, in an OFDM scheme, when data is transmitted, the baseband processor 1020 generates complex symbols by encoding and modulating a transmission bitstream, maps the complex symbols to subcarriers, and then configures OFDM symbols through an IFFT operation and CP insertion. Further, when data is received, the baseband processor 1020 splits the baseband signal provided from the RF processor 1010 in units of OFDM symbols, reconstructs the signals mapped to the subcarriers through a fast Fourier transform (FFT) operation, and then reconstructs the reception bitstream through demodulation and decoding. The baseband processor 1020 and the RF processor 1010 transmit and receive signals as described above. Accordingly, the baseband processor 1020 or the RF processor 1010 may be referred to as a transmitter, a receiver, a transceiver, a communicator, or a wireless communicator.

The backhaul communicator 1030 provides an interface for communicating with other nodes within the network. That is, the backhaul communicator 1030 converts a bitstream transmitted from the eNB to another node, for example, secondary eNB or a core network into a physical signal and converts the physical signal received from the other node into the bitstream.

The memory 1040 stores data such as a basic program, an application program, and setting information for the operation of the eNB. Particularly, the memory 1040 may store information on bearers allocated to the accessed UE and the measurement result reported from the accessed UE. Further, the memory 1040 may store information which is a reference for determining whether to provide multiple connections to the UE or stop the multiple connections. In addition, the memory 1040 provides data stored therein according to a request from the controller 1050.

The controller 1050 controls the overall operation of the eNB. For example, the controller 1050 may transmit and receive a signal through the baseband processor 1020 and the RF processor 1010 or through the backhaul communicator 1030. In addition, the controller 1050 may record data in the memory 1040 and read the data. To this end, the controller 1050 may include at least one processor.

Embodiment 2

Figure 11:
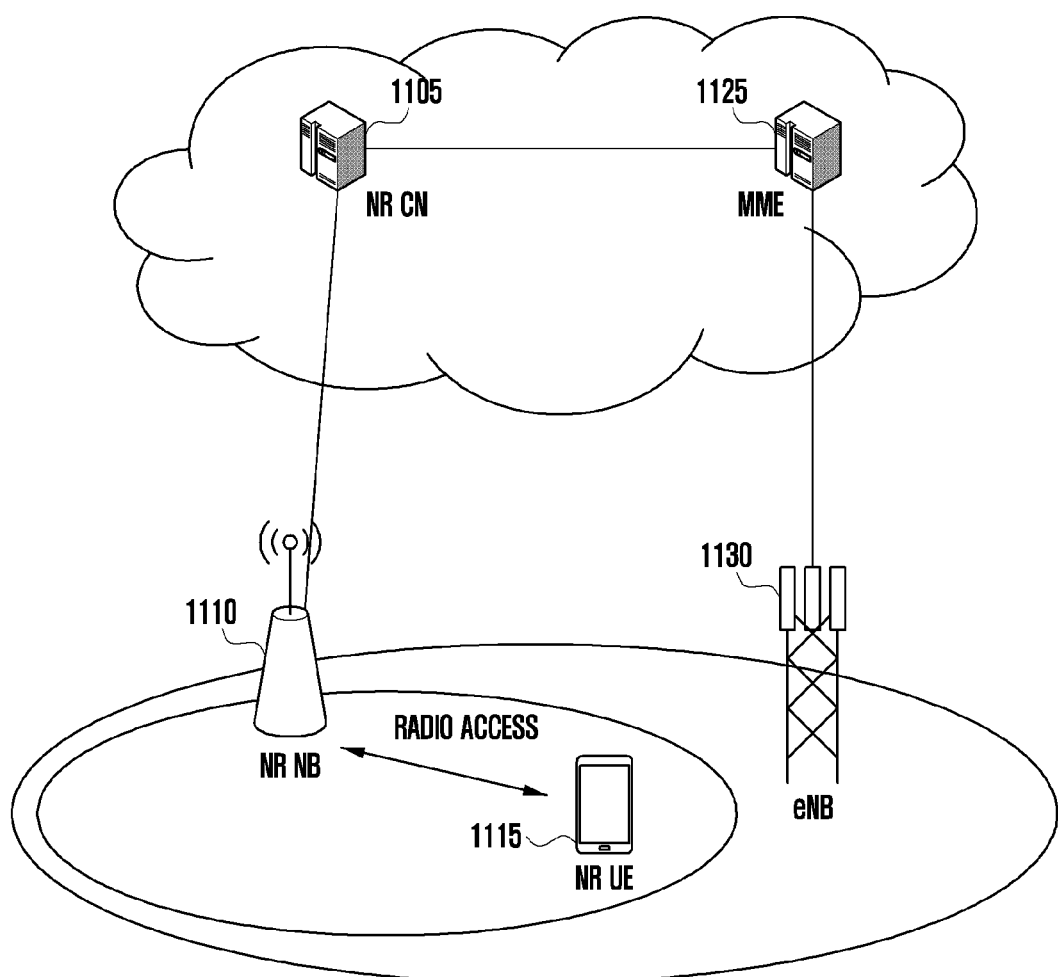
FIG. 11 illustrates a structure of the next-generation mobile communication system to which the disclosure is applied.

FIG. 11 illustrates a structure of the next-generation mobile communication system to which the disclosure is applied.

Referring to FIG. 11, a radio access network of the next-generation mobile communication system includes a next-generation base station 1110 (new radio node B, hereinafter, referred to as an NR gNB or an NR NB) and a new radio core network (NR CN) 1105. A user terminal 1115 (hereinafter, referred to as a new radio user equipment (NR UE) or a terminal) accesses an external network through the NR gNB 1110 and the NR CN 1105.

The NR gNB 1110 of FIG. 11 corresponds to an evolved Node B (eNB) in a conventional LTE system. The NR gNB 1110 may be connected to the NR UE 1115 through a radio channel and may provide better service than the conventional node B. Since all user traffic is serviced through a shared channel in the next-generation mobile communication system, a device for collecting and scheduling status information of buffer statuses, available transmission power statuses, and channel statuses of UEs is required, which corresponds to the NR gNB 1110.

One NR gNB 1110 generally controls a plurality of cells. The NR system may have a bandwidth wider than or equal to the conventional maximum bandwidth in order to implement a super-high data transmission compared to the conventional LTE system and a beamforming technology may be additionally grafted thereon through the radio access technology as an OFDM scheme. Further, an adaptive modulation and coding scheme for determining a modulation scheme and a channel coding rate in accordance with a channel state of the UE is applied.

The NR CN 1105 performs a function of supporting mobility, configuring a bearer, and configuring QoS. The NR CN is a device which performs not only a function of managing mobility of the UE but also various control functions and is connected to a plurality of eNBs. Further, the next-generation mobile communication system may be linked to the conventional LTE system, and the NR CN is connected to an MME 1125 through a network interface. The MME is connected to an eNB 1130, which is a conventional base station.

Figure 12:
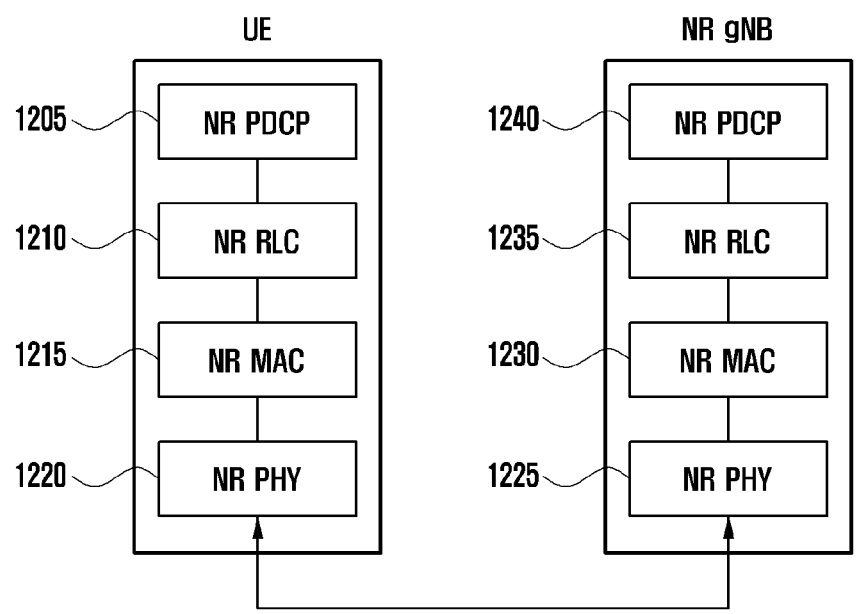
FIG. 12 illustrates a wireless protocol structure of the next-generation mobile communication system to which the disclosure can be applied.

FIG. 12 illustrates a wireless protocol structure of the next-generation mobile communication system to which the disclosure can be applied.

Referring to FIG. 12, the UE and the NR gNB include NR PDCPs 1205 and 1240, NR RLCs 1210 and 1235, and NR MACs 1215 and 1230, respectively, in the wireless protocol of the next-generation mobile communication system. The main functions of the NR PDCPs 1205 and 1240 may include some of the following functions.

- Header compression and decompression function ((Header compression and decompression: ROHC only)
- User data transmission function (Transfer of user data)
- Sequential delivery function (In-sequence delivery of upper layer PDUs)
- Reordering function (PDCP PDU reordering for reception)
- Duplicate detection function (Duplicate detection of lower layer SDUs)
- Retransmission function (Retransmission of PDCP SDUs)
- Ciphering and deciphering function (Ciphering and deciphering)
- Timer-based SDU removal function (Timer-based SDU discard in uplink)

The reordering function of the NR PDCP device is a function of sequentially reordering PDCP PDUs received from a lower layer on the basis of a PDCP sequence number (SN), and may include a function of sequentially transferring the reordered data to a higher layer, a function of recording PDCP PDUs lost due to the reordering, a function of reporting statuses of the lost PDCP PDUs to a transmitting side, and a function of making a request for retransmitting the lost PDCP PDUs.

The main functions of the NR RLCs 1210 and 1235 may include some of the following functions.

- Data transmission function (Transfer of upper layer PDUs)
- Sequential delivery function (In-sequence delivery of upper layer PDUs)
- Non-sequential delivery function (Out-of-sequence delivery of upper layer PDUs)
- ARQ function (Error correction through ARQ)
- Concatenation, segmentation, and reassembly function (Concatenation, segmentation, and reassembly of RLC SDUs)
- Re-segmentation function (Re-segmentation of RLC data PDUs)
- Reordering function (Reordering of RLC data PDUs)
- Duplicate detection function (Duplicate detection)
- Error detection function (Protocol error detection)
- RLC SDU deletion function (RLC SDU discard)
- RLC re-establishment function (RLC re-establishment)

The sequential delivery function (In-sequence delivery) of the NR RLC device is a function of sequentially transferring PDCP PDUs received from a lower layer to a higher layer, and may include, when one original RLC SDU is divided into a plurality of RLC SDUs and then received, a function of reassembling and transmitting the RLC SDUs, a function of reordering the received RLC PDUs on the basis of an RLC sequence number (SN) or a PDCP SN, a function of recording PDCP PDUs lost due to the reordering, a function of reporting statuses of the lost PDCP PDUs to a transmitting side, a function of making a request for retransmitting the lost PDCP PDUs, if there is a lost RLC SDU, a function of sequentially transferring only RLC SDUs preceding the lost RLC SDU to the higher layer, if a predetermined timer expires even though there is a lost RLC SDU, a function of sequentially transferring all RLC SDUs received before the timer starts to the higher layer, or if a predetermined timer expires even though there is a lost RLC SDU, a function of sequentially transferring all RLC SDUs received up to that point in time to the higher layer. Further, the NR RLC device may process the RLC PDUs sequentially in a reception order thereof (according to an arrival order regardless of a serial number or an SN) and may transfer the RLC PDUs to the PDCP device regardless of the sequence thereof (out-of-sequence delivery). If the received RLC SDU is a segment, the NR RLC device may receive segments which are stored in the buffer or will be received in the future, reconfigure the segments to be one complete RLC PDU, process the RLC PDU, and then transmit the same to the PDCP device. The NR RLC layer may not include a concatenation function, and the function may be performed by the NR MAC layer, or may be replaced with a multiplexing function of the NR MAC layer.

The non-sequential function (Out-of-sequence delivery) of the NR RLC device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MACs 1215 and 1230 may be connected to a plurality of NR RLC layer entities configured in one UE and main functions of the NR MAC may include some of the following functions.

Mapping function (Mapping between logical channels and transport channels)

Multiplexing and demultiplexing function (Multiplexing/demultiplexing of MAC SDUs)

Scheduling information report function (scheduling information reporting)

HARQ function (Error correction through HARQ)

Logical channel priority control function (Priority handling between logical channels of one UE)

UE priority control function (Priority handling between UEs by means of dynamic scheduling)

MBMS service identification function (MBMS service identification)

Transport format selection function (Transport format selection)

Padding function (Padding)

The NR PHY layers 1220 and 1225 perform an operation for channel-coding and modulating higher layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

In the NR system, an end-to-end service is provided for each quality of service (QoS) (or flow) in the overall operation for supporting an IP service to the UE, an NR node, a next generation user plane (NG-UP), and an Internet peer. A PDU session is configured and QoS flows are transmitted through one tunnel up to a peer providing an Internet service in which a packet data network (PDN) connection is configured, that is, a next generation core network (NG-CN) for one PDN, that is, a core network. In the core network, one or a plurality of PDU sessions can be configured up to the UE in which case the PDU sessions may be independently configured. The eNB receives a packet from the core network, and the packet is transmitted while belonging to the QoS flow into which the packet is classified. That is, the packet is transmitted according to a rule under which the IP flow is mapped to the QoS flow. The gNB identifies a DRB to which a specific QoS flow is mapped, maps the QoS flow to the specific DRB according to the mapping rule, and transmits the DRB. In the above step, the gNB may determine a DRB to which a specific QoS flow is mapped. In the disclosure, a service data access protocol (SDAP) layer in NR supporting the QoS characteristic will be described in detail.

Figure 13:
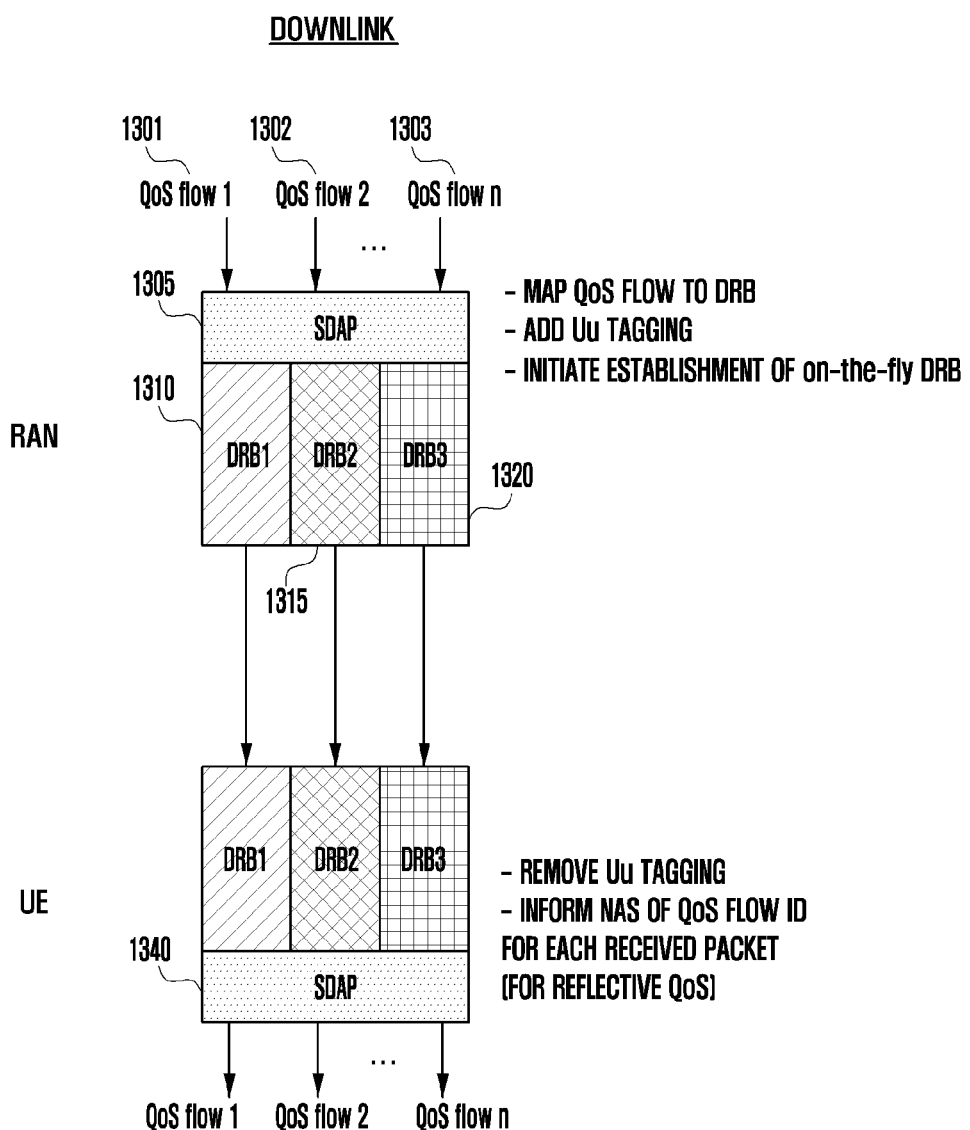
FIG. 13 illustrates a function for handling the QoS in downlink.
Figure 14:
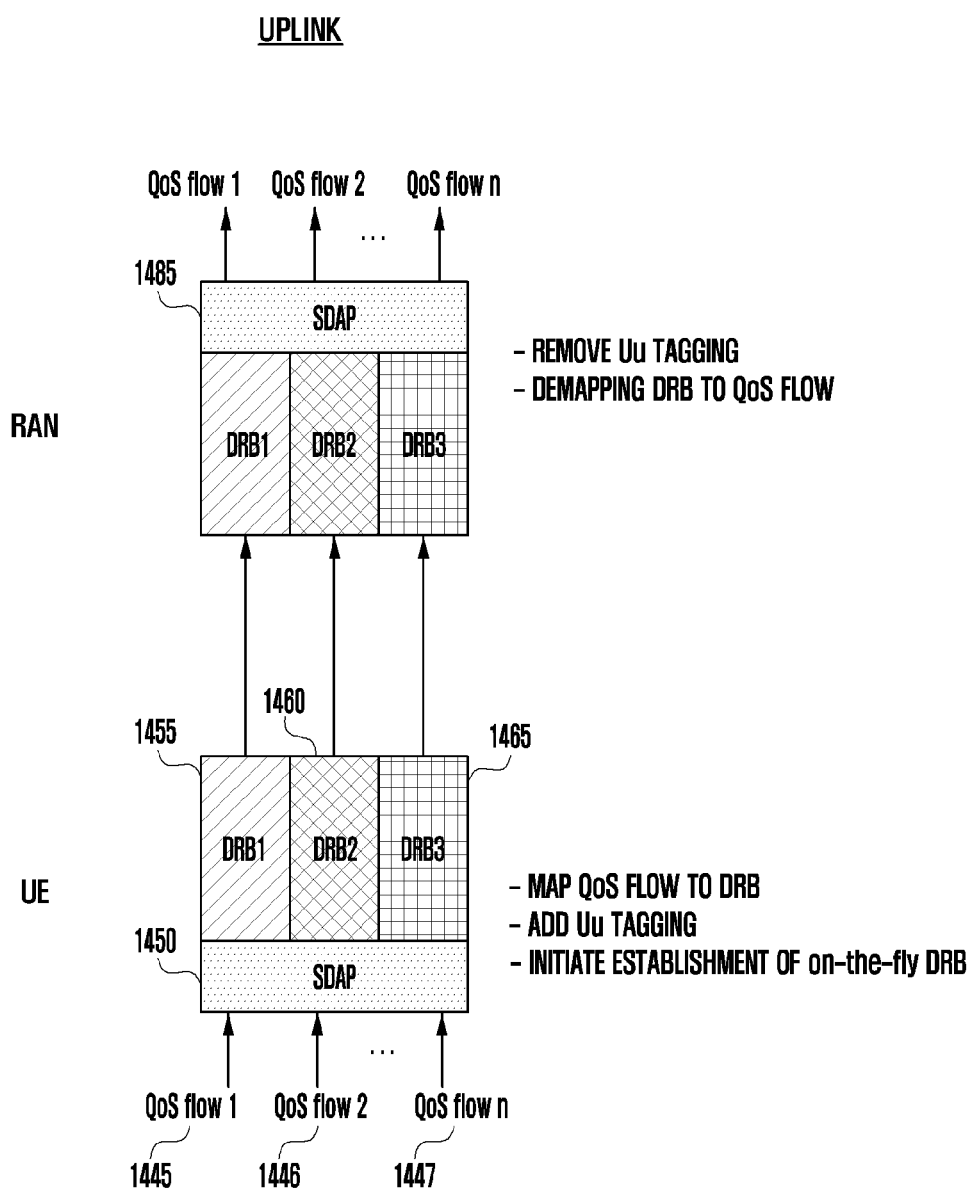
FIG. 14 illustrates a function for handling the QoS in uplink.

FIGS. 13 and 14 illustrate new functions for handling QoS in the NR system.

FIG. 13 illustrates a function of handling the QoS in downlink.

In the NR system, a user traffic transmission path may be configured according to services requiring different service qualities (QoS), that is, QoS requirements, and a specific IP flow should be controlled for each service. The NR core network may configure a plurality of packet data unit (PDU) sessions, and each PDU session may include a plurality of IP flows. The NR gNB may map a plurality of QoS flows to a plurality of data radio bearers (DRBs) and simultaneously configure the same. That is, since a plurality of QoS flows #1, #2, and #3 1301, 1302, and 1303 may be mapped to the same DRB or different DRBs (for example, DRB #1 1310, DRB #2 1315, and DRB #3 1320) in downlink, it is required to mark a QoS flow ID on a downlink packet in order to distinguish therebetween. Alternatively, DRB mapping may be explicitly configured through an RRC message. The above function is a function that did not exist in the conventional LTE PDCP protocol, so SDAPs 1305 and 1340, which are new protocols for performing the function, should be introduced or a function for the new function should be added to the PDCP.

Further, the marking allows the UE to implement a reflective QoS in uplink. The reflective QoS refers to a mapping method of allowing the UE to perform uplink transmission through a DRB through which a downlink packet having a specific flow ID transmitted by the gNB is transmitted, and in order to indicate the reflective QoS, a reflective QoS indicator (RQI) of 1 bit and a reflective QoS flow to DRB mapping indication (RDI) of 1 bit may be included in an SDAP header. Explicitly marking the QoS flow ID on the downlink packet is a simple method by which an access stratum (AS) of the UE provides the information to a NAS of the UE.

A method of mapping IP flows to DRBs in downlink may be performed through two steps below.

1. NAS level mapping (RQI): IP flow→QoS flow
2. AS level mapping (RDI): QoS flow→DRB In downlink reception, the UE may detect whether there is QoS flow mapping information for each DRB 1325, 1330, or 1335 and the reflective QoS operation and transmit the corresponding information to the NAS. That is, when the RQI and the RDI are set to "1" in the SDAP header of the received data packet, it means that the NAS and AS mapping rules have been updated, so the UE may update the mapping rule and transmit the uplink packet according thereto.

FIG. 14 illustrates a function for handling the QoS in uplink.

That is, like in the downlink, mapping of two steps may be used in the uplink. First, IP flows are mapped to QoS flows through NAS signaling, and the QoS flows 1445, 1446, and 1447 are mapped to predetermined DRBs 1455, 1460, and 1465 in the AS. The UE may mark a QoS flow ID on the uplink packet, or may transmit the packet without marking the QoS flow ID. The function is performed by an SDAP 1450 of the UE. If the QoS flow ID is marked on the uplink packet, the NR gNB may mark the QoS flow ID on a packet for transmitting the information to the NG-U without an uplink traffic flow template (TFT) and transmit the packet.

Figure 15:
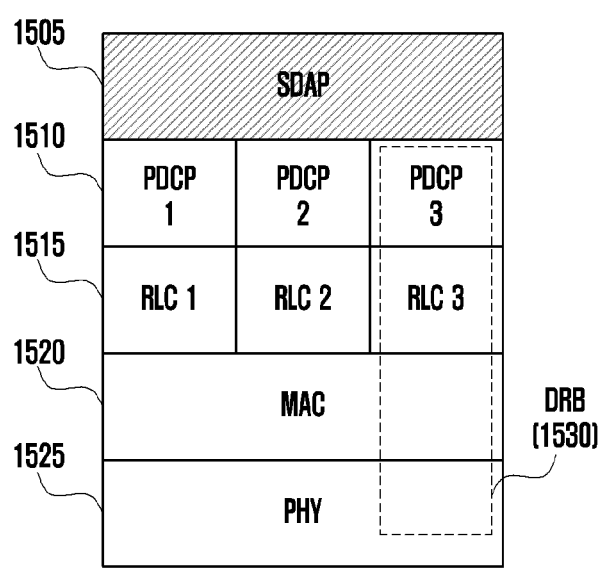
FIG. 15 illustrates an NR protocol stack including an SDAP.
Figure 16:
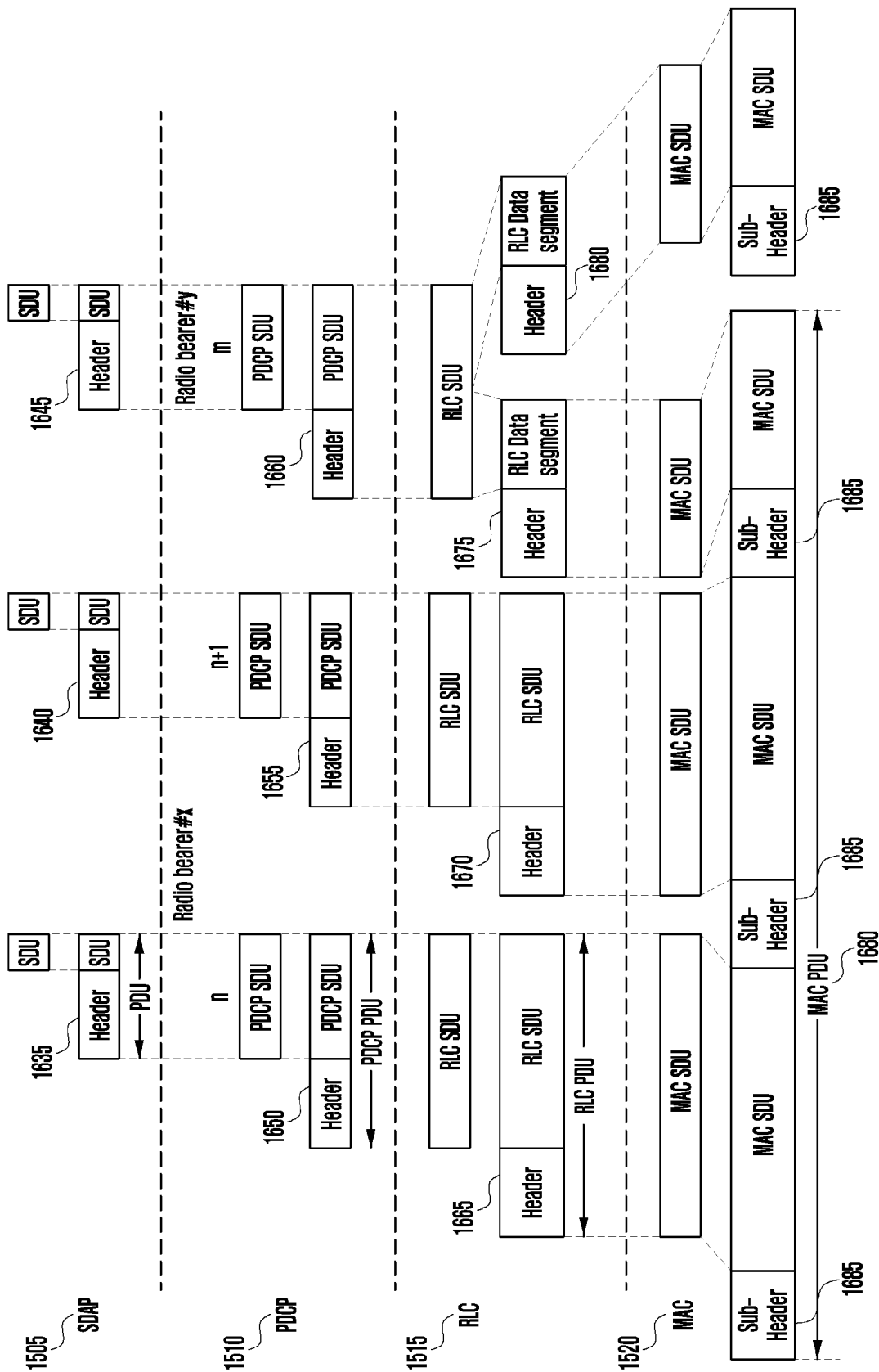
FIG. 16 illustrates a structure of a packet in each protocol.

FIGS. 15 and 16 illustrate a protocol stack including an SDAP in NR considered by the disclosure.

FIG. 15 illustrates an NR protocol stack including an SDAP. FIG. 16 illustrates a structure of a packet in each protocol.

In order to handle a new QoS function of the NR system, the following information should be transmitted through a radio interface.

Downlink: QoS flow ID+RQI+RDI
Uplink: QoS flow ID

In NR, an interface for transmitting the new information to a Uu is needed, and a new protocol for performing the function is defined on a layer of a PDCP 1510. An SDAP 1505 is not a DRB-based protocol, and packets are transmitted according to a mapping rule of a configured DRB 1530. That is, if IP traffic is generated, the SDAP 1505 maps the IP flow to the QoS flow ID and then maps the QoS flow ID to the DRB. The IP traffic includes an IP header and a payload, and SDAP headers 1635, 1640, and 1645 may be located before IP packets. The PDCP 1510 compresses the IP header, and PDCP headers 1650, 1655, and 1660 are added thereto. An RLC 1515 and a MAC 1520 sequentially add RLC headers 1665, 1670, 1675, and 1680, and a MAC subheader 1685, respectively, and the MAC adds a MAC header and then transmits a MAC PDU 1680 to a PHY.

If the gNB determines to apply a reflective mechanism to the UE (instructs the UE to transmit an uplink packet through a DRB, such as the DRB through which a QoS flow ID included in a downlink packet is transmitted), the gNB inserts the QoS flow ID and a reflective QoS indicator (RDI+RQI) into the packet on the layer of the SDAP 1505 of the downlink packet and transmits the packet. The SDAP header has a length of 1 byte and may include the QoS flow ID (6 bits) and RQI (1 bit)+RDI (1 bit). That is, 64 QoS flows may be transmitted to the SDAP header, and it is not possible to specify more QoS flows. In the disclosure, it is required to indicate QoS flows larger than 64 QoS flows in the future because many TCP connections and UDP session connection configurations may be needed.

During the process, if the gNB inserts QoS flow IDs into all data packets and transmits the data packets, the operation of updating the mapping rule through the QoS flow IDs received by the UE is continuously performed. That is, if the RQI bit of 1 bit and the RDI bit of 1 bit are set to "1", the UE updates the NAS mapping rule and the AS mapping rule under the assumption that each of the mapping rules of the NAS and the AS has been updated, and transmits the uplink data packet according to the corresponding rule. Basically, the NAS reflective QoS is triggered when a mapping rule between the IP flow and the QoS flow is updated in the NR core network, and the AS reflective QoS is triggered when a mapping rule between the QoS flow and the DRB is updated in the wireless gNB.

However, based on signaling between the NR gNB and the core network, if the NAS mapping rule is updated, the core network configures an RQI bit indicating the update in a header N3 of the data packet transmitted to the NR gNB and transmits the data packet. The header N3 is a header according to an interface between the core network and the NR gNB. If the RQI bit of the header N3 of the packet received from the core network is set to "1", the NR gNB sets the RQI bit of the SDAP header to "1" and transmits the packet to the UE. Alternatively, if the AS mapping rule is changed even though the RQI bit of the header N3 is set to "0", the NR gNB sets the RDI bit of the SDAP header to "1" and transmits the packet to the UE. However, if the operation is performed, the UE should continuously store a mapping information table (TFT table) for NAS mapping and AS mapping, and thus the amount of information that the UE should store may increase, and if the information is not properly managed, confusion due to overlapping mapping may occur. In order to solve the problem, the UE and the NR core network operate a timer at the moment when the NAS reflective QoS rule is applied, and if a data packet to which the corresponding rule is applied is not received during the preset timer, configured NAS reflective QoS mapping information may be removed. For reference, if the data packet to which the QoS mapping rule is applied is transmitted and received while the timer operates, the timer is restarted.

Figure 17:
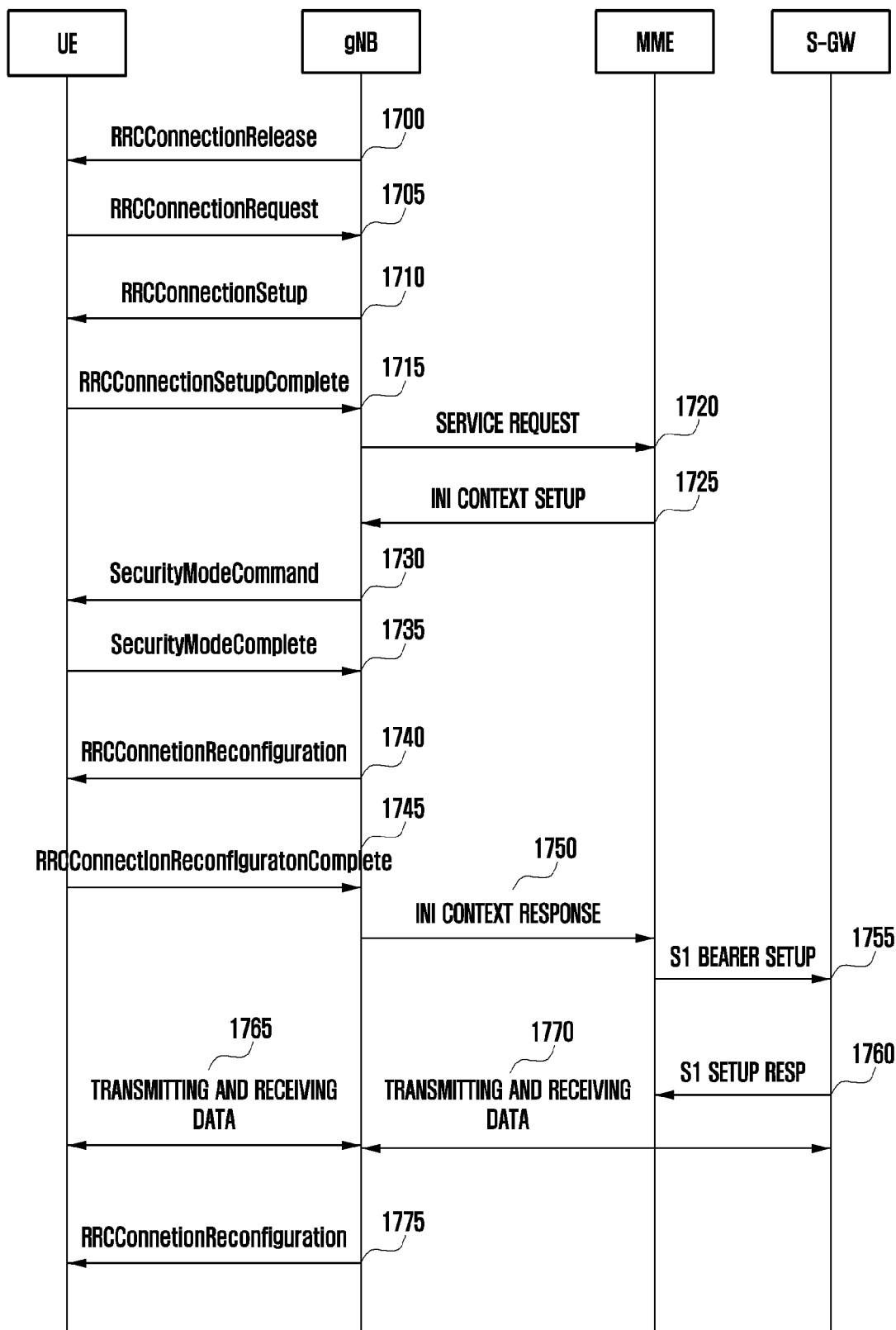
FIG. 17 illustrates a procedure in which the UE determines an initial link configuration when a connection with the network is configured according to the disclosure.

FIG. 17 illustrates a procedure in which the UE determines an initial link configuration when a connection with the network is configured according to the disclosure.

That is, FIG. 17 illustrates a procedure in which the UE switches from an RRC-idle mode or an RRC-inactive mode (or lightly-connected mode) to an RRC0-connected mode and configures a connection with the network and a procedure in which the UE configures whether to perform uplink data compression (UDC).

In FIG. 17, if the UE transmitting and receiving data in the RRC-connected mode has no data transmission/reception for a predetermined reason or for a predetermined time, the gNB may transmit an RRCConnectionRelease message to the UE, and thus the UE may switch to the RRC-idle mode in step 1700. If the UE of which the connection is not currently configured (hereinafter, referred to as an idle-mode UE) will have data to be transmitted in the future, the UE performs an RRC connection establishment process with the gNB. The UE establishes backward transmission synchronization with the gNB through a random access process and transmits an RRCConnectionRequest message to the gNB in step 1705. The message includes a reason (establishment-Cause) to establish the connection with an identifier of the UE. The gNB transmits an RRCConnectionSetup message to allow the UE to establish the RRC connection in step 1710. The message may include information indicating whether to use an uplink data compression method (UDC) for each logical channel (logicalchannelconfig), for each bearer, or for each PDCP device (PDCP-config).

More specifically, each logical channel, each bearer, or each PDCP device (or each SDAP device) may indicate an IP flow or a QoS flow for which the uplink data compression method (UDC) is used (or information on an IP flow or a QoS flow for which the uplink data compression method is used or not used may be configured in the SDAP device, and the SDAP may inform the PDCP device of whether to use the uplink data compression method for each QoS flow, or the PDCP device may identify each QoS flow by itself and determine whether to apply the uplink compression method). Further, if the use of the uplink data compression method is indicated, a predefined library to be used for the uplink data compression method, an identifier of dictionary information, or a buffer size to be used for the uplink data compression method may be indicated. The message may include a setup or release instruction to perform uplink compression release. When the use of the uplink data compression method is configured, a corresponding RLC mode may be always configured as an RLC AM bearer (mode having no loss due to an ARQ function and a retransmission function) and may be configured without a header compression protocol (ROHC). The message may indicate whether to use a function of the SDAP layer entity for each logical channel (logicalchannelconfig), for each bearer, or for each PDCP device (PDCP-config) or whether to use the SDAP header and indicate whether to apply an ROHC (used for IP packet header compression) for each logical channel (logicalchannelconfig), for each bearer, or for each PDCP device (PDCP-config), and whether to apply the ROHC to each of the uplink and the downlink may be configured through an indicator. However, the ROHC and the UDC cannot be simultaneously configured for one PDCP layer entity, logical channel, or bearer, and the UDC may be configured for a maximum of two bearers. The message may include information indicating whether to apply integrity protection and integrity verification for each logical channel (logicalchannelconfig), for each bearer, or for each PDCP device (PDCP-config), which may be configured in consideration of a maximum data transmission rate of the corresponding PDCP layer entity, bearer, or logical channel. When user data compression (UDC), header compression (ROHC), or integrity protection is configured for each logical channel, for each bearer, or for each PDCP device, whether to use the same may be configured for each of the uplink and the downlink. That is, the function may be configured to be used in the uplink but not in the downlink. Inversely, the function may be configured to be used in the downlink but not in the uplink. Further, the message includes RRC connection configuration information. The RRC connection is also referred to as a signaling radio bearer (SRB), and is used for transmitting and receiving an RRC message which is a control message between the UE and the gNB.

The UE establishing the RRC connection transmits an RRCConnectionSetupComplete message to the gNB in S1715. If the gNB does not know a UE capability of the UE currently configuring the connection or if the gNB desires to detect the UE capability, the gNB may transmit a message inquiring about the UE capability. Then, the UE may transmit a message for reporting its own capability. The UE may indicate whether to use UDC, ROHC, or integrity protection through the message, and the message may include an indicator indicating the same.

The RRCConnetionSetupComplete message may include a control message corresponding to a SERVICE REQUEST by which the UE makes a request for establishing a bearer for a predetermined service to the MME. The gNB transmits the SERVICE REQUEST message included in the RRCConnetionSetupComplete message to the MME in step 1720, and the MME determines whether to provide the service requested by the UE. If it is determined to provide the service requested by the UE on the basis of the determination result, the MME transmits an INITIAL CONTEXT SETUP REQUEST message to the gNB in step 1725. The message includes QoS information to be applied to a DRB configuration and security-related information to be applied to the DRB (for example, a security key and a security algorithm). The gNB exchanges a SecurityModeCommand message and a SecurityModeComplete message with the UE in order to set security in steps 1730 and 1735.

If security has been completely set, the gNB transmits an RRCConnectionReconfiguration message to the UE in step 1740. The message may include information indicating whether to use the UDC for each logical channel (logicalchannelconfig), for each bearer, or for each PDCP device (PDCP-config). More specifically, each logical channel, each bearer, or each PDCP device (or each SDAP device) may indicate an IP flow or a QoS flow for which the UDC is used (or information on an IP flow or a QoS flow for which the UDC is used or not used may be configured in the SDAP device, and the SDAP may inform the PDCP device of whether to use the UDC for each QoS flow, or the PDCP device may identify each QoS flow by itself and determine whether or not to apply the uplink compression method). Further, if the use of the UDC is indicated, a predefined library to be used for the UDC, an identifier of dictionary information, or a buffer size to be used for the UDC may be indicated. The message may include a setup or release instruction to perform uplink compression release. When the use of the uplink data compression method is configured, a corresponding RLC mode may be always configured as an RLC AM bearer (mode having no loss due to an ARQ function and a retransmission function) and may be configured without an ROHC. The message may indicate whether to use a function of the SDAP layer entity for each logical channel (logicalchannelconfig), for each bearer, or for each PDCP device (PDCP-config) or whether to use the SDAP header and indicate whether to apply an ROHC for each logical channel (logicalchannelconfig), for each bearer, or for each PDCP device (PDCP-config), and whether to apply the ROHC to each of the uplink and the downlink may be configured through an indicator. However, the ROHC and the UDC cannot be simultaneously configured for one PDCP layer entity, logical channel, or bearer, and the UDC may be configured for a maximum of two bearers. The message may include information indicating whether to apply integrity protection and integrity verification for each logical channel (logicalchannelconfig), for each bearer, or for each PDCP device (PDCP-config), which may be configured in consideration of a maximum data transmission rate of the corresponding PDCP layer entity, bearer, or logical channel. When UDC, ROHC, or integrity protection is configured for each logical channel, for each bearer, or for each PDCP device, whether to use the same may be configured for each of the uplink and the downlink. That is, the function may be configured to be used in the uplink but not in the downlink. Inversely, the function may be configured to be used in the downlink but not in the uplink. The message includes configuration information of the DRB for processing user data, and the UE configures the DRB by applying the information and transmits an RRCConnectionReconfigurationComplete message to the gNB in S1745.

The gNB completely establishing the DRB with the UE transmits an INITIAL CONTEXT SETUP COMPLETE message to the MME in step 1750, and the MME receiving the INITIAL CONTEXT SETUP COMPLETE message exchanges an S1 BEARER SETUP message and an S1 BEARER SETUP RESPONSE message in order to establish an S1 bearer with the S-GW in steps 17055 and 1760. The S1 bearer is a connection for data transmission established between the S-GW and the gNB and corresponds to the DRB in one-to-one correspondence. When the process is completed, the UE transmits and receives data to and from the gNB through the S-GW in steps 1765 and 1770.

As described above, the general data transmission process largely consists of three steps such as RRC connection setup, security setup, and DRB setup. Further, the gNB may transmit an RRCConnectionReconfiguration message in order to provide new configuration to the UE or add or change the configuration for a predetermined reason in step 1775. The message may include information indicating whether to use the UDC for each logical channel (logical-channelconfig), for each bearer, or for each PDCP device (PDCP-config). More specifically, each logical channel, each bearer, or each PDCP device (or each SDAP device) may indicate an IP flow or a QoS flow for which the UDC is used (or information on an IP flow or a QoS flow for which the UDC is used or not used may be configured in the SDAP device, and the SDAP may inform the PDCP device of whether to use the UDC for each QoS flow, or the PDCP device may identify each QoS flow by itself and determine whether to apply the UDC). Further, if the use of the UDC is indicated, a predefined library to be used for the UDC, an identifier of dictionary information, or a buffer size to be used for the UDC may be indicated. The message may include a setup or release instruction to perform uplink compression release. When the use of the UDC is configured, a corresponding RLC mode may be always configured as an RLC AM bearer (mode having no loss due to an ARQ function and a retransmission function) and may be configured without an ROHC. The message may indicate whether to use a function of the SDAP layer entity for each logical channel (logicalchannelconfig), for each bearer, or for each PDCP device (PDCP-config) or whether to use the SDAP header and indicate whether to apply an ROHC for each logical channel (logicalchannelconfig), for each bearer, or for each PDCP device (PDCP-config), and whether to apply the ROHC to each of the uplink and the downlink may be configured through an indicator. However, the ROHC and the UDC cannot be simultaneously configured for one PDCP layer entity, logical channel, or bearer, and the UDC may be configured for a maximum of two bearers. The message may include information indicating whether to apply integrity protection and integrity verification for each logical channel (logicalchannelconfig), for each bearer, or for each PDCP device (PDCP-config), which may be configured in consideration of a maximum data transmission rate of the corresponding PDCP layer entity, bearer, or logical channel. When UDC, ROHC, or integrity protection is configured for each logical channel, for each bearer, or for each PDCP device, whether to use the same may be configured for each of the uplink and the downlink. That is, the function may be configured to be used in the uplink but not in the downlink. Inversely, the function may be configured to be used in the downlink but not in the uplink.

The disclosure describes a method of solving the problem occurring due to the mapping operation between the QoS flow and the DRB in the NR system unlike the LTE system. Basically, in the LTE system, the EPS bearer and the DRB have 1:1 mapping, and the configured mapping is maintained until the corresponding service ends. On the other hand, in the NR system, mapping between the QoS flow and the DRB may be dynamically configured, and thus a specific QoS flow may be mapped to a DRB different from the initially configured DRB. Further, as described above, the gNB may recognize that a new QoS flow has been transmitted through a specific DRB only when the eNB receives a first packet of the new QoS flow transmitted by the UE. However, if there is a large amount of data of another QoS flow buffered in the corresponding DRB, the gNB may have a delay to recognize that the new QoS flow has been transmitted, and may transmit a reception packet of a new DRB to a higher layer after identifying completion of reception of the packet transmitted through the previous DRB for a data packet having the same QoS flow ID as the gNB. This is for a basic SDAP procedure to guarantee an in-order delivery.

That is, a frequent QoS flow mapping update operation at a receiving side may be prevented by guaranteeing the in-order delivery of data packets in a changed DRB and a previous DRB when another QoS is remapped to the DRB, and the SDAP device (of the UE or the gNB) indicates starts of transmission of a new data packet by transmitting an SDAP control PDU, which serves as an "end marker" after transmission of the last data packet in the previous DRB. In uplink transmission, particularly, in QoS re-mapping, the UE may transmit an SDAP control PDU after transmitting the last data packet in the previous DRB, and a receiving side of the gNB may identify validity of a data packet received through a new DRB by receiving the SDAP control PDU through the previous DRB. At this time, the PDCP entity may need an operation of distinguishing and differentially processing the SDAP data PDU and the SDAP control PDU, and relevant operations may include integrity protection, ciphering, and header compression.

The disclosure proposes an operation of the PDCP entity according to whether the SDAP control PDU is received and a condition of transmission of the SDAP control PDU by a target cell when a handover is generated.

Figure 18:
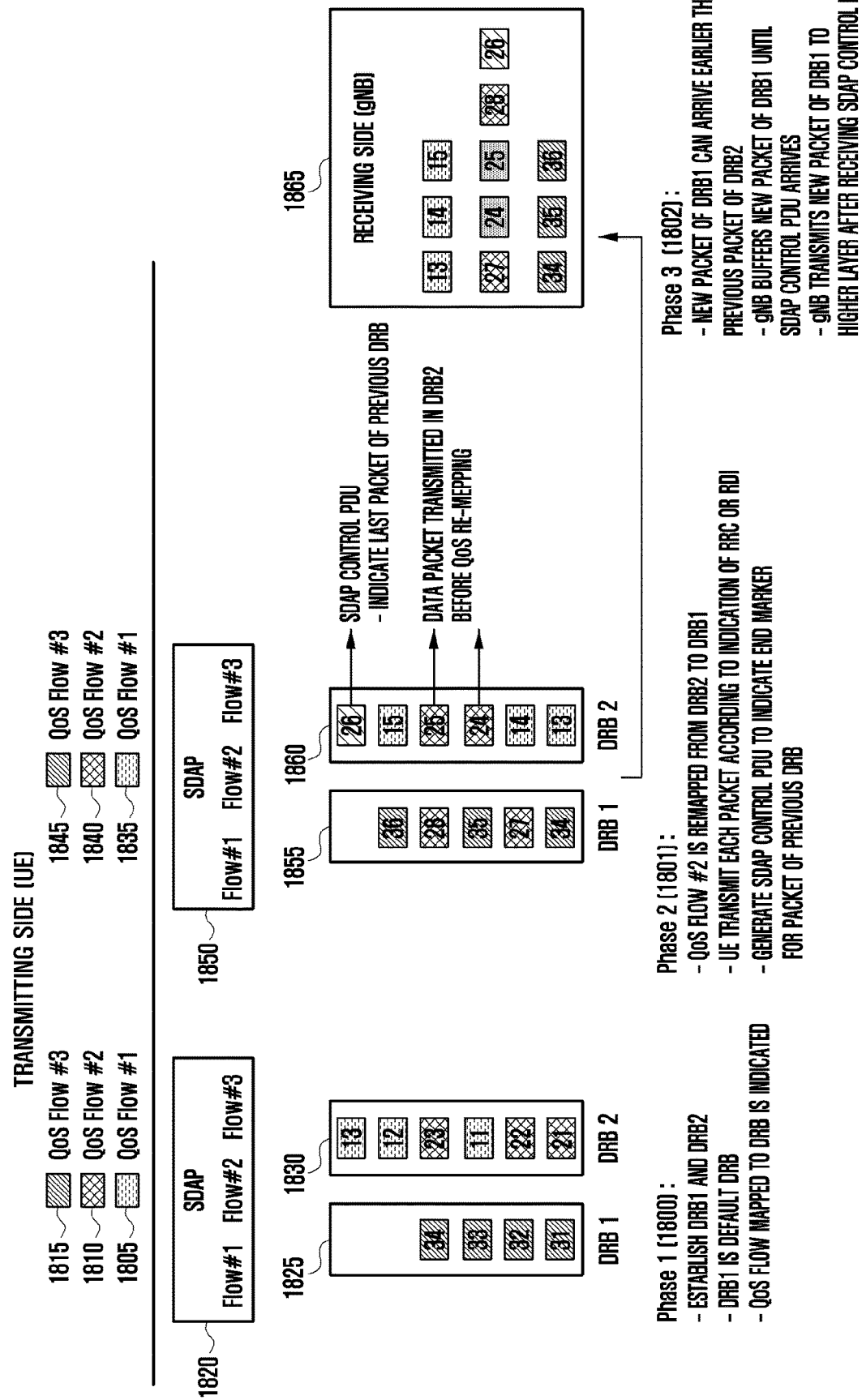
FIG. 18 illustrates a method of applying an SDAP control PDU.

FIG. 18 illustrates a method of applying the SDAP control PDU for indicating the last packet transmitted through the previous DRB when DRB mapping to a specific QoS flow is changed in the next-generation mobile communication system. Basically, FIG. 18 is based on uplink transmission of the UE.

In phase #1 1800, the UE receives a configuration of DRBs through an RRC message from the gNB. The configuration includes configuration information of detailed layers (MAC, RLC, and PDCP) of the DRBs, information indicating a DRB through which each QoS flow is transmitted, and information indicating a default DRB. On a transmitting side of the UE, an SDAP layer 1820 transmits each of QoS flows 1805, 1810, and 1815 through initially configured DRBs, that is, packet transmission for an operation of transmitting data to lower layers of specific DRBs (DRB #1 1825 and DRB #2 1830) is performed. In FIG. 18, QoS flow #1 1805 and QoS flow #2 1810 may be configured in DRB #2 1830 and QoS flow #3 1815 may be mapped to DRB #1 1825, and DRB #1 1825 is configured as a default DRB.

In NR, mapping between the DRB and the QoS flow may be changed in both the case of the handover and the case other than the handover, and the DRB to which the QoS flow is mapped may be changed from the previous DRB to another DRB due to a change in the mapping rule. Alternatively, if a newly generated uplink packet does not satisfy a mapping rule configured through RRC or a reflective QoS mapping rule, the packet of the corresponding QoS flow is transmitted through the default DRB. As described above, if mapping of the DRB of a new uplink packet or a packet having a specific QoS flow is changed, the UE transmits the packet corresponding to the corresponding QoS flow through the default DRB or the changed DRB.

In phase #2 1801, if QoS flows 1835, 1840, and 1845 are mapped to new DRBs, the SDAP layer 1850 distinguishes corresponding SDAP SDUs and transmits the SDAP PUDs to the corresponding DRB and lower layer. In this example, the DRB of QoS flow #2 1840 is changed from DRB #2 1860 to DRB #1 1855, which is the default DRB. A time point at which the change is made is after a 26th SDAP PDU of QoS flow #2 is transmitted and before a 27th SDAP PDU is transmitted, and previous SDAP PDUs may be transmitted through DRB #2 1860 and corresponding SDAP PDUs may be transmitted through DRB #1 1855 after the mapping rule is changed. The numbers of the SDAP PDUs are number only for helping understanding rather than actually existing numbers.

However, sequences thereof actually arriving at the receiving side may vary due to a difference in packets stored in a transmission buffer in every DRB. That is, a new packet of DRB #1 1855 (27th packet of QoS flow #2) may be received earlier than packets of previous DRB #2 1860 (24th, 25th, and 26th packets of QoS flow #2).

In NR, an in-order delivery should be guaranteed even when the DRB is remapped. Even though the receiving side of the gNB receives a packet through a new DRB, if the packet for the corresponding QoS flow has not been completely received in the previous DRB, the gNB cannot transmit the newly received packet to a higher layer. Accordingly, in order to help the receiving side of the gNB in identifying whether the last packet transmitted through the previous DRB is received, the UE may transmit an SDAP control PDU, which serves as an "end marker" to indicate the last packet transmitted through the previous DRB for the corresponding QoS flow in which DRB remapping is configured. The SDAP control PDU may include QoS flow ID information and a 1-bit indicator indicating a control or data packet, and may indicate that transmission of the last packet has been completed for the indicated QoS flow ID.

In phase #3 1803, the receiving side of the gNB receives packets which the UE transmits, and sequences of the received packets vary depending on an amount of data in a buffer in every DRB in step 1865. That is, a packet of QoS flow #2 received through DRB #1 1855 may be received earlier than a packet of QoS flow #2 received through DRB #2 1860, and thus the in-order delivery cannot be directly applied. If the receiving side of the gNB receives the SDAP control PDU (26th packet of QoS flow #2), the receiving side may know that all packets of QoS flow #2 are received through the corresponding DRB. That is, immediately after receiving the SDAP control PDU, the receiving of the gNB transmits 27th and 28th packets of QoS flow #2 that have been already received through a new DRB and have been stored in a reception buffer to a higher (upper) layer.

FIG. 19 illustrates a structure of the SDAP control PDU applied to the disclosure.

As illustrated in FIG. 19, the SDAP control PDU may have a structure having a fixed size of 1 byte or a variable size for a plurality of QoS flows.

The SDAP control PDU may include a 1-bit indicator for identifying a control PDU 1905 or a data PDU 1920, and may be identified as the SDAP control PDU therethrough. Reference numerals 1910 and 1935 are spare bits for the future function, and reference numerals 1915, 1930, and 1945 indicate QoS flow IDs indicated by the corresponding SDAP control PDU through 6 bits. The QoS flow ID may have the same value as the QFI of the corresponding data packet of the SDAP header and correspond to the same QFI as the packet mapped to the new DRB, which indicates the last data packet transmitted in the previous DRB. In order to indicate a plurality of QFIs in one SDAP control PDU, an indicator indicating that additional 1 byte, that is, additional QFI information is included may be included in the SDAP control PDU as indicated by reference numerals 1925 and 1940.

Figure 20:
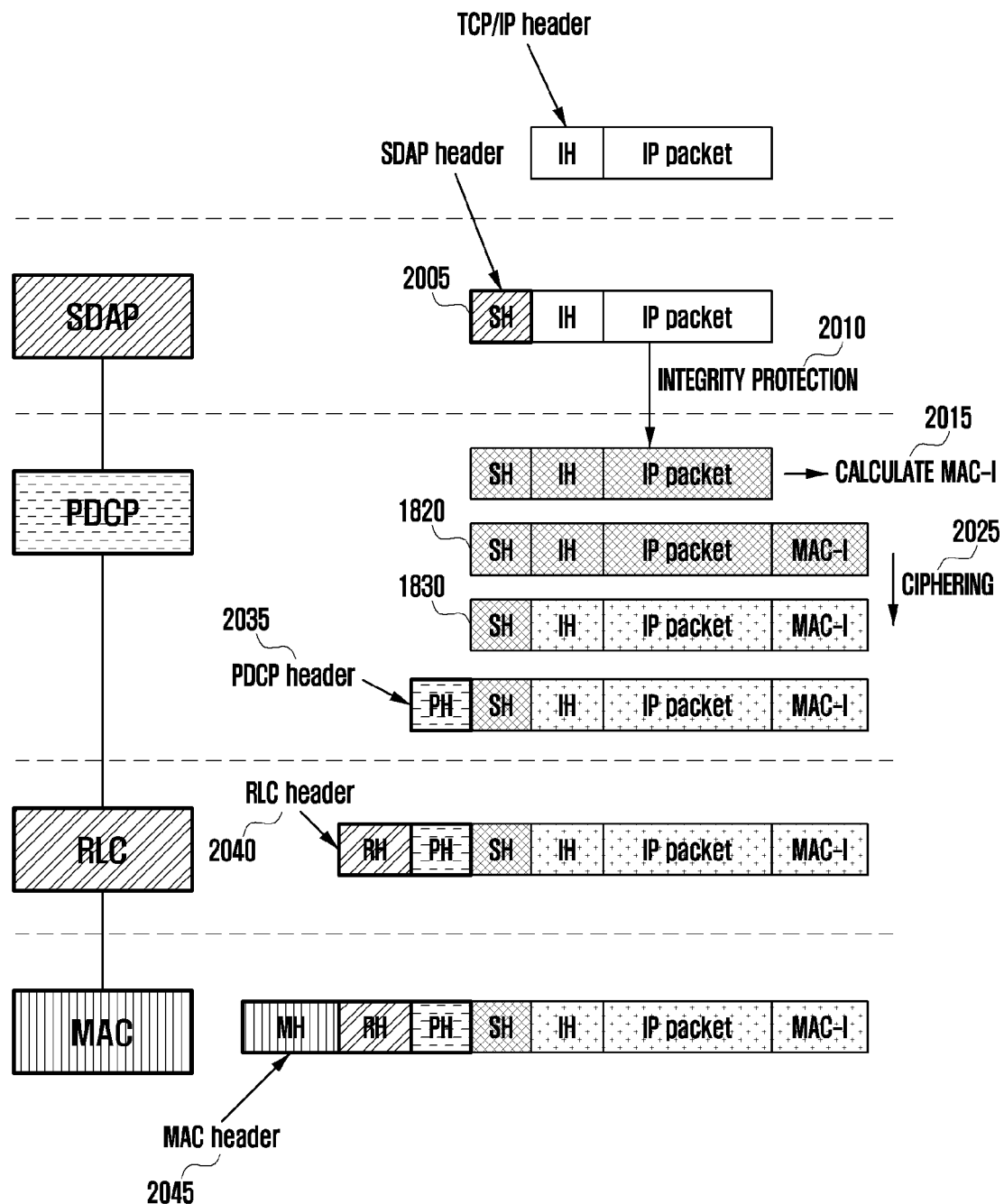
FIG. 20 illustrates a first operation for processing the SDAP data PDU applied to the disclosure.

FIG. 20 illustrates a first operation for processing the SDAP data PDU applied to the disclosure, which corresponds to a procedure of generating an SDAP header for data received from a higher layer, performing header compression (ROHC or UDC) on a PDCP SDU by a PDCP layer entity, and then applying integrity protection to the SDAP header for the header-compressed PDCP SDU without ciphering.

In FIG. 20, if the use of the SDAP layer entity function or the use of the SDAP header is configured by the RRC message indicated by reference numeral 1710, 1740, or 1775 of FIG. 17 and if the use of integrity protection and integrity verification is configured, upon receiving data from a higher layer, the SDAP layer entity may generate and configure the SDAP header as indicated by reference numeral 2005 and transmit the SDAP header to the PDCP layer entity.

If header compression is configured, the PDCP layer entity performs header compression (ROHC and UDC) on the received PDCP SDU. Further, if integrity protection is configured, the PDCP layer entity may perform integrity protection on the PDCP SDU (SDAP header and IP packet) 2005 received from the higher SDAP layer entity and calculate message authentication code for integrity (MAC-I). When the MAC-I is calculated, a PDCP COUNT value, an uplink or downlink indicator, a bearer identifier, a security key, or data itself (part on which integrity protection is performed) may be an input value of an integrity protection algorithm. The calculated MAC-I may be concatenated with a back part of the data as indicated by reference numeral 2020. The MAC-I may have a predetermined size, for example, 4 bytes.

The PDCP layer entity ciphers 2020 with which the MAC-I is concatenated except for the SDAP header (i.e. ciphers the MAC-I) as indicated by reference numeral 2225, generate, configure, and concatenate a PDCP header as indicated by reference numeral 2035, and transmit the data to a lower data, and the data may be processed by the RLC layer entity and the MAC layer entity as indicated by reference numerals 2040 and 2045.

The receiving side removes the MAC header and the RLC header and transfers data to the PDCP layer, and the reception PDCP layer entity reads the PDCP header and then deciphers a data part except for the SDAP header. The reception PDCP layer entity performs integrity verification on the SDAP header, a higher layer header (for example, a TCP/IP header), and the data part and calculates X-MAC (computed MAC-I). When the X-MAC is calculated, a PDCP COUNT value, an uplink or downlink indicator, a bearer identifier, a security key, or data itself (part on which integrity protection is performed) may be an input value of an integrity protection algorithm. The reception PDCP layer entity identifies whether the calculated X-MAC is the same as the MAC-I value added to the back part of the received data. If the values are the same as each other, the integrity verification is successful. If the values are not the same as each other, the integrity verification has failed, and thus the data is discarded and a report indicating that the integrity verification has failed is transmitted to a higher layer (for example, the RRC layer).

Figure 21:
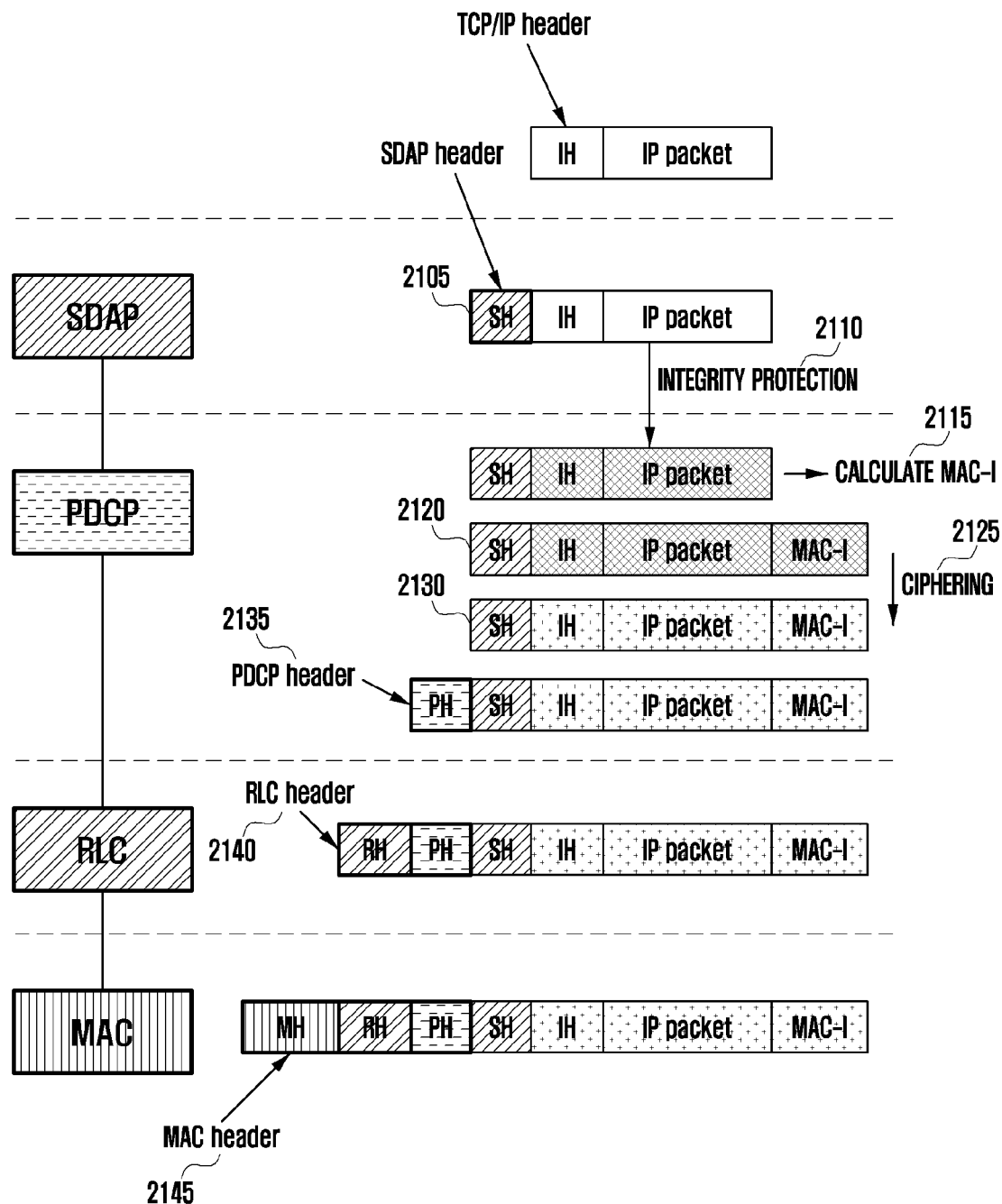
FIG. 21 illustrates a second operation for processing the SDAP data PDU applied to the disclosure.

FIG. 21 illustrates a second operation for processing the SDAP data PDU applied to the disclosure, which corresponds to a procedure of generating an SDAP header for data received from a higher layer, performing header compression (ROHC or UDC) on a PDCP SDU by a PDCP layer entity, and then applying integrity protection to the SDAP header for the header-compressed PDCP SDU without ciphering.

In FIG. 21, if the use of the SDAP layer entity function or the use of the SDAP header is configured by the RRC message indicated by reference numeral 1710, 1740, or 1775 of FIG. 17 and if the use of integrity protection and integrity verification is configured, upon receiving data from a higher layer, the SDAP layer entity may generate and configure the SDAP header as indicated by reference numeral 2105 and transmit the SDAP header to the PDCP layer entity. If header compression is configured, the PDCP layer entity performs header compression (ROHC and UDC) on the received PDCP SDU. Further, if integrity protection is configured, the PDCP layer entity may perform integrity protection only on data (IP packet) except for the SDAP header for the PDCP SDU (SDAP header and IP packet) 2105 received from the higher SDAP layer entity and calculate message authentication code for integrity (MAC-I). When the MAC-I is calculated, a PDCP COUNT value, an uplink or downlink indicator, a bearer identifier, a security key, or data itself (part on which integrity protection is performed) may be an input value of an integrity protection algorithm. The calculated MAC-I may be concatenated with a back part of the data as indicated by reference numeral 2120. The MAC-I may have a predetermined size, for example, 4 bytes.

The PDCP layer entity ciphers the data as indicated by reference numeral 2120 with which the MAC-I is concatenated except for the SADP header as indicated by reference numeral 2125, generates, configures, and concatenates a PDCP header as indicated by reference numeral 2135, and transmits the data to a lower data, and the data may be processed by the RLC layer entity and the MAC layer entity as indicated by reference numerals 2140 and 2145. The MAC-I is also ciphered.

The receiving side removes the MAC header and the RLC header and transfers data to the PDCP layer, and the reception PDCP layer entity reads the PDCP header and the SDAP header, and then deciphers a data part except for the SDAP header. The MAC-I is also deciphered. The reception PDCP layer entity performs integrity verification on a higher layer header (for example, a TCP/IP header) and the data part except for the SDAP header and calculates X-MAC (computed MAC-I). When the X-MAC is calculated, a PDCP COUNT value, an uplink or downlink indicator, a bearer identifier, a security key, or data itself (part on which integrity verification is performed) may be an input value of an integrity verification algorithm. The reception PDCP layer entity identifies whether the calculated X-MAC is the same as the MAC-I value added to the back part of the received data. If the values are the same as each other, the integrity verification is successful. If the X-MAC and MAC-I values are not the same as each other, the integrity verification has failed, and thus the data is discarded and a report indicating that the integrity verification has failed is transmitted to a higher layer (for example, the RRC layer).

If the SDAP header is not ciphered or if the integrity protection is not performed, the structure of the gNB can be easily implemented. Particularly, a central unit (CU) does not cipher the SDAP header in a CU-distributed unit (DU) split structure, a DU may read the SDAP header, identify QoS information, and apply the QoS information to scheduling, thereby facilitating the control of QoS. Further, in implementation of the UE and the gNB, there is a gain from an aspect of data processing.

Figure 22:
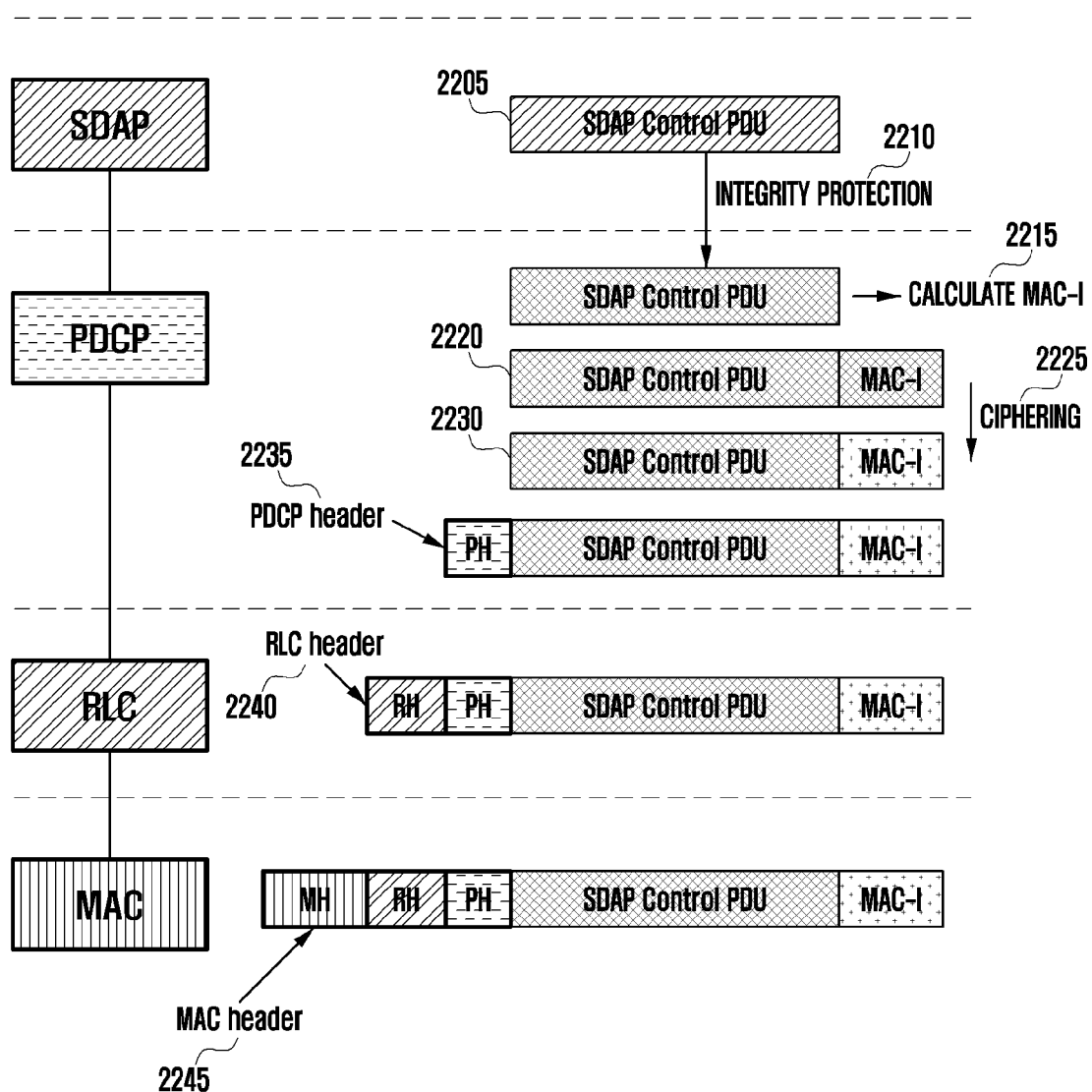
FIG. 22 illustrates a first operation for processing an SDAP control PDU applied to the disclosure.

FIG. 22 illustrates a first operation for processing the SDAP control PDU applied to the disclosure, which corresponds to a procedure in which the PDCP layer entity receiving the SDAP control PDU does not perform header compression (ROHC and UDC) on the PDCP SDU, applies integrity protection on the SDAP control PDU for the received PDCP SDU without ciphering, and ciphers only the MAC-I.

In FIG. 22, if the mapping rule between QoS flow and the DRB is changed through an RRC message from the gNB or an RDI, the SDAP layer entity of the UE may generate an SDAP control PDU as indicated by reference numeral 2205 which serves as an "end marker" for the last packet transmitted in the previous DRB including a specific QoS flow ID and transfer the SDAP control PDU to the PDCP layer entity. A detailed description of the SDAP control PDU has been made with reference to FIGS. 18 and 19.

Thereafter, the PDCP layer entity does not perform header compression (ROHC and UDC) on the received PDCP SDU (that is, the SDAP control PDU). This is because the header compression can be applied to the IP packet but the PDCP SDU does not need to be compressed since the PDCP SDU is a control signal having a length of 1 byte or including a plurality of pieces of control information and thus has no IP header or IP packet payload. Further, if integrity protection is configured (or integrity protection is defined as a default operation), the PDCP layer entity may perform integrity protection on the PDCP SDU 2205 (SDAP control PDU) received from the higher SDAP layer entity and calculate message authentication code for integrity (MAC-I). When the MAC-I is calculated, a PDCP COUNT value, an uplink or downlink indicator, a bearer identifier, a security key, or data itself (part on which integrity protection is performed) may be an input value of an integrity protection algorithm. The calculated MAC-I may be concatenated with a back part of the data as indicated by reference numeral 2220. The MAC-I may have a predetermined size, for example, 4 bytes.

The PDCP layer entity ciphers 2220 with which the MAC-I is concatenated except for the SADP control PDU (that is, ciphers the MAC-I) as indicated by reference numeral 2225, generates, configures, and concatenates a PDCP header as indicated by reference numeral 2235, and transmits the data to a lower layer, and the data may be processed by the RLC layer entity and the MAC layer entity as indicated by reference numerals 2240 and 2245.

The receiving side removes the MAC header and the RLC header and transfers data to the PDCP layer, and the reception PDCP layer entity reads and removes the PDCP header, and then deciphers the remaining part except for 1-byte data (SDAP header or SDAP control PDU). That is, in the embodiment, deciphering of the 1-byte SDAP control PDU is omitted. The reception PDCP layer entity performs integrity verification on the corresponding SDAP control PDU and calculates X-MAC (computed MAC-I). When the X-MAC is calculated, a PDCP COUNT value, an uplink or downlink indicator, a bearer identifier, a security key, or data itself (part on which integrity protection is performed) may be an input value of an integrity protection algorithm. The PDCP layer entity identifies whether the calculated X-MAC is the same as the MAC-I value added to the back part of the received data. If the values are the same as each other, the integrity verification is successful. If the X-MAC and MAC-I values are not the same as each other, the integrity verification has failed, and thus the data is discarded and a report indicating that the integrity verification has failed is transmitted to a higher layer (for example, the RRC layer). For reference, the PDCP layer may check a first bit of a first byte of the received packet to identify whether the packet corresponds to the SDAP control PDU. It is the role of the SDAP layer, but may be applied by the PDCP layer in implementation.

Figure 23:
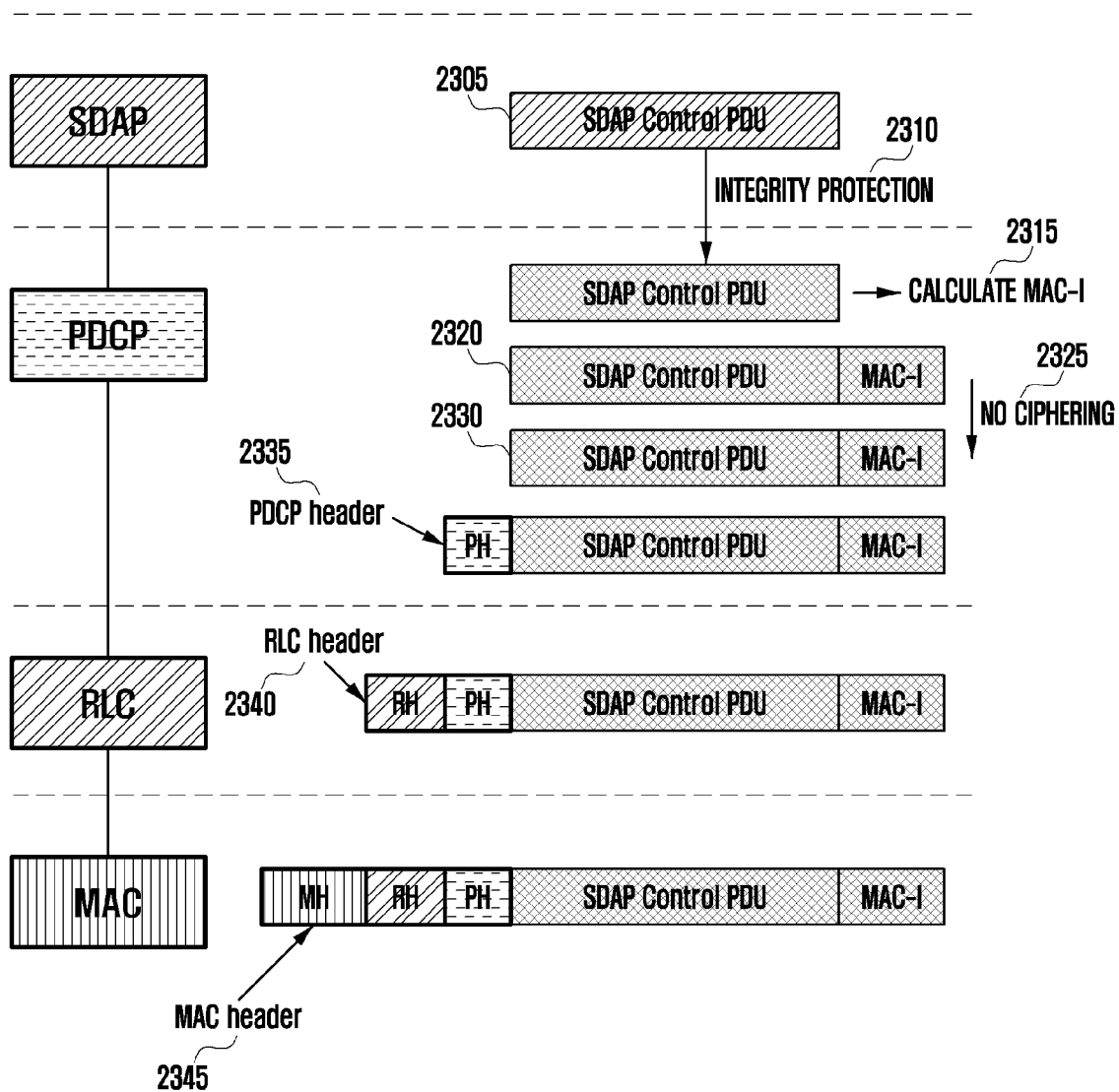
FIG. 23 illustrates a second operation for processing an SDAP control PDU applied to the disclosure.

FIG. 23 illustrates a second operation for processing the SDAP control PDU applied to the disclosure, which corresponds to a procedure in which the PDCP layer entity receiving the SDAP control PDU does not perform header compression (ROHC and UDC) on the PDCP SDU, applies integrity protection on the SDAP control PDU for the received PDCP SDU without ciphering.

In FIG. 23, if the mapping rule between QoS flow and the DRB is changed through an RRC message from the gNB or an RDI, the SDAP layer entity of the UE may generate an SDAP control PDU as indicated by reference numeral 2305 which serves as an "end marker" for the last packet transmitted in the previous DRB including a specific QoS flow ID and transfer the SDAP control PDU to the PDCP layer entity. A detailed description of the SDAP control PDU has been made with reference to FIGS. 18 and 19. Thereafter, the PDCP layer entity does not perform header compression (ROHC and UDC) on the received PDCP SDU (that is, the SDAP control PDU). This is because the header compression can be applied to the IP packet but the PDCP SDU does not need to be compressed since the PDCP SDU is a control signal having a length of 1 byte or including a plurality of pieces of control information and thus has no IP header or IP packet payload. Further, if integrity protection is configured (or integrity protection is defined as a default operation), the PDCP layer entity may perform integrity protection on the PDCP SDU (SDAP control PDU) 2305 received from the higher SDAP layer entity and calculate message authentication code for integrity (MAC-I). When the MAC-I is calculated, a PDCP COUNT value, an uplink or downlink indicator, a bearer identifier, a security key, or data itself (part on which integrity protection is performed) may be an input value of an integrity protection algorithm. The calculated MAC-I may be concatenated with a back part of the data as indicated by reference numeral 2320. The MAC-I may have a predetermined size, for example, 4 bytes. The PDCP layer entity does not cipher 2320 with which the MAC-I is concatenated as indicated by reference numeral 2325, generates, configures, and concatenates a PDCH header as indicated by reference numeral 2335, and transmits the data to a lower layer, and the data may be processed by the RLC layer entity and the MAC layer entity as indicated by reference numerals 2340 and 2345.

The receiving side removes the MAC header and the RLC header and transfers data to the PDCP layer, and the reception PDCP layer entity reads the PDCP header and transfers data to a higher layer. That is, in the embodiment, deciphering of the received PDCP SDU is omitted. The reception PDCP layer entity performs integrity verification on the corresponding SDAP control PDU (that is, the remaining PDCP SDU except for MAC-I) and calculates X-MAC (computed MAC-I). When the X-MAC is calculated, a PDCP COUNT value, an uplink or downlink indicator, a bearer identifier, a security key, or data itself (part on which integrity protection is performed) may be an input value of an integrity protection algorithm. The reception PDCP layer entity identifies whether the calculated X-MAC is the same as the MAC-I value added to the back part of the received data. If the values are the same as each other, the integrity verification is successful. If the X-MAC and MAC-I values are not the same as each other, the integrity verification has failed, and thus the data is discarded and a report indicating that the integrity verification has failed is transmitted to a higher layer (for example, the RRC layer). For reference, the PDCP layer may check a first bit of a first byte of the received packet to identify whether the packet corresponds to the SDAP control PDU. It is the role of the SDAP layer, but may be applied by the PDCP layer in implementation.

Figure 24:
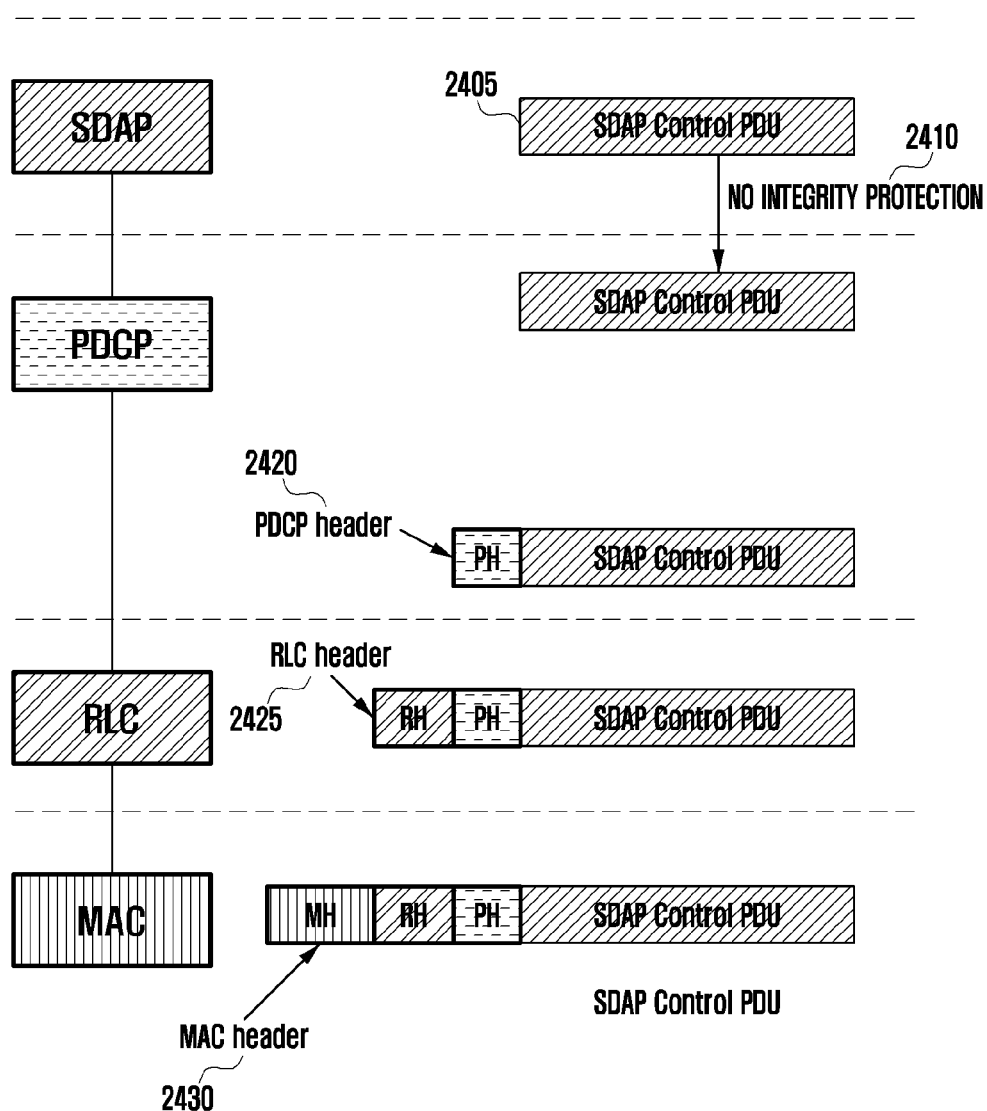
FIG. 24 illustrates a third operation for processing an SDAP control PDU applied to the disclosure.

FIG. 24 illustrates a third operation for processing the SDAP control PDU applied to the disclosure, which corresponds to a procedure in which the PDCP layer entity receiving the SDAP control PDU does not perform header compression (ROHC and UDC) on the PDCP SDU, does not apply integrity protection on the SDAP control PDU for the received PDCP SDU, and does not perform ciphering.

In FIG. 24, if the mapping rule between QoS flow and the DRB is changed through an RRC message from the gNB or an RDI, the SDAP layer entity of the UE may generate an SDAP control PDU as indicated by reference numeral 2405 which serves as an "end marker" for the last packet transmitted in the previous DRB including a specific QoS flow ID and transfer the SDAP control PDU to the PDCP layer entity. A detailed description of the SDAP control PDU has been made with reference to FIGS. 18 and 19. Thereafter, the PDCP layer entity does not perform header compression (ROHC and UDC) on the received PDCP SDU (that is, the SDAP control PDU). This is because the header compression can be applied to the IP packet but the PDCP SDU does not need to be compressed since the PDCP SDU is a control signal having a length of 1 byte or including a plurality of pieces of control information and thus has no IP header or IP packet payload. If integrity protection is not configured (or integrity protection is not defined as a default operation), the PDPC layer entity may not perform integrity protection on a PDCP SDU (SDAP control PDU) 2405 received from the higher SDAP layer entity as indicated by reference numeral 2410, add a PDCP header 2420 to the received 1-byte PDCP SDU, and transfer data to a lower layer, and the data may be processed by the RLC layer entity and the MAC layer entity as indicated by reference numerals 2425 and 2430.

The receiving side removes the MAC header and the RLC header and transfers data to the PDCP layer, and the reception PDCP layer entity reads the PDCP header and transfers data to a higher layer. That is, in the embodiment, deciphering of the received PDCP SDU is omitted. The reception PDCP layer entity omits integrity verification on the corresponding SDAP control PDU (that is, PDCP SDU) and transfers received data to a higher layer (for example, the RRC layer). That is, upon receiving the 1-byte PDCP SDU, the PDCP layer knows that the corresponding SDU is the SDAP control PDU and performs the operation. That is, the reception PDCP layer entity omits all of the header decompression, deciphering, and integrity verification operation and directly transfers the received PDCP SDU to the higher layer.

Figure 25:
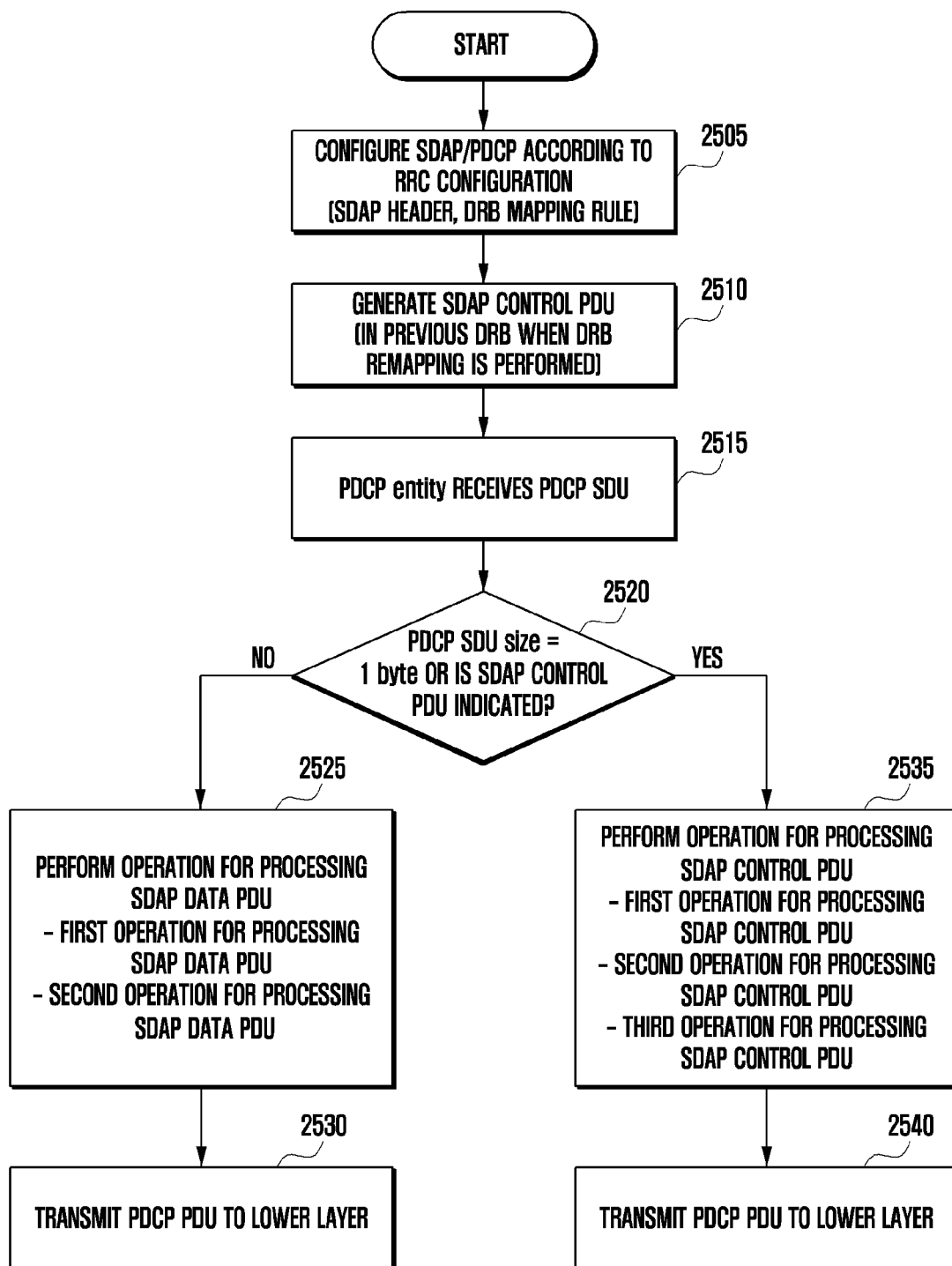
FIG. 25 corresponds to embodiment 2-1 applied to the disclosure and illustrates a UE operation.

FIG. 25 is embodiment 2-1 applied to the disclosure and illustrates the operation of the uplink transmission SDAP and PDCP layer entities of the UE for separately processing the SDAP data PDU and the SDAP control PDU.

In step 2505, the UE receives an SDAP and PDCP configuration from the gNB through the RRC configuration. The SDAP configuration may include an SDAP header configuration and mapping information between QoS flow and a DRB, and the PDCP configuration may include whether to apply integrity protection, header compression (ROHC and UDC), and a ciphering method. If remapping is performed from the DRB configured for a specific QoS flow to another DRB is performed, the UE performing data transmission/reception through the configuration identifies a transmission buffer of the previous DRB, transmits the last packet after transmitting the remaining packets, and then generates and transmits the SDAP control PDU in step 2510. At the same time, the following data packets are transmitted through the new DRB. In the operation of the UE in the above step, a PDCP entity of the UE may receive the PDCP SDU from an SDAP entity in step 2515, and the packet may be a data packet or a control packet. In step 2520, the PDCP entity identifies whether the received PDCP SDU is the SDAP control PDCU and performs different operations according thereto. In one method, if which the size of the received PDCP SDU is 1 byte or an indicator indicating that the corresponding packet from the SDAP entity is the SDAD control PDU is received, the received PDCP SDU is the SDAP control PDU. Inversely, if the size of the received PDCP SDU is larger than 1 byte, an indicator indicating that the corresponding packet from the SDAP entity is the SDAP data PDU is received, or an indicator indicating that the corresponding packet is the SDAP control PDU is not received, the PDCP entity considers the received PDCP SDU as the SDAP data PDU.

If the PDCP entity determines that the received PDCP SDU is the SDAP data PDU, the PDCP entity performs the first operation or the second operation for processing the SDAP data PDU in step 2525. A reference for distinguishing the operations is the performance or non-performance of integrity protection on the SDAP header, and a detailed operation has been described with reference to FIGS. 20 and 21 in detail. In step 2530, the PDCP entity of the UE transfers the PDCP PDU processed in the previous step to a lower layer.

If the PDCP entity determines that the received PDCP SDU is the SDAP control PDU, the PDCP entity performs the first operation, the second operation, or the third operation for processing the SDAP control PDU in step 2535. In the first operation for processing the SDAP control PDU, header compression is not performed on the received PDCP SDU, integrity protection is performed thereon, and ciphering is performed on the added MAC-I, which has been described in detail with reference to FIG. 22. In the second operation for processing the SDAP control PDU, header compression is not performed on the received PDCP SDU, integrity protection is performed thereon, and ciphering is not performed on the added MAC-I, which has been described in detail with reference to FIG. 23. In the third operation for processing the SDAP control PDU, header compression is not performed on the received PDCP SDU, integrity protection is not performed thereon, and ciphering is not performed on the added MAC-I, which has been described in detail with reference to FIG. 24. In step 2540, the PDCP entity of the UE transfers the PDCP PDU processed in the previous step to a lower layer.

Figure 26:
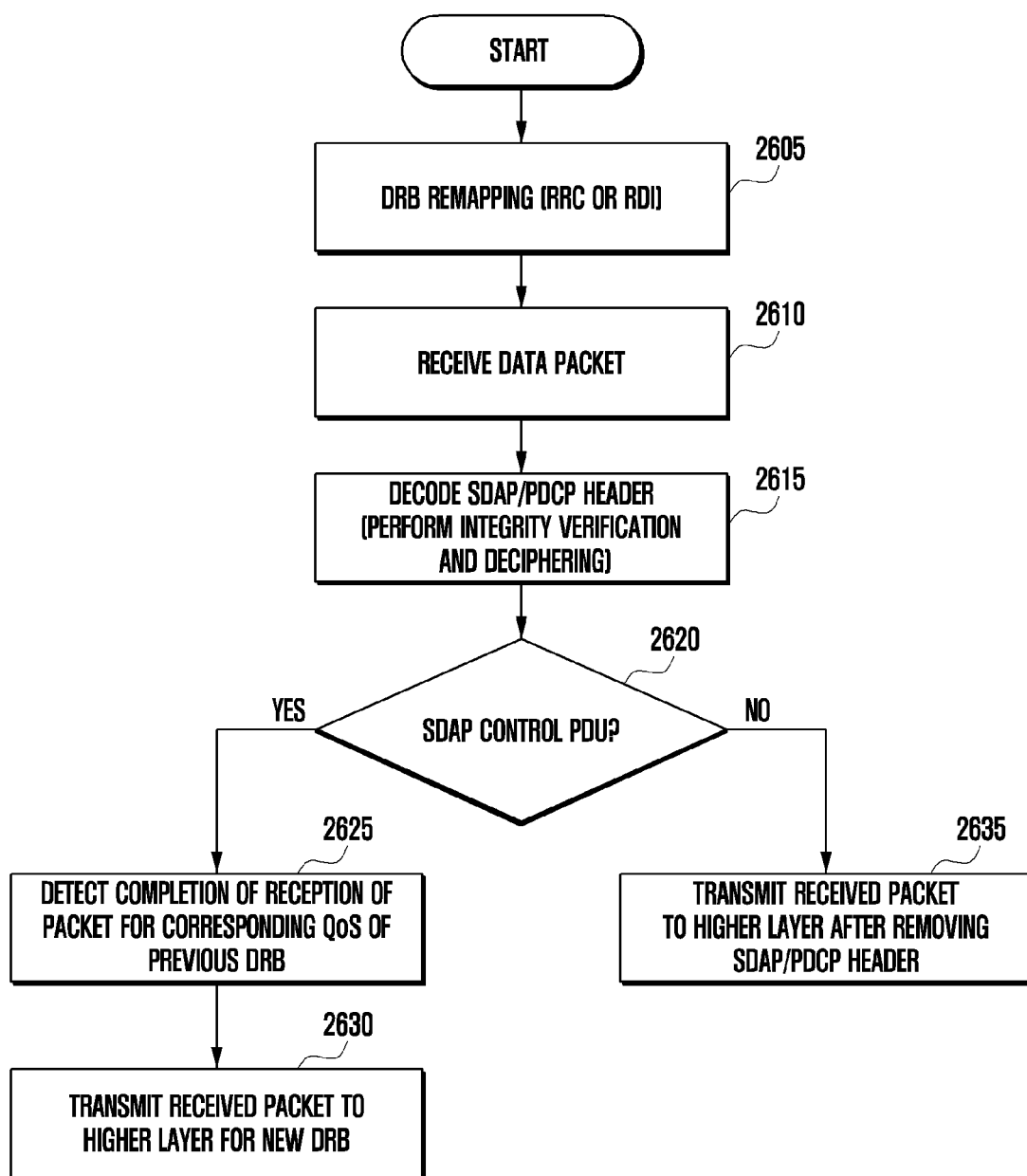
FIG. 26 corresponds to embodiment 2-1 applied to the disclosure and illustrates an eNB operation.

FIG. 26 is embodiment 2-1 applied to the disclosure and illustrates the operation of the uplink reception SDAP and PDCP layer entities of the gNB for separately processing the SDAP data PDU and the SDAP control PDU.

The gNB transmits an SDAP and PDCP configuration to the connected-state UE through an RRC configuration. The SDAP configuration may include an SDAP header configuration and mapping information between QoS flow and a DRB, and the PDCP configuration may include whether to apply integrity protection, header compression (ROHC and UDC), and a ciphering method. If remapping from the DRB configured to a specific QoS flow to another DRB is needed, the gNB performing data transmission/reception to/from the UE through the configuration indicates DRB remapping in step 2605. The indication may be transmitted through a DRB configuration via an RRC message or an RDI of the SAP data packet. In step 2610, the gNB receives all packets through the previous DRB and the changed DRB, and in order to guarantee an in-order delivery, should transfer, to a higher layer, a packet newly received after all of the packets received through the previous DRB are received for the specific QoS flow. In step 2615, the SDAP and PDCP layers of the gNB decode the header, and particularly, the PDCP layer performs header decompression, ciphering, and integrity check and verification according to a configuration.

If the SDAP entity of the gNB determines that the received packet is the PDCP control PDU for the corresponding QoS flow received through the previous DRB in step 2620, the SDAP entity determines that packet reception through the previous DRB is completed in step 2625 and transfers the packet received through the new DRB to the higher layer in step 2630.

If the SDAP entity of the gNB determines that the received packet is not the PDCP control PDU for the corresponding QoS flow received through the previous DRB in step 2620, the SDAP entity transfers the corresponding packet to the higher layer and continues reception through the corresponding DRB until the SDAP control PDU is received in step 2635.

Although FIGS. 25 and 26 illustrate the operations of the UE and the gNB in uplink transmission, respectively, the description of FIGS. 25 and 26 is not limited to uplink transmission and may be applied to downlink transmission.

Figure 27:
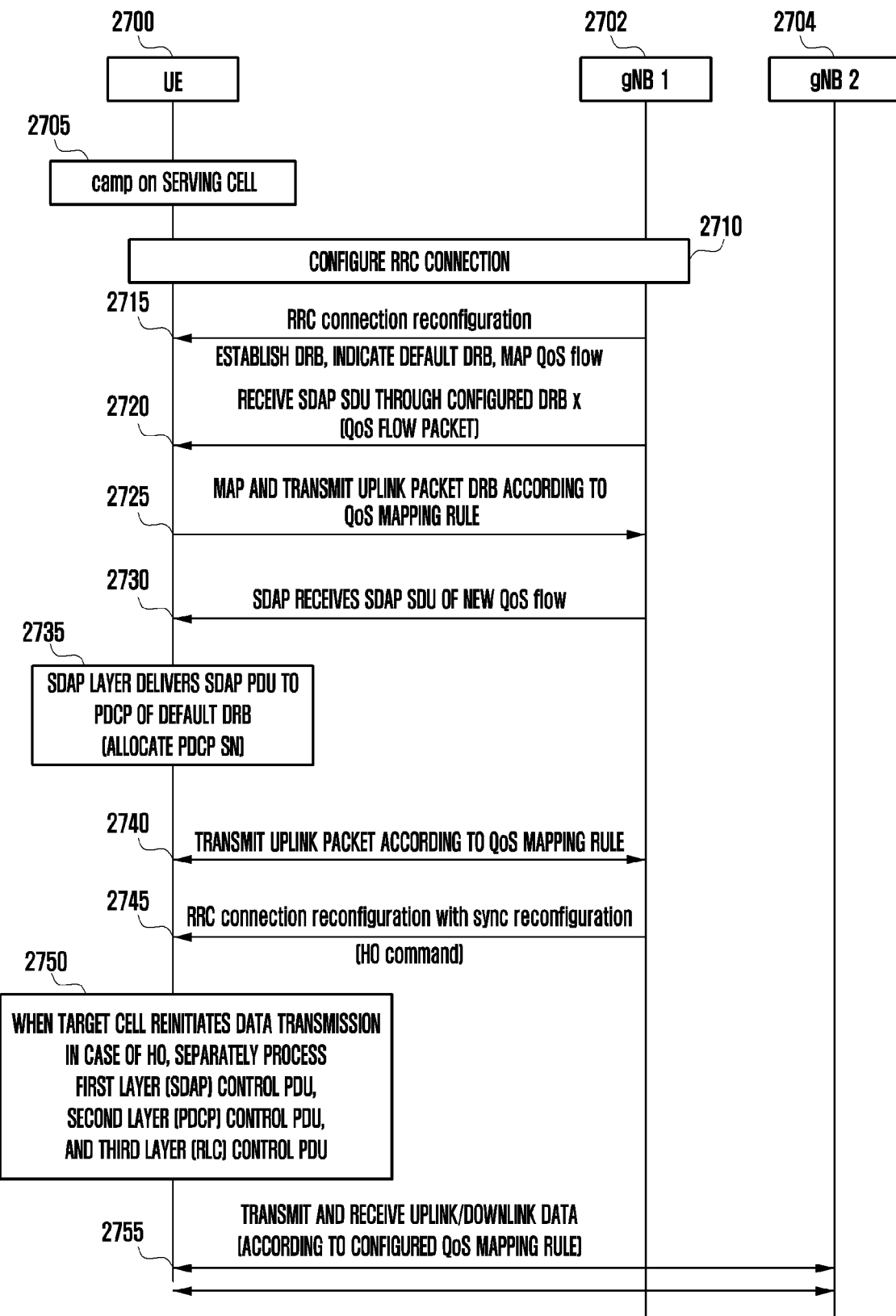
FIG. 27 corresponds to embodiment 2-2 applied to the disclosure and illustrates a method of processing a control PDU of each layer in a handover.

FIG. 27 is embodiment 2-2 applied to the disclosure and illustrates a method of processing a control PDU of each layer after a target cell initiates data transmission when a handover is performed.

The UE in an idle mode (RRC IDLE) searches for a suitable cell and camps on the corresponding gNB in step 2705, and then accesses the gNB for the reason of generation of data to be transmitted in step 2710. In the idle mode, the UE is not connected to the network to save power of the UE, so the UE cannot transmit data. In order to transmit data, the UE is required to switch to a connected mode (RRC CONNECTED). The camping means that the UE receives a paging message for determining whether downlink data is received while staying in the corresponding cell. If the UE successfully performs the procedure of access to the gNB, the UE switches to the connected mode (RRC CONNECTED) and the UE in the connected mode can transmit and receive data to and from the gNB. In step 2715, the UE receives a DRB configuration through an RRC connection reconfiguration configuration of the gNB. The corresponding configuration may include PDCP, RLC, logical channel configurations of DRBs, and particularly, include mapping information between a QoS flow and a DRB. Further, through an SDAP configuration, whether there is an SDAP header may be additionally configured.

In step 2720, the UE receives an SDAP SDU through a configured DRB x, and QoS flows received through a specific DRB are predetermined on the basis of the mapping relation with predetermined QoS flow IDs. The UE may transmit an uplink packet through a predetermined DRB according to a predetermined QoS mapping rule in step 2725, and receive an SDAP SDU of a new QoS flow in step 2730. This corresponds to the case in which DRB remapping of the specific QoS flow is performed, and corresponds to the case in which an RDI field value is changed in an SDAP header of the corresponding packet and the UE receives the packet of the corresponding QoS flow in the embodiment.

In step 2735, the SDAP layer of the UE transfers the SDAP PDU of the received new QoS flow to a PDCP of a default DRB, and the PDCP layer performs a relevant ciphering and deciphering operation, allocates a PDCP SN, and transfers the SDAP PDU to a lower layer. In step 2740, the UE and the gNB transmit an uplink packet and a downlink packet through a predetermined DRB according to a predetermined QoS mapping rule. In step 2745, if the UE receives a request for a handover to a specific target cell (hereinafter, referred to as gNB 2) from a serving cell (hereinafter, referred to as gNB 1), the UE performs the handover to the target cell. In step 2750, after the handover, the UE separately processes a control PDU of each layer. The disclosure proposes a method of processing the control PDU of each layer as described below.

A first layer (SDAP) control PDU is transmitted to a target cell if condition 1 below is satisfied, and is not transmitted to the target cell if condition 2 is satisfied.

Condition 1: A first layer control PDU is not transmitted from a source cell, or the first layer control PDU is transmitted but ACK of a third layer (RLC) is not received.

Condition 2: A first layer control PDU is transmitted from a source cell and ACK of a third layer is received by the source cell, or the third layer ACK is not received but a request for retransmission by a PDCP status PDU received by a target cell is not made.

If a control message (Reconfiguration with Sync) indicating a handover is received, a second layer (PDCP) control PDU is discarded from the UE. That is, the second layer control PDU is not transmitted to a target cell.

If a control message (Reconfiguration with Sync) indicating a handover is received, a third layer (RLC) control PDU is discarded from the UE. That is, the third layer control PDU is not transmitted to a target cell.

If remapping between the QoS flow and the DRB is performed, the SDAP control PDU is transmitted after transmission of the last data packet in the previous DRB, or if there is no more packet to be transmitted through the previous DRB, transmitted to serve as an "end marker" indicating that there is no data packet in the corresponding DRB. However, if the handover is indicated and the SDAP control PDU has not been transmitted in uplink data transmission even though the SDAP control PDU should have been transmitted in the previous DRB of the serving cell, transmission of an SDAP control PDU by the UE, which indicates whether the last packet is transmitted, even though a DRB to which the packet of the corresponding QoS flow is allocated through the target cell is helpful to the reception operation of the gNB since an in-order delivery should be guaranteed in the target cell.

Figure 28:
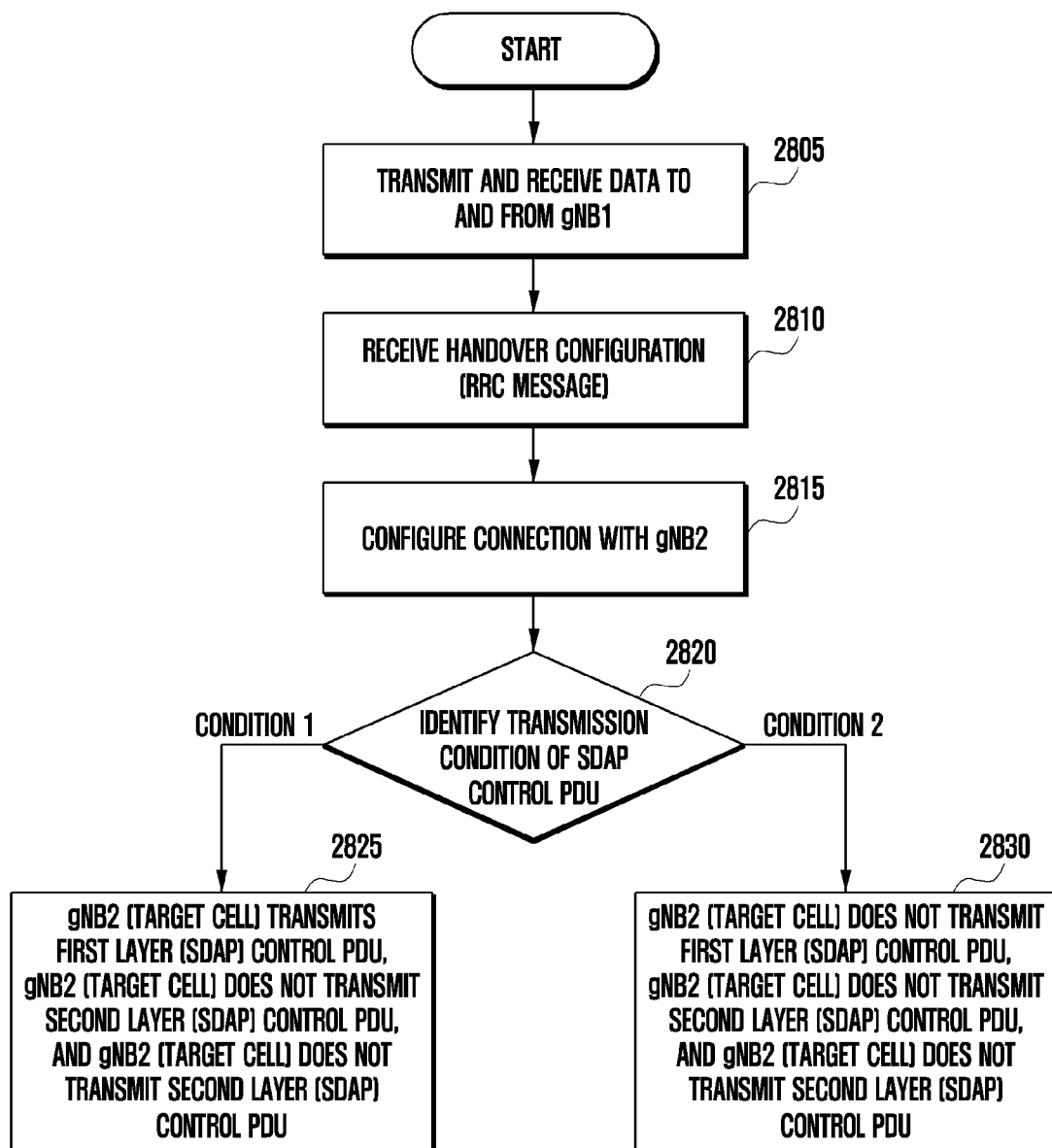
FIG. 28 illustrates an internal operation of the UE to which embodiment 2-2 of the disclosure is applied.

FIG. 28 illustrates an internal operation of the UE to which embodiment 2-2 of the disclosure is applied.

The UE transmits and receives data to and from a connected serving cell in step 2805, and then receives a request for a handover to a specific target cell from the corresponding cell and performs a handover procedure in step 2810. That is, in step 2815, the UE makes a configuration for a connection to the target cell and reinitiates data transmission and reception. The UE identifies a transmission condition of the SDAP control PDU after performing the handover to the target cell in step 2820. If condition 1 is satisfied, the target cell transmits a first layer (SDAP) control PDU and does not transmit a second layer (PDCP) control layer and a third layer (RLC) control PDU. If condition 2 is satisfied after, the UE performs the handover to the target cell and identifies a transmission condition of the SDAP control PDU in step 2820, the target cell does not transmit all of the first layer control PDU, the second layer control layer, and the third layer control PDU. Conditions 1 and 2 above comply with the description made with reference to FIG. 27.

Figure 29:
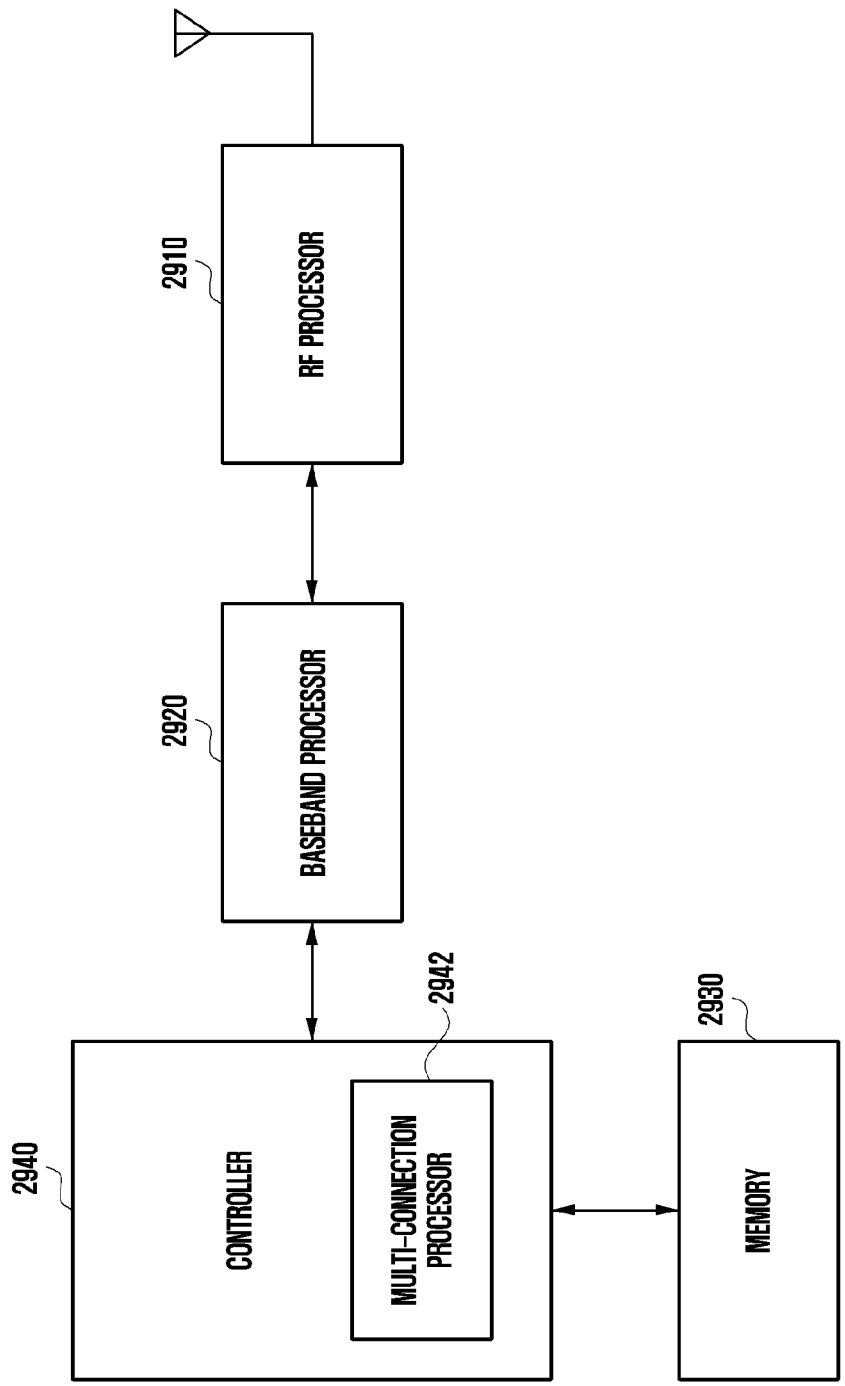
FIG. 29 is a block diagram illustrating an internal structure of the UE to which the disclosure is applied.

FIG. 29 is a block diagram illustrating an internal structure of the UE to which the disclosure is applied.

Referring to FIG. 29, the UE includes a radio frequency (RF) processor 2910, a baseband processor 2920, a memory 2930, and a controller 2940.

The RF processor 2910 performs a function for transmitting and receiving a signal through a radio channel, such as band conversion and amplification of a signal. That is, the RF processor 2910 up-converts a baseband signal provided from the baseband processor 2920 into an RF band signal, transmits the RF band signal through an antenna, and then down-converts the RF band signal received through the antenna into a baseband signal. For example, the RF processor 2910 may include a transmission filter, a reception filter, an amplifier, a mixer, an oscillator, a digital-to-analog converter (DAC), an analog-to-digital converter (ADC), and the like. Although FIG. 29 illustrates only one antenna, the UE may include a plurality of antennas. In addition, the RF processor 2910 may include a plurality of RF chains. Moreover, the RF processor 2910 may perform beamforming. For the beamforming, the RF processor 2910 may control a phase and a size of each of the signals transmitted/received through a plurality of antennas or antenna elements. The RF processor may perform MIMO and receive a plurality of layers when performing the MIMO operation.

The baseband processor 2920 performs a function for a conversion between a baseband signal and a bitstream according to a physical layer standard of the system. For example, in data transmission, the baseband processor 2920 generates complex symbols by encoding and modulating a transmission bitstream. In data reception, the baseband processor 2920 reconstructs a reception bit string through the demodulation and decoding of a baseband signal provided from the RF processor 2910. For example, in an orthogonal frequency division multiplexing (OFDM) scheme, when data is transmitted, the baseband processor 2920 generates complex symbols by encoding and modulating a transmission bitstream, maps the complex symbols to subcarriers, and then configures OFDM symbols through an inverse fast Fourier transform (IFFT) operation and a cyclic prefix (CP) insertion. Further, when data is received, the baseband processor 2920 divides the baseband signal provided from the RF processor 1910 in units of OFDM symbols, reconstructs the signals mapped to the subcarriers through a fast Fourier transform (FFT) operation, and then reconstructs the reception bitstream through demodulation and decoding.

The baseband processor 2920 and the RF processor 2910 transmit and receive signals as described above. Accordingly, the baseband processor 2920 or the RF processor 2910 may be referred to as a transmission unit, a reception unit, a transmission/reception unit, or a communicator. At least one of the baseband processor 2920 and the RF processor 2910 may include a plurality of communication modules in order to support a plurality of different radio access technologies. In addition, at least one of the baseband processor 2920 and the RF processor 2910 may include different communication modules to process signals of different frequency bands. For example, the different radio access technologies may include a wireless LAN (for example, IEEE 802.11) and a cellular network (for example, LTE). Further, the different frequency bands may include a SHF (for example, 2.5 GHz or 5 Ghz) band and a mm wave (for example, 60 GHz) band.

The memory 2930 stores data such as a basic program, an application program, and setting information for the operation of the UE. Particularly, the memory 2930 may store information related to a second access node for performing wireless communication using a second radio access technology. In addition, the memory 2930 provides data stored therein according to a request from the controller 2940.

The controller 2940 controls the overall operation of the UE. For example, the controller 2940 transmits and receives a signal through the baseband processor 2920 and the RF processor 2910. In addition, the controller 2940 may record data in the memory 2940 and read the data. To this end, the controller 2940 may include at least one processor. For example, the controller 2940 may include a communication processor (CP) that performs a control for communication, and an application processor (AP) that controls a higher layer such as an application.

Figure 30:
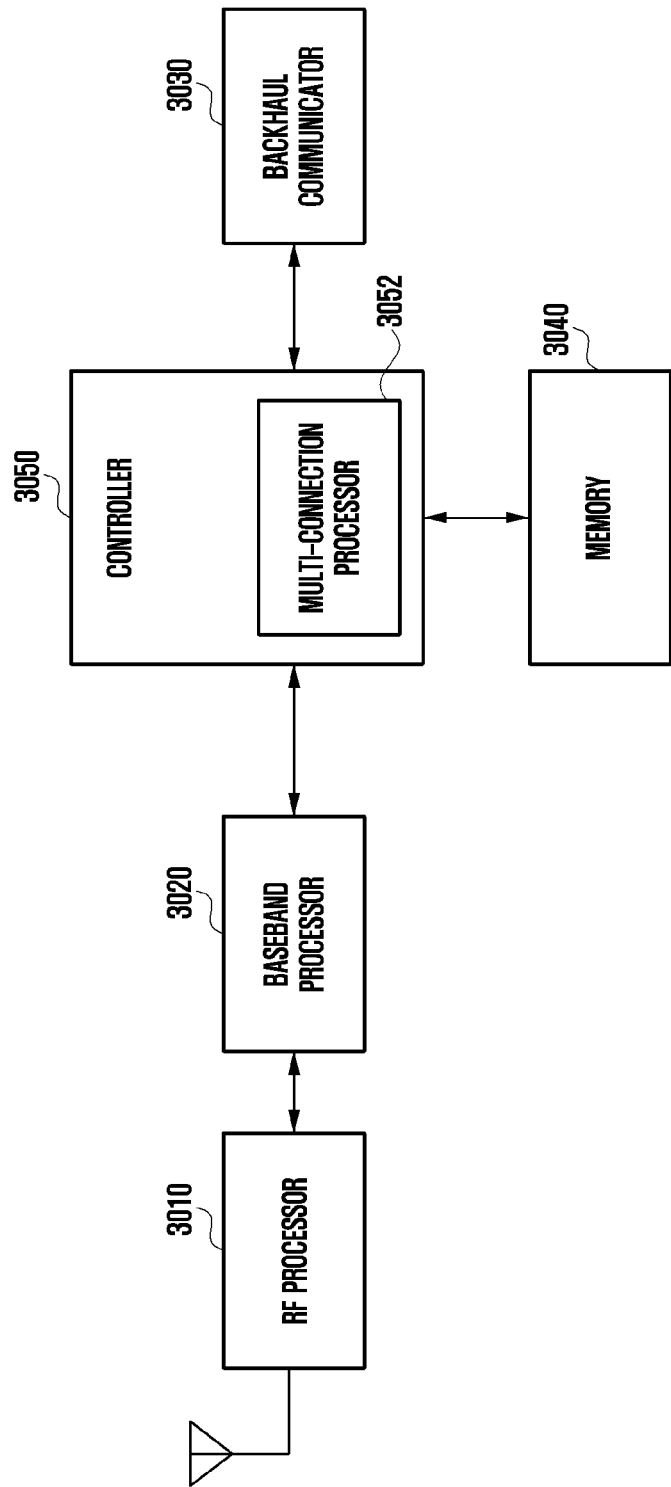
FIG. 30 is a block diagram illustrating a configuration of the NR gNB according to the disclosure.

FIG. 30 is a block diagram illustrating a configuration of the NR gNB according to the disclosure.

As illustrated in FIG. 30, the eNB includes an RF processor 3010, a baseband processor 3020, a backhaul communicator 3030, a memory 3040, and a controller 3050.

The RF processor 3010 performs a function for transmitting and receiving a signal through a radio channel, such as band conversion and amplification of a signal. That is, the RF processor 3010 up-converts a baseband signal provided from the baseband processor 3020 into an RF band signal, transmits the RF band signal through an antenna, and then down-converts the RF band signal received through the antenna into a baseband signal. For example, the RF processor 3010 may include a transmission filter, a reception filter, an amplifier, a mixer, an oscillator, a DAC, and an ADC. Although FIG. 30 illustrates only one antenna, the NR gNB may include a plurality of antennas. In addition, the RF processor 3010 may include a plurality of RF chains. Moreover, the RF processor 3010 may perform beamforming. For the beamforming, the RF processor 3010 may control a phase and a size of each of the signals transmitted and received through a plurality of antennas or antenna elements. The RF processor may perform a downlink MIMO operation by transmitting one or more layers.

The baseband processor 3020 performs a function of performing conversion between a baseband signal and a bitstream according to a physical layer standard of the first radio access technology. For example, in data transmission, the baseband processor 3020 generates complex symbols by encoding and modulating a transmission bitstream. In data reception, the baseband processor 3020 reconstructs a reception bit string through the demodulation and decoding of a baseband signal provided from the RF processor 3010. For example, in an OFDM scheme, when data is transmitted, the baseband processor 3020 generates complex symbols by encoding and modulating a transmission bitstream, maps the complex symbols to subcarriers, and then configures OFDM symbols through an IFFT operation and CP insertion. Further, when data is received, the baseband processor 3020 divides the baseband signal provided from the RF processor 3010 in the unit of OFDM symbols, reconstructs the signals mapped to the subcarriers through a FFT operation, and then reconstructs the reception bitstream through demodulation and decoding. The baseband processor 3020 and the RF processor 3010 transmit and receive signals as described above. Accordingly, the baseband processor 3020 or the RF processor 3010 may be referred to as a transmitter, a receiver, a transceiver, a communicator, or a wireless communicator.

The backhaul communicator 3030 provides an interface for communicating with other nodes within the network. That is, the backhaul communicator 3030 converts a bitstream transmitted from the NR gNB to another node, for example, a secondary gNB or a core network into a physical signal and converts the physical signal received from the other node into the bitstream.

The memory 3040 stores data such as a basic program, an application, and setting information for the operation of the NR gNB. Particularly, the memory 3040 may store information on bearers allocated to the accessed UE and the measurement result reported from the accessed UE. Further, the memory 3040 may store information which is a reference for determining whether to provide multiple connections to the UE or stop the multiple connections. In addition, the memory 3040 provides data stored therein according to a request from the controller 3050.

The controller 3050 controls the overall operation of the main NR gNB. For example, the controller 3050 may transmit and receive a signal through the baseband processor 3020 and the RF processor 3010 or through the backhaul communicator 3030. In addition, the controller 3050 may record data in the memory 3040 and read the data. To this end, the controller 3050 may include at least one processor.

Embodiment 3

Figure 31:
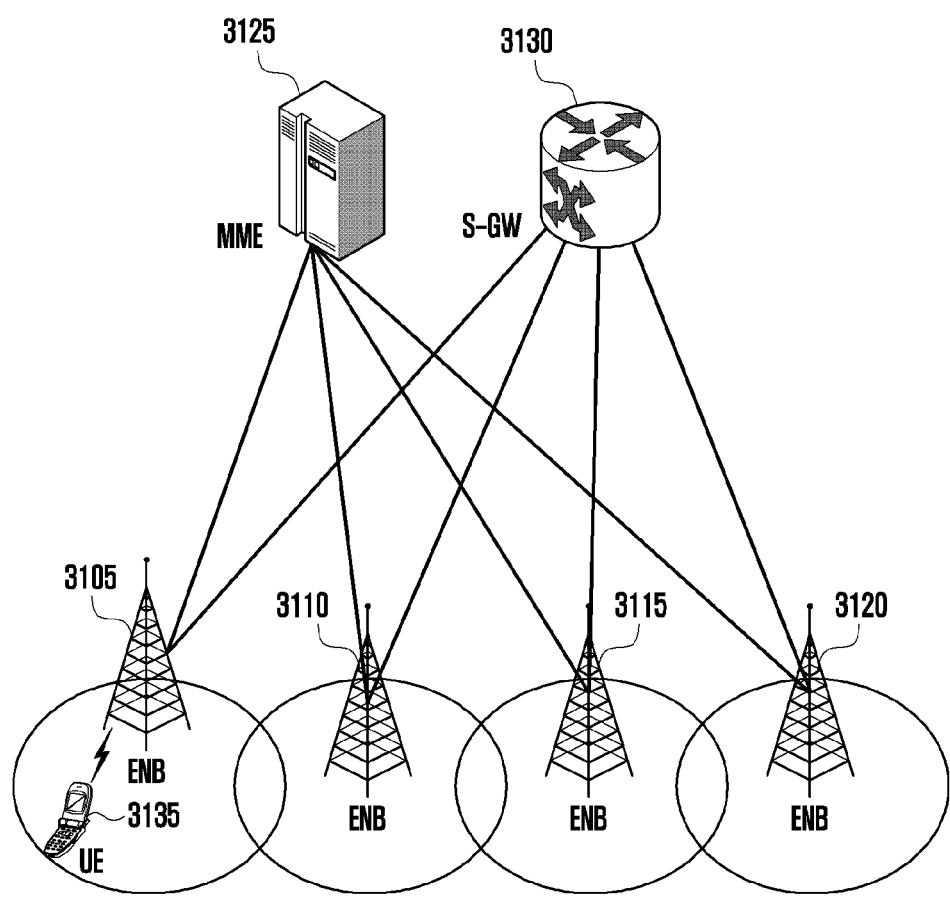
FIG. 31 illustrates a structure of an LTE system to which the disclosure can be applied.

FIG. 31 illustrates a structure of an LTE system to which the disclosure can be applied.

Referring to FIG. 31, a radio access network of the LTE system includes next-generation Evolved Node Bs 3105, 3110, 3115 and 3120 (hereinafter, referred to as ENBs, Node Bs, or base stations), an Mobility Management Entity (MME) 3125, and a Serving-Gateway (S-GW) 3130. A User Equipment 3135 (hereinafter, referred to as a UE or a terminal) accesses an external network through the ENBs 3105, 3110, 3115, and 3120 and the S-GW 3130.

The ENBs 3105, 3110, 3115, and 3120 in FIG. 31 correspond to the existing node Bs of the UMTS system. The ENB is connected to the UE 3135 through a radio channel, and performs a more complicated role than the conventional node B. In the LTE system, since all user traffic including a real-time service such as a voice over IP (VoIP) through an Internet protocol are serviced through a shared channel, a device for collecting and scheduling status information of buffer statuses, available transmission power statuses, and channel statuses of UEs is required, and the ENBs 3105, 3110, 3115, and 3120 serve as this device.

One ENB generally controls a plurality of cells. For example, in order to implement a transmission rate of 100 Mbps, OFDM is used for the radio access technology in a bandwidth of 20 MHz in the LTE system. Further, an adaptive modulation and coding scheme for determining a modulation scheme and a channel coding rate in accordance with a channel state of the UE is applied. The S-GW 3130 is a device for providing a data bearer, and generates or removes the data bearer under a control of the MME 3125. The MME is a device for performing various control functions as well as a function of managing mobility of the UE and is connected to a plurality of ENBs.

Figure 32:
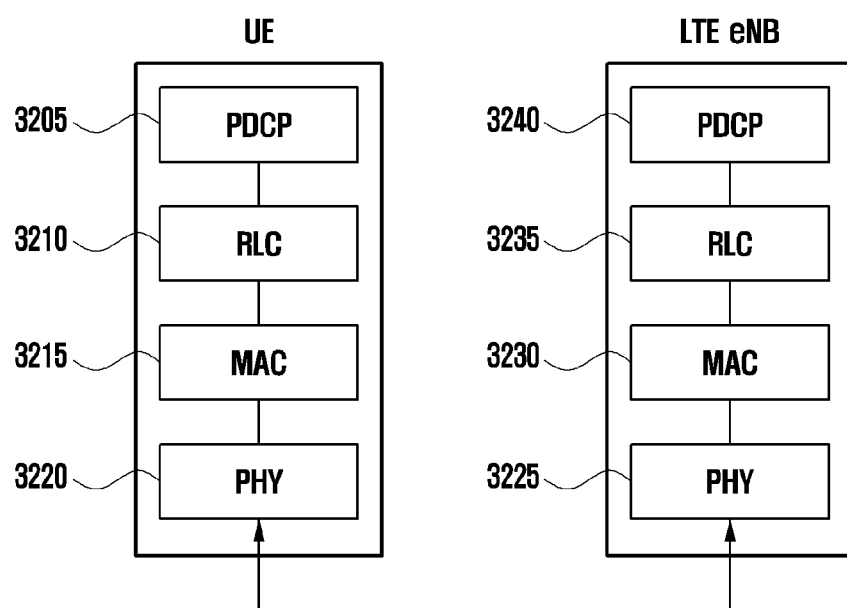
FIG. 32 illustrates a wireless protocol structure in the LTE system to which the disclosure can be applied.

FIG. 32 illustrates a wireless protocol structure in the LTE system to which the disclosure can be applied.

Referring to FIG. 32, the wireless protocol of the LTE system includes PDCPs 3205 and 3240, RLCs 3210 and 3235, and MACs 3215 and 3230 in the UE and the ENB, respectively. The PDCPs 3205 and 3240 perform an operation such as compressing/decompressing an IP header. Main functions of the PDCP are described below.

- Header compression and decompression function
  ((Header compression and decompression: ROHC only)
- User data transmission function (Transfer of user data)

Sequential delivery function (In-sequence delivery of upper layer PDUs at PDCP re-establishment procedure for RLC AM)

Reordering function (For split bearers in DC (only support for RLC AM): PDCP PDU routing for transmission and PDCP PDU reordering for reception)

Duplicate detection function (Duplicate detection of lower layer SDUs at PDCP re-establishment procedure for RLC AM)

Retransmission function (Retransmission of PDCP SDUs at handover and, for split bearers in DC, of PDCP PDUs at PDCP data-recovery procedure, for RLC AM)

Ciphering and deciphering function (Ciphering and deciphering)

Timer-based SDU removal function (Timer-based SDU discard in uplink)

The RLCs 3210 and 3235 reconfigure a PDCP PDU to be a proper size and perform ARQ operation. Main functions of the RLC are described below.

Data transmission function (Transfer of upper layer PDUs)

ARQ function (Error Correction through ARQ (only for AM data transfer))

Concatenation, segmentation, and reassembly function (Concatenation, segmentation, and reassembly of RLC SDUs (only for UM and AM data transfer))

Re-segmentation function (Re-segmentation of RLC data PDUs (only for AM data transfer))

Reordering function (Reordering of RLC data PDUs (only for UM and AM data transfer)

Duplication detection function (only for UM and AM data transfer))

Error detection function (Protocol error detection (only for AM data transfer))

RLC SDU deletion function (RLC SDU discard (only for UM and AM data transfer))

RLC re-establishment function (RLC re-establishment)

The MACs 3215 and 3230 are connected with various RLC layer entities configured in one UE, and perform a multiplexing of RLC PDUs to MAC PDU and a demultiplexing of the RLC PDUs from the MAC PDU. Main functions of the MAC are described below.

Mapping function (Mapping between logical channels and transport channels)

Multiplexing and demultiplexing function (Multiplexing/demultiplexing of MAC SDUs belonging to one or different logical channels into/from transport blocks (TB) delivered to/from the physical layer on transport channels)

Scheduling information report function (Scheduling information reporting)

HARQ function (Error correction through HARQ)

Logical channel priority control function (Priority handling between logical channels of one UE)

UE priority control function (Priority handling between UEs by means of dynamic scheduling)

MBMS service identification function (MBMS service identification)

Transport format selection function (Transport format selection)

Padding function (Padding)

The physical layers 3220 and 3225 perform an operation for channel-coding and modulating higher layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Figure 33:
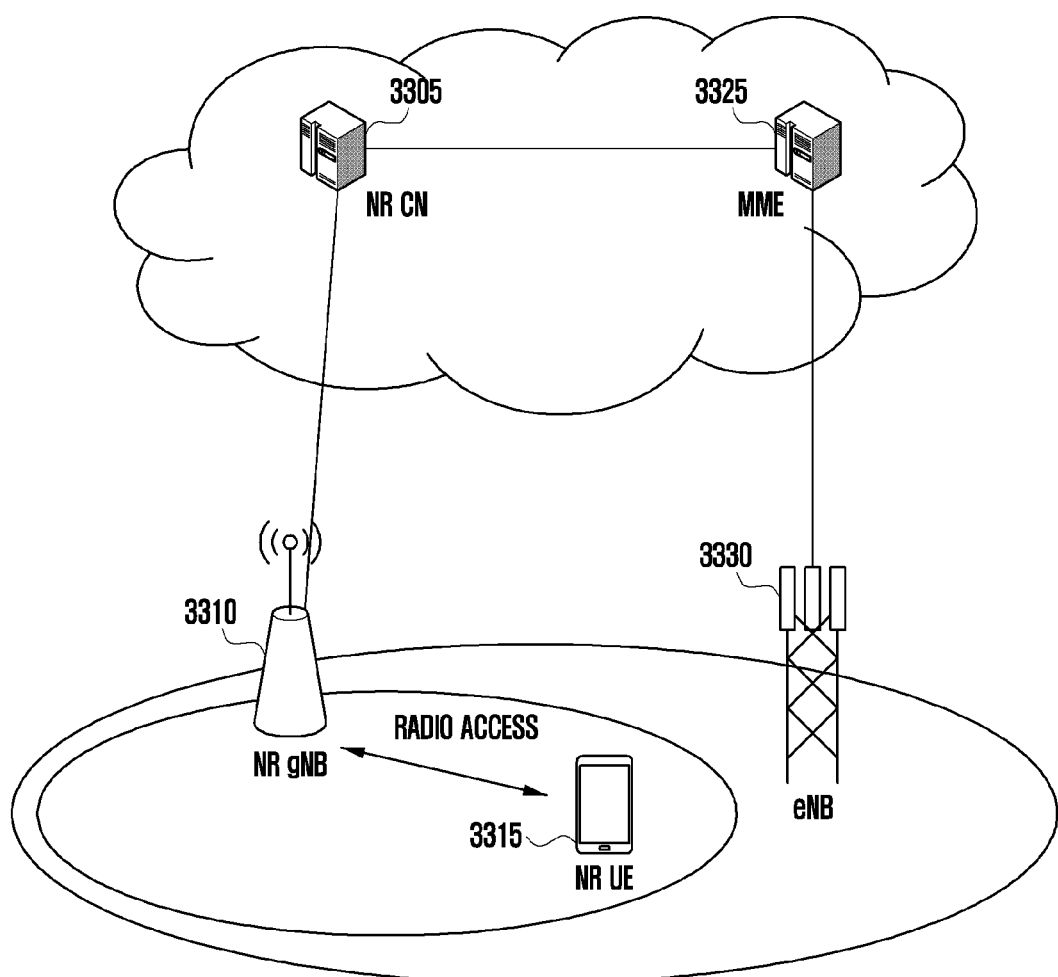
FIG. 33 illustrates a structure of a next-generation mobile communication system to which the disclosure can be applied.

FIG. 33 illustrates a structure of a next-generation mobile communication system to which the disclosure can be applied.

Referring to FIG. 33, a radio access network of the next-generation mobile communication system (hereinafter, referred to as NR or 5G) includes a next-generation base station 3310 (new radio node B, hereinafter, referred to as an NR gNB or an NR NB) and a new radio core network (NR CN) 3305. A user terminal 3315 (hereinafter, referred to as a new radio user equipment (NR UE) or a terminal) accesses an external network through the NR gNB 3310 and the NR CN 3305.

The NR gNB 3310 in FIG. 33 corresponds to an evolved Node B (eNB) in a conventional LTE system. The NR gNB may be connected to the NR UE 3315 through a radio channel and may provide better service than the conventional node B. Since all user traffic is serviced through a shared channel in the next-generation mobile communication system, a device for collecting and scheduling status information of buffer statuses, available transmission power statuses, and channel statuses of UEs is required, which corresponds to the NR NB 3310.

One NR gNB generally controls a plurality of cells. The NR system may have a bandwidth wider than or equal to the conventional maximum bandwidth in order to implement a super-high data transmission compared to the conventional LTE system and a beamforming technology may be additionally grafted thereon through the radio access technology as an OFDM scheme. Further, an adaptive modulation and coding scheme for determining a modulation scheme and a channel coding rate in accordance with a channel state of the UE is applied.

The NR CN 3305 performs a function of supporting mobility, configuring a bearer, and configuring QoS. The NR CN is a device which performs not only a function of managing mobility of the UE but also various control functions and is connected to a plurality of eNBs. Further, the next-generation mobile communication system may be linked to the conventional LTE system, and the NR CN is connected to an MME 3325 through a network interface. The MME is connected to an eNB 3330, which is a conventional base station.

Figure 34:
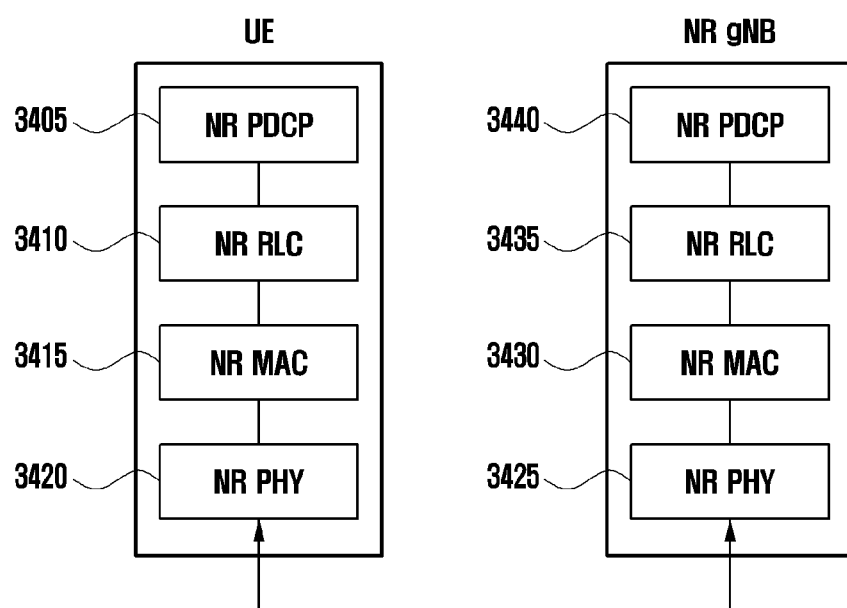
FIG. 34 illustrates a wireless protocol structure of the next-generation mobile communication system to which the disclosure can be applied.

FIG. 34 illustrates a wireless protocol structure of the next-generation mobile communication system to which the disclosure can be applied.

Referring to FIG. 34, the UE and the NR gNB include NR PDCPs 3405 and 3440, NR RLCs 3410 and 3435, and NR MACs 3415 and 3430, respectively, in the wireless protocol of the next-generation mobile communication system. The main functions of the NR PDCPs 3405 and 3440 may include some of the following functions.

Header compression and decompression function ((Header compression and decompression: ROHC only)

User data transmission function (Transfer of user data)

Sequential delivery function (In-sequence delivery of upper layer PDUs)

Non-sequential delivery function (Out-of-sequence delivery of upper layer PDUs)

Reordering function (PDCP PDU reordering for reception)

Duplicate detection function (Duplicate detection of lower layer SDUs)

Retransmission function (Retransmission of PDCP SDUs)

Ciphering and deciphering function (Ciphering and deciphering)

Timer-based SDU removal function (Timer-based SDU discard in uplink)

The reordering function of the NR PDCP device is a function of sequentially reordering PDCP PDUs received by a lower layer on the basis of a PDCP sequence number (SN), and may include a function of sequentially transferring the reordered data to a higher layer, a function of directly transmitting the recorded data, a function of recording PDCP PDUs lost due to the reordering, a function of reporting statuses of the lost PDCP PDUs to a transmitting side, and a function of making a request for retransmitting the lost PDCP PDUs.

The main functions of the NR RLCs 3410 and 3435 may include some of the following functions.

Data transmission function (Transfer of upper layer PDUs)

Sequential delivery function (In-sequence delivery of upper layer PDUs)

Non-sequential delivery function (Out-of-sequence delivery of upper layer PDUs)

ARQ function (Error correction through ARQ)

Concatenation, segmentation, and reassembly function (Concatenation, segmentation, and reassembly of RLC SDUs)

Re-segmentation function (Re-segmentation of RLC data PDUs)

Reordering function (Reordering of RLC data PDUs)

Duplicate detection function (Duplicate detection)

Error detection function (Protocol error detection)

RLC SDU deletion function (RLC SDU discard)

RLC re-establishment function (RLC re-establishment)

The sequential delivery function (In-sequence delivery) of the NR RLC device is a function of sequentially transferring PDCP PDUs received from a lower layer to a higher layer, and may include, when one original RLC SDU is divided into a plurality of RLC SDUs and then received, a function of reassembling and transmitting the RLC SDUs, a function of reordering the received RLC PDUs on the basis of an RLC sequence number (SN) or a PDCP SN, a function of recording PDCP PDUs lost due to the reordering, a function of reporting statuses of the lost PDCP PDUs to a transmitting side, a function of making a request for retransmitting the lost PDCP PDUs, if there is a lost RLC SDU, a function of sequentially transferring only RLC SDUs preceding the lost RLC SDU to the higher layer, if a predetermined timer expires even though there is a lost RLC SDU, a function of sequentially transferring all RLC SDUs received before the timer starts to the higher layer, or if a predetermined timer expires even though there is a lost RLC SDU, a function of sequentially transferring all RLC SDUs received up to that point in time to the higher layer. Further, the NR RLC device may process the RLC PDUs sequentially in a reception order thereof (according to an arrival order regardless of a serial number or an SN) and may transfer the RLC PDUs to the PDCP device regardless of the sequence thereof (out-of-sequence delivery). If the RLC SDU is a segment, the NR RLC device may receive segments which are stored in the buffer or will be received in the future, reconfigure the segments to be one complete RLC PDU, process the RLC PDU, and then transmit the same to the PDCP device. The NR RLC layer may not include a concatenation function, and the function may be performed by the NR MAC layer, or may be replaced with a multiplexing function of the NR MAC layer.

The non-sequential function (Out-of-sequence delivery) of the NR RLC device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MACs 3415 and 3430 may be connected to a plurality of NR RLC layer entities configured in one UE and main functions of the NR MAC may include some of the following functions.

Mapping function (Mapping between logical channels and transport channels)

Multiplexing and demultiplexing function (Multiplexing/demultiplexing of MAC SDUs)

Scheduling information report function (scheduling information reporting)

HARQ function (Error correction through HARQ)

Logical channel priority control function (Priority handling between logical channels of one UE)

UE priority control function (Priority handling between UEs by means of dynamic scheduling)

MBMS service identification function (MBMS service identification)

Transport format selection function (Transport format selection)

Padding function (Padding)

The NR PHY layers 3420 and 3425 perform an operation for channel-coding and modulating higher layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

In the disclosure, the states of the UE which the gNB configures in the UE for each Secondary cell (Scell) are defined as an activated state, a deactivated state, and a dormant state, and operations of the UE for supporting a bandwidth part (BWP) in each state will be described. Particularly, the disclosure may propose a BWP configuration method of allowing the UE supporting the BWP in the dormant state of the UE for each SCell to transmit a sounding reference signal (SRS) or to measure a channel state information-reference signal (CSI-RS) and report the measurement result to the eNB, so that the eNB may rapidly configure carrier aggregation (CA) or dual connectivity (DC).

Further, the disclosure proposes a new timer and a transition method between three states for each SCell based on the timer. The eNB may allow the UE to autonomously control the UE state for each SCell configured in the UE on the basis of the proposed timer, thereby managing the SCell without any additional signaling. Accordingly, the eNB may rapidly serve a larger amount of data to the UE with smaller signaling overhead and lower transmission delay through CA or DC by applying the method proposed by the disclosure.

The proposed methods may be very useful for rapidly configuring CA or DC in the UE in an environment in which small cells are deployed in a macro cell.

Figure 35:
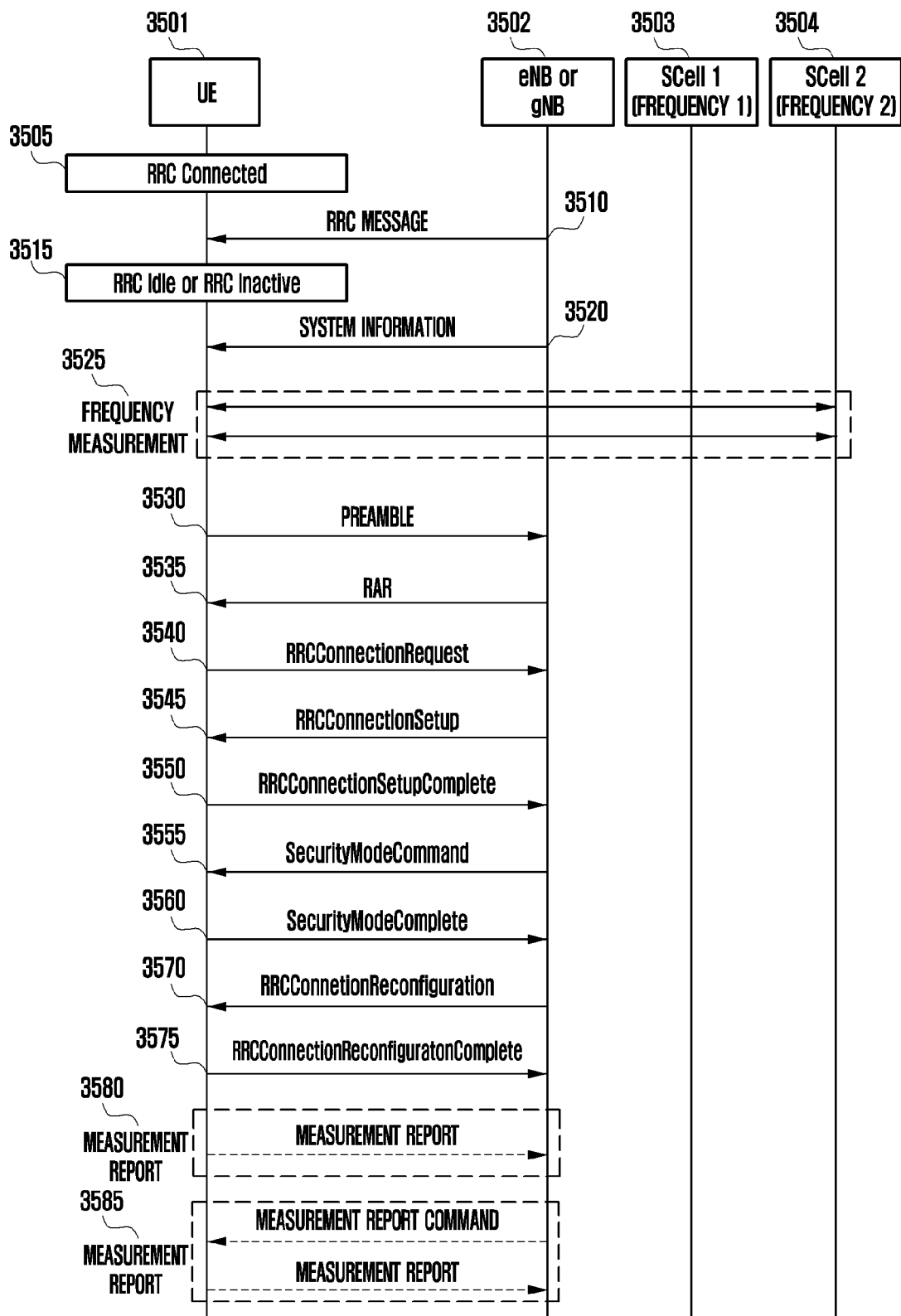
FIG. 35 illustrates a method of reporting frequency measurement configuration information and a measurement result and a method of configuring a BWP of the UE proposed by the disclosure.

FIG. 35 illustrates a method of reporting frequency measurement configuration information and a measurement result and a method of configuring a BWP by the UE according to a configuration of the state of the UE for each frequency (for example, SCell) proposed by the disclosure.

In FIG. 35, if a UE 3501, which transmits and receives data in an RRC-connected mode, has no data transmission/reception for a predetermined or for a predetermined time, an eNB or a gNB 3502 may transmit an RRC message (for example, an RRC Connection Release message, an RRC Connection Suspend message, or a new RRC message (for example, ToInactive)) to the UE in step 3510 and switches the UE to an RRC-idle mode or an RRC-inactive mode in step 3515.

That is, when the UE in the RRC-connected mode transitions to the RRC-idle mode or the RRC-inactive mode, the network may transmit the RRC message to indicate the mode switching in step 3510. When the UE transitions to the RRC-idle mode or the RRC-inactive mode through the RRC message in step 3510, the eNB or gNB may insert an indicator into the RRC message and indicate whether the UE stores and maintains or discards configuration information of SCells or SCell state information (active state, dormant state, or inactive state) in the RRC-idle mode or the RRC-inactive mode. Accordingly, if mobility of the UE is not large, the configuration information may be directly reused.

Further, the RRC message 3510 may include at least one piece of the following information.

1. Information on a frequency corresponding to a target to be measured, information on a frequency for each cell (information on cells or frequencies belonging to one eNB since CA can be supported only for a plurality of cells or frequencies belonging to one eNB), frequency band information, a frequency identifier (cell identifier), a measurement value to be measured (reference signal received power (RSRP), reference signal received quality (RSRQ), or reference signal-signal to interference and noise ratio (RS-SINR)), an identifier of a target to be measured (measurement object), a measurement ID, or a report configuration ID 2. Information on an area in which the UE should perform frequency measurement in the RRC-idle mode or the RRC-inactive mode (for example, default area information used when there is no tracking area (TA), cell list, RNA (RAN notification area), or area information), a physical cell ID, or an eNB ID through which an area or a frequency on which the UE should perform frequency measurement may be indicated 3. A physical cell ID or an eNB ID through which the UE can distinguish different cells or eNBs for the same frequency band in frequency measurement That is, the UE may perform frequency measurement only on a frequency or a cell corresponding to the configured physical cell ID or eNB ID.

4. An indicator indicating whether or not to perform frequency measurement in the RRC-idle mode or the RRC-inactive mod or whether to perform frequency measurement on the basis of frequency configuration information configured through the RRC message or on the basis of frequency configuration information received through system information 5. Information including a method of measuring a value of a frequency and the value of the frequency to be measured when frequency measurement is performed in the RRC-idle mode or the RRC-inactive mode For example, the RRC message may include configuration information indicating to measure one or a plurality of RSRP, RSRQ, and RS-SINR.

6. A maximum number of frequencies (carriers) that can be measured when frequency measurement is performed in an RRC-idle mode or an RRC-inactive mode 7. Information for configuring a time to perform frequency measurement only for a predetermined time in order to save a battery of the UE For example, it is possible to save the battery of the UE by setting a timer value to perform frequency measurement only when the timer is driven and to stop the frequency measurement when the timer expires. That is, time information for performing frequency measurement when frequency measurement is performed in the RRC-idle mode or the RRC-inactive mode may be included.

8. A first time, a second time, the number of times, a threshold value, or a period. The values may be configured and the following frequency measurement method may be indicated. Frequency measurement may be performed on the basis of the values, and a time stamp may also be reported when measurement is reported in order to indicate how long ago measurement was performed, or indicate whether measurement has been performed recently.

A. If a state in which an intensity of a signal of a frequency (for example, RSRP, RSRQ, or RS-SINR) is larger than a given (preset or predetermined) threshold value is maintained for a predetermined time (the threshold value and the time may be configured in the UE through the RRC message or may be broadcasted through system information). If a period is given, the UE may perform measurement in every corresponding period.

B. If a state in which an intensity of a signal of a frequency (for example, RSRP, RSRQ, or RS-SINR) is larger than a predetermined threshold value is measured a predetermined number of times or more (the threshold value and the number of times may be configured in the UE through the RRC message or may be broadcasted through system information). If a period is given, the UE may perform measurement in every corresponding period.

C. If a state in which an intensity of a signal of a frequency (for example, RSRP, RSRQ, or RS-SINR) is larger than a predetermined threshold value within a predetermined time is measured a predetermined number of times or more (the threshold value and the number of times may be configured in the UE through the RRC message or may be broadcasted through system information). If a period is given, the UE may perform measurement in every corresponding period.

D. If a state in which an intensity of a signal of a frequency (for example, RSRP, RSRQ, or RS-SINR) is larger than a predetermined threshold value within a given first time (for example, when a timer is driven) is maintained for a second time (the threshold value and the number of times may be configured in the UE through the RRC message or may be broadcasted through system information). If a period is given, the UE may perform measurement in every corresponding period.

E. If a state in which an intensity of a signal of a frequency (for example, RSRP, RSRQ, or RS-SINR) is larger than a predetermined threshold value within a predetermined first time (for example, while a timer is driven) is measured a predetermined number of times (the threshold value, the first time, and the number of times may be configured in the UE through the RRC message or may be broadcasted through system information) and a period is given, the UE may perform measurement in every corresponding period.

Further, the eNB may insert a new indicator in the RRC message of step 3510 to indicate, to the UE, whether or not the UE performs frequency measurement in the RRC-idle mode or the RRC-inactive mode, whether the UE receives frequency measurement configuration information according to system information and performs frequency measurement, or whether the UE performs frequency measurement on the basis of frequency measurement configuration information configured through the RRC message.

When the UE is instructed to transition to the RRC-inactive mode through the RRC message of step 3510, a security key (for example, NCC) to be used for resume may be pre-allocated. In the future, the UE may cipher frequency result information measured in the RRC-inactive mode through the security key and report the same to the eNB. By pre-allocating the security key as described above, it is possible to enhance security when the UE performs re-access and reduce a signaling overhead due to a security configuration. Through the pre-configured security key, when transmitting message 3 (RRC message, for example, RRC Connection Resume Request), the UE may cipher and transmit the RRC message and decipher received deciphered message 4 (RRC message, for example, RRC Connection Resume).

In order to make a configuration for a plurality of SCells at a time in the RRC message 3510, a common configuration parameter may be introduced and used or a configuration parameter for each SCell may be introduced and used. If the common configuration parameters and the configuration parameter for each SCell are configured, the configuration for each SCell may be prioritized compared to the common configuration parameter.

For example, a group identifier may be defined, and a mapping relationship between the group identifier and each SCell identifier may be defined. That is, the definition is made such that one group identifier is mapped to all SCell identifiers, and common configuration information of all SCells may be indicated through one group identifier. Further, configuration information of cells may be configured in units of groups by defining a plurality of group identifiers and defining SCell identifier mapped to the group identifiers.

The RRC message may include mapping information with a bandwidth part identifier (BWP ID) indicating a BWP to be used by the SCell according to the SCell identifiers or timer (for example, SCellDormantTimer (used for transition from the activated state to the dormant state) or SCellDeactivationTimer (used for transition from the activated state to the dormant state)) information of time and frequency resources. Further, the RRC message may include BWP configuration information corresponding to each SCell. For example, one or a plurality of bandwidth parts may be configured in each SCell, and if an SCell state is an active state or a dormant state, one UL BWP, one DL BWP, one (UL and DL) BWP (which may be understood as a UL and DL BWP or a pair of UL and DL BWPs), or one UL or DL BWP (which may be understood as at least one of UL or DL BWPs or at least one of pairs of UL and DL BWPs) may be activated and the remaining UL and DL BWPs or (UL and DL) BWPs may be deactivated. Particularly, in the dormant state, one UL/DL BWP may be configured as a specific BWP.

The UE receiving the RRC message of step 3510 transitions to the RRC-idle mode or the RRC-inactive mode according to an indication of the RRC message in step 3515. The UE performs a cell reselection or cell selection procedure while moving in the RRC-idle mode or the RRC-inactive mode to search for a suitable cell and, if a cell on which the UE camps is found, acquires system information of the cell in step 3520. Information included in the RRC message of step 3510 or some of the information may be broadcasted through system information.

The UE may camp on any cell in the RRC-idle mode or the RRC-inactive mode and acquire information on a frequency on which frequency measurement is performed, a priority of the frequency, and timer information from system information of the corresponding cell (for example, SIB5 in the LTE system, SIB1, SIB2, SIB3, SIB4, or SIB5 in the next-generation mobile communication system). As described above, the network may broadcast the frequency measurement configuration information through the system information, but it may be more effective to configure the frequency measurement configuration information in the UE through an RRC message rather than the method by which the network broadcasts the frequency measurement configuration information through the system information in the cell. This is because the network is able to accurately know a UE capability in the RRC-connected mode and thus configure more suitable frequency measurement configuration information.

The UE in the RRC-idle mode or the RRC-inactive mode may perform frequency measurement according to frequency measurement information configured through the RRC message of step 3510 or frequency measurement information configured through system information of step 3520 in step 3525.

In the future, the UE which does not currently configure the connection, that is, the UE in the RRC-idle mode or the RRC-inactive mode performs an RRC connection establishment process with the eNB when data to be transmitted is generated. The UE establishes backward transmission synchronization with the eNB through a random access process (specifically, the UE transmits a preamble to the eNB and the eNB transmits a random access response (RAR) to the UE in response to the preamble) in steps 3530 and 3535, and transmits an RRCConnectionRequest message to the eNB in step 3540. The message includes a reason (establishment-Cause) to establish the connection with an identifier of the UE. The eNB transmits an RRCConnectionSetup message to allow the UE to establish the RRC connection in step 3545. The message includes RRC connection configuration information. The RRC connection is also referred to as a signaling radio bearer (SRB), and is used for transmitting and receiving an RRC message which is a control message between the UE and the eNB. The UE establishing the RRC connection transmits an RRCConnectionSetupComplete message to the eNB in S3550.

The RRCConnetionSetupComplete message may include a control message corresponding to a service request by which the UE makes a request for establishing a bearer for a predetermined service to the MME. The eNB transmits the SERVICE REQUEST message included in the RRCConnetionSetupComplete message to the MME, and the MME determines whether to provide the service requested by the UE. If it is determined to provide the service requested by the UE on the basis of the determination result, the MME transmits an INITIAL CONTEXT SETUP REQUEST message to the eNB. The message includes QoS information to be applied to a DRB configuration and security-related information to be applied to the DRB (for example, a security key and a security algorithm). The eNB exchanges a SecurityModeCommand message and a SecurityModeComplete message with the UE in steps 3555 and 3560 in order to completely set security.

If security has been completely set in steps 3555 and 3560, the eNB transmits an RRCConnectionReconfiguration message to the UE in step 3570. The message includes configuration information of the DRB for processing user data, and the UE configures the DRB by applying the information and transmits an RRCConnectionReconfigurationComplete message to the eNB in S3575.

A common configuration parameter may be introduced and used for the RRC message (RRC Connection Reconfiguration) of step 3570 in order to make a configuration for many SCells at a time, and a configuration parameter for each of the SCells may be introduced and used. If the common configuration parameters and the configuration parameter for each SCell are configured, the configuration for each SCell may be prioritized compared to the common configuration parameter. For example, a group identifier may be defined, and a mapping relationship between the group identifier and each SCell identifier may be defined. That is, the definition is made such that one group identifier is mapped to all SCell identifiers, and common configuration information of all SCells may be indicated through one group identifier. Further, configuration information of cells may be configured in units of groups by defining a plurality of group identifiers and defining SCell identifier mapped to the group identifiers.

The RRC message may include mapping information with a bandwidth part ID indicating a bandwidth part to be used by the SCell according to the SCell identifiers or timer (for example, SCellDormantTimer or SCellDeactivationTimer) information of time and frequency resources. Further, the RRC message may include BWP configuration information corresponding to each SCell. For example, one or a plurality of bandwidth parts may be configured in each SCell, and if an SCell state is an active state or a dormant state, one UL BWP, one DL BWP, one (DL and UL) BWP, or one UL or DL BWP may be activated and the remaining UL and DL BWPs or (UL and DL) BWPs may be deactivated. Particularly, in the dormant state, one UL/DL BWP may be configured as a specific BWP.

When the Scells are configured in the RRC message, an initial state may be configured as an activated state, a dormant state, or a deactivated state. If the Scells are configured to have an initial state corresponding to an activated state or a dormant state when configuration information of the Scells is transmitted, the UE may directly perform and report frequency measurement for the Scells, thereby supporting rapid application of the CA technology by the eNB.

If the SCells are configured to have an initial state corresponding to an activated state or a dormant state, the UE may transmit an SRS to the eNB and thus support rapid application of carrier aggregation technology by the eNB or the UE. The state transition of the activated state, the dormant state, or the deactivated state of each SCell may be indicated to the UE in the RRC-connected mode by MAC control information (MAC control element), and if the SCell is in the activated state or the dormant state, the UE in the RRC-connected mode performs frequency measurement, reports the frequency measurement result to the eNB, or transmits an SRS to the eNB.

The frequency measurement report may be transmitted through an RRC message or MAC control information. If the state of the UE for each SCell is configured as the activated state through the RRC message, the RRC message may include an integer indicating where PDCCH monitoring starts, where a report on frequency (channel or cell) measurement result starts, or where a sounding reference signal is transmitted. For example, the PDCCH monitoring or the report on the frequency measurement result may start after a time unit corresponding to the indicated integer (for example, subframes, time slots, or TTIs).

If the state of the UE for each SCell is configured as the dormant state through the RRC message, the RRC message may include an integer indicating when a report on the frequency (channel or cell) measurement starts or when an SRS is transmitted. For example, the measurement result report or the SRS transmission may start after a time unit corresponding to the indicated integer (for example, subframes, time slots, or TTIs).

If the initial state of the SCells is configured through the RRC message, the eNB may define an indicator included in the RRC message to rapidly apply frequency aggregation technology, and configure the initial state of each SCell as the activated state or the dormant state. If the rapid frequency aggregation technology is not necessary, the eNB may configure the initial state of each SCell as the deactivated state.

If a timer value is configured in the RRC message and has expired, the UE may be configured to automatically switch the state of the SCell from the activated state to the dormant state (the timer may be an SCellDormantTimer), from the dormant state to the deactivated state (the timer may be an SCellDorDeactivationTimer), from the activated state to the deactivated state (the timer may be an SCellDeactivationTimer), or from the deactivated state to the dormant state (the timer may be an SCellDeactDormantTimer), thereby saving a battery and reducing a signaling overhead. The configuration of the SCells may be performed when the initial configuration is performed, when a handover is performed, or when the eNB transmits an RRC message to the UE in the RRC-connected mode. Further, the eNB may be configured to activate one UL or DL BWP or deactivate the remaining BWPs when the state of the SCell of the UE in the RRC-connected mode is the activated state or the dormant state.

The eNB completely establishing the DRB with the UE transmits an INITIAL CONTEXT SETUP COMPLETE message to the MME, and the MME receiving the message exchanges an S1 BEARER SETUP message and an S1 BEARER SETUP RESPONSE message in order to establish an S1 bearer with the S-GW. The S1 bearer is a connection for data transmission established between the S-GW and the gNB and corresponds to the DRB in one-to-one correspondence. If the processor is completed, the UE transmits and receives data through the eNB and the S-GW. Further, the eNB may transmit an RRC Connection Reconfiguration message in order to provide new configuration to the UE or add or change the configuration for a predetermined reason.

The UE receiving the configuration of frequency measurement configuration information may perform frequency measurement according to the state of the UE for each SCell (activated state, dormant state, or deactivated state). The UE may report frequency measurement results that satisfy a predetermined condition to the eNB. When the UE reports the frequency measurement result, if there is a valid frequency measurement result, the UE may report the same to the eNB through an RRC message or MAC control information immediately or periodically in step 3580. In another method, the UE may report the frequency measurement result only when the eNB makes a request for frequency measurement information in step 3585. In another method, if the UE transmits an indicator indicating that there is a valid frequency measurement result to the eNB, the eNB may make a request for the frequency measurement result to the UE as necessary and receive the frequency measurement result.

For the SCell configured as the activated state, the UE monitors a PDCCH to monitor a signal of the eNB on the basis of the active BWP and performs CSI-RS radio resource management (RRM), or synchronization signal block (SSB) measurement according to the RRC configuration. If discontinuous reception (DRX) is configured, the UE performs CSI-RS, RRM, or SSB measurement according to the DRX and reports the measurement result to the eNB. The frequency measurement result may be reported to the eNB by the UE or reported through defined MAC control information. The UE may transmit the SRS to the eNB periodically or aperiodically according to the RRC configuration.

For the SCell configured as the dormant state, the UE does not perform PDCCH monitoring for monitoring an indication of the network in order to save a battery and performs CSI-RS or RRM measurement according to the RRC configuration on the basis of the active BWP. If the DRX is configured, the UE performs CSI-RS, RRM, or SSB measurement according to the DRX and reports the measurement result to the eNB. Further, the UE may perform CSI-RS or SSB measurement according to a CSI-RS or SSB period and a configured offset, and report the measurement result to the eNB. The frequency measurement result may be reported to the eNB by the UE or reported through defined MAC control information. The UE may transmit the SRS to the eNB periodically or aperiodically according to the RRC configuration.

For the Scell configured as the deactivated state, the UE may not monitor the signal of the eNB, that is, not monitor the PDCCH, performs frequency measurement (RRM measurement), and does not report the measurement result to the eNB. In the deactivated state, the frequency measurement report may be transmitted according to an SCell measurement report period configured through RRC.

In the disclosure, a cell and a carrier may indicate the same meaning. The SCell refers to a secondary cell, and corresponds to an additional carrier or cell capable of transmitting and receiving data, other than a primary cell (PCell) for transmitting and receiving a control signal to and from the eNB when carrier aggregation technology is used.

The frequency measurement procedure in the RRC-idle mode or the RRC-inactive mode proposed by the disclosure and the frequency configuration information may be expanded to be applied to the UE in the RRC-connected mode.

The frequency measurement procedure in the RRC-idle mode or the RRC-inactive mode proposed by the disclosure and the frequency configuration information may be applied and performed independently from the frequency measurement procedure performed when the UE in the RRC-idle mode or the RRC-inactive mode performs a cell reselection procedure. Accordingly, there may be a maximum number of frequencies that can be measured according to a UE capability, and thus configuration information of the proposed frequency measurement method should be set in consideration thereof.

Figure 36:
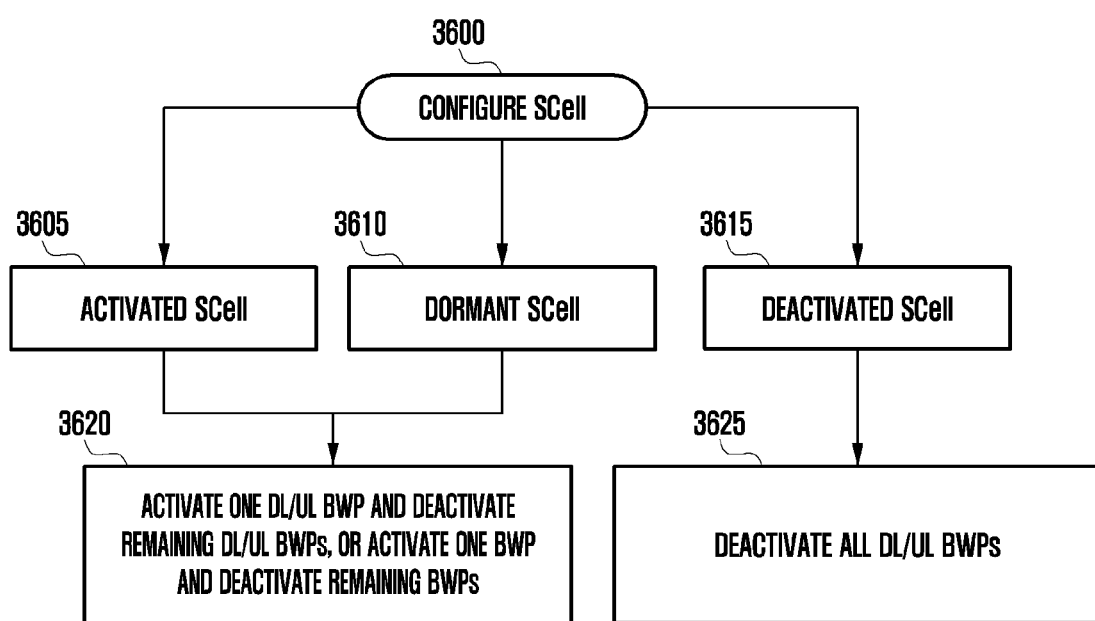
FIG. 36 illustrates a BWP configuration method according to a state of an SCell configured in the UE.

FIG. 36 illustrates a BWP configuration method according to a state of an SCell configured in the UE.

The eNB may configure an SCell in the UE in the RRC-connected mode through an RRC message of step 3570 in step 3600. At this time, a plurality of BWPs may be configured per SCell, and one BWP may be specified and configured as a special (or default) BWP. One BWP may be one UL BWP, one DL BWP, one (UL and DL) BWP, or one UL or DL BWP. When configuring the SCell, the eNB may configure an initial state as an activated state in step 3605, a dormant state in step 3610, or a deactivated state in step 3615. If the state of the SCell configured in the UE is the activated state or the dormant state in step 3605 or 3610, the eNB may activate one UL BWP, one DL BWP, one (UL and DL) BWP, or one UL or DL BWP and deactivate the remaining UL or DL BWPs or the remaining BWPs in step 3620. If the state of the SCell configured in the UE is the deactivated state, all DL or UL BWPs may be configured to be deactivated in step 3625.

The active BWP operation or inactive BWP operation of the UE according to the state of the SCell configured in the UE is described below. While the inactive BWP operation of the UE may be applied in common regardless of the state of the SCell configured in the UE, the active BWP operation of the UE may be separately applied to the cases in which the state of the SCell configured in the UE is the activated state and the dormant state.

Figure 37:
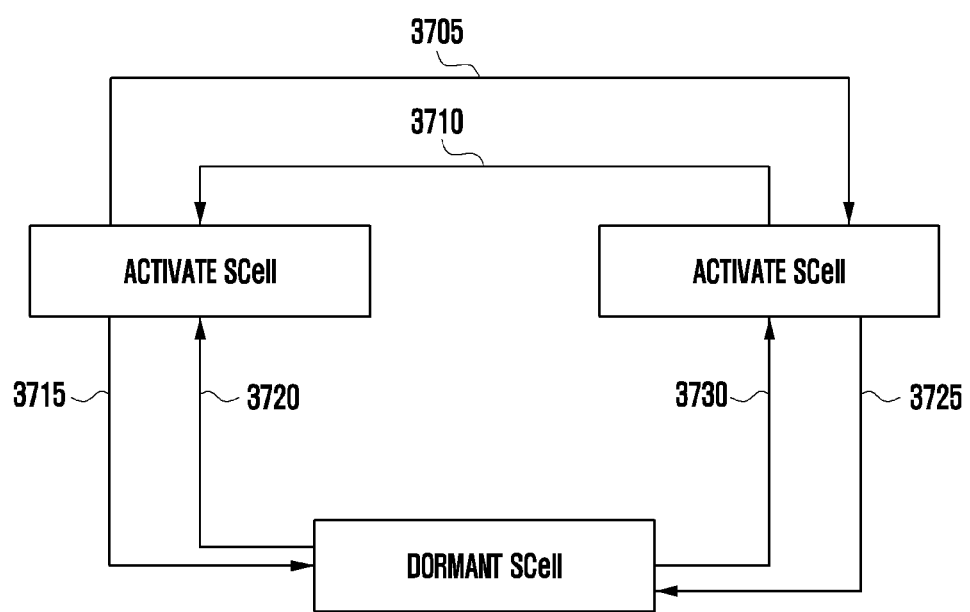
FIG. 37 illustrates a BWP switching operation when the state of the SCell configured in the UE transitions.

First operation (active BWP for each activated SCell)
  perform transmission on UL-SCH;
    perform transmission on RACH;
    monitor PDCCH;
    transmit SRS;
    receive DL-SCH;
    (Re)initialize any suspended configured uplink grants of configured grant Type 1 according to the stored configuration, if any, and to start in the symbol according to rules in subclause 5.8.2 [3GPP TS 38.321])
    measure CSI-RS
Second operation (inactive BWP for activated, deactivated, or dormant SCell)
  do not perform transmission on UL-SCH;
  do not perform transmission on RACH;
  do not perform PDCCH monitoring;
  do not transmit PUCCH
  do not transmit SRS
  do not receive DL-SCH;
  clear any configured downlink assignment and configured uplink grant of configured grant Type 2 upon transition to inactive BWP
  suspend any configured uplink grant of configured grant Type 1
  do not measure CSI-RS
Third operation (active BWP for dormant SCell)
  transmit SRS
  measure CSI-RS and report measurement result FIG. 37 illustrates a BWP switching operation when the state of the SCell configured in the UE transitions.

In step 3705, when the state of the SCell configured in the UE transitions from the activated state to the deactivated state through a MAC CE, a configured timer (for example, SCellDeactivationTimer), or the RRC message of step 3510 or 3570, the BWP switching operation of the UE is described below.
  switch active BWP to inactive BWP
  maintain inactive BWP In step 3710, when the state of the SCell configured in the UE transitions from the deactivated state to the activated state through a MAC CE or the RRC message of step 3510 or 3e70, the BWP switching operation of the UE is described below.
  switch predetermined special (or default) BWP to active BWP
  maintain remaining BWPs in inactive state In step 3715, when the state of the SCell configured in the UE transitions from the activated state to the dormant state through a MAC CE, a configured timer (for example, SCellDormantTimer), or the RRC message of step 3510 or 3570, the BWP switching operation of the UE is described below.
  maintain active BWP
  maintain inactive BWP In step 3715, the active BWP may be maintained, but a predetermined special (or default) BWP may be switched to an active BWP and the conventional active BWP may be switched to an inactive BWP.

In step 3720, when the state of the SCell configured in the UE transitions from the dormant state to the activated state through a MAC CE, a configured timer (for example, SCellDorActivatedTimer), or the RRC message of step 3510 or 3570, the BWP switching operation of the UE is described below.

maintain active BWP
    maintain inactive BWP

In step 3725, when the state of the SCell configured in the UE transitions from the deactivated state to the dormant state through a MAC CE, a configured timer (for example, SCellDeactDormantTimer), or the RRC message of step 3510 or 3570, the BWP switching operation of the UE is described below.

switch predetermined special (or default) BWP to active BWP
    maintain inactive BWP In step 3730, when the state of the SCell configured in the UE transitions from the dormant state to the deactivated state through a MAC CE, a configured timer (for example, SCellDorDeactivatedTimer), or the RRC message of step 3510 or 3570, the BWP switching operation of the UE is described below.

switch active BWP to inactive BWP
    maintain inactive BWP

The above steps do not have to sequentially occur, and when the state of the SCell configured in the UE transitions through the MAC CE, the configured timer, or the RRC message of step 3510 or 3570, the BWP switching operation of the UE is performed in accordance with the transitioned SCell state.

Figure 38:
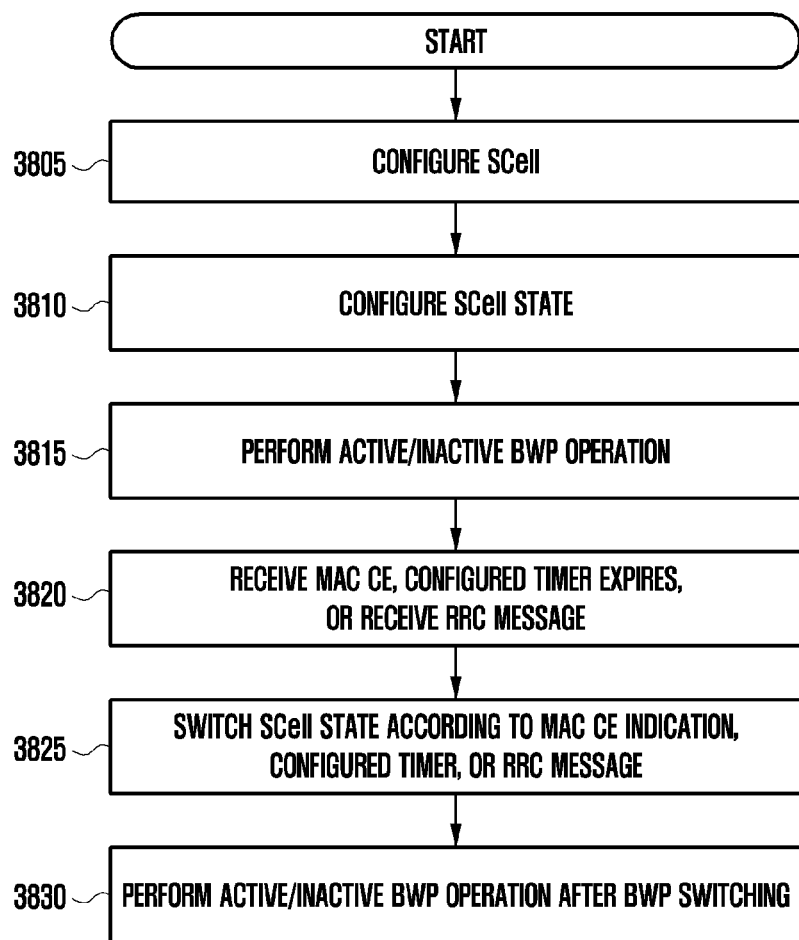
FIG. 38 illustrates the operation of the UE for supporting a BWP according to the state of the SCell configured in the UE or when the state of the SCell configured in the UE transitions.

FIG. 38 illustrates the operation of the UE for supporting a BWP according to the state of the SCell configured in the UE or when the state of the SCell configured in the UE transitions.

The UE in the RRC-connected mode may receive a configuration of the SCell from the eNB in step 3805 and, at this time, receive a configuration of a plurality of BWPs per SCell. One BWP may be specified in advance as a special (or default) BWP. In step 3810, the eNB may configure the state of the SCell in the UE, which may be performed simultaneously with step 3805. In step 3815, the UE performs the active or inactive BWP operation according to the configured SCell state, and a relevant operation is described below.

transmit and receive data through active BWP of activated SCell
      apply first operation to active BWP of activated SCell
      transmit SRS to eNB through active BWP of dormant SCell or measure CSI-RS and report measurement result to eNB
      apply third operation to active BWP of dormant SCell
    apply second operation to inactive BWP of activated, dormant, or deactivated SCell In step 3820, when the MAC CE is received, the configured timer expires, or the RRC message is received (RRC message of step 3510 or 3570 in FIG. 35), the state of the SCell configured in the UE may transition in step 3825. When the SCell state transitions, the UE performs the above-described BWP switching operation in accordance with the transitioned SCell state and then performs the active or inactive BWP operation in step 3830.

Figure 39:
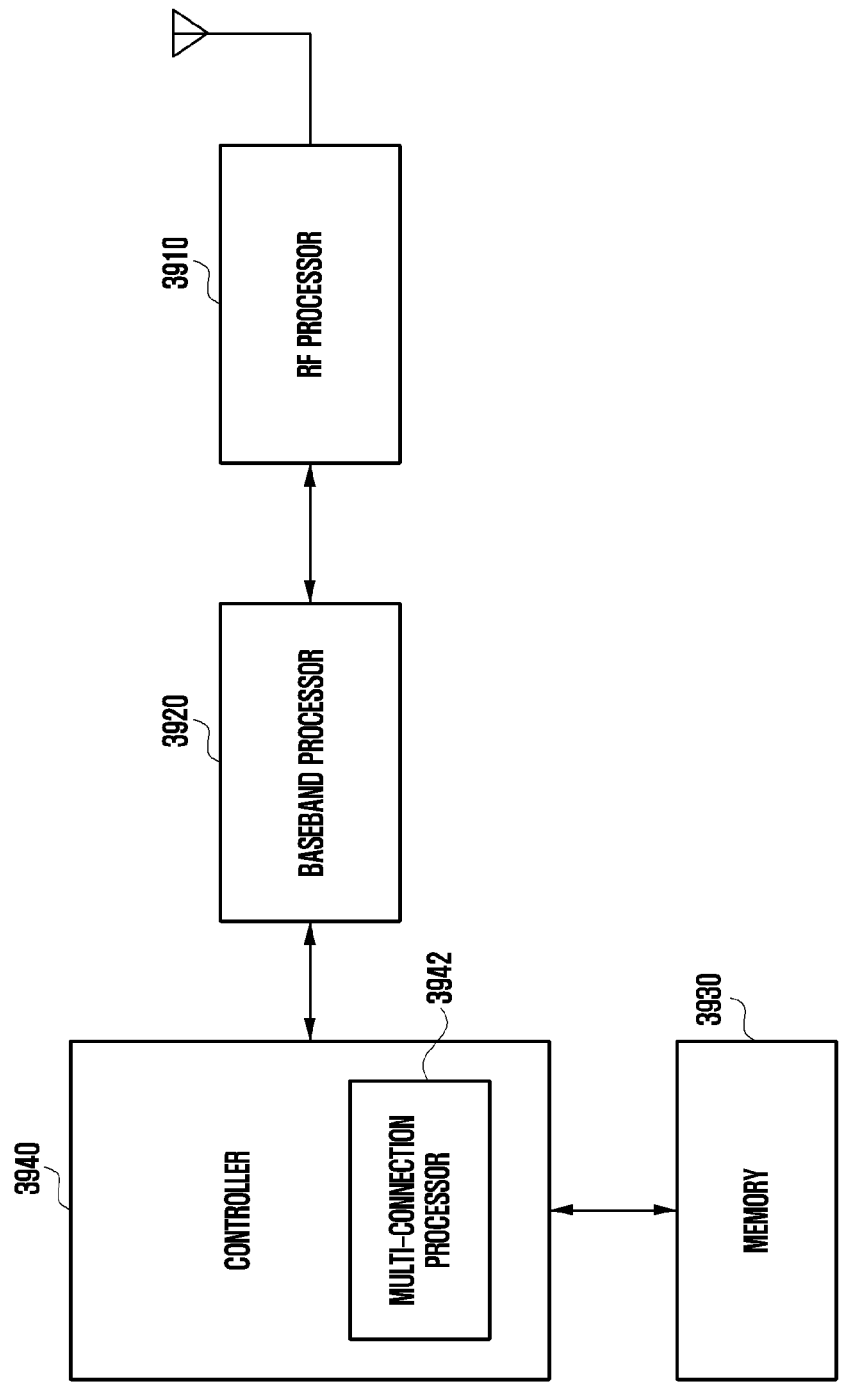
FIG. 39 illustrates a structure of the UE to which embodiments of the disclosure can be applied.

FIG. 39 illustrates a structure of the UE to which embodiments of the disclosure can be applied.

Referring to FIG. 39, the UE includes a radio frequency (RF) processor 3910, a baseband processor 3920, a memory 3930, and a controller 3940.

The RF processor 3910 performs a function for transmitting and receiving a signal through a radio channel, such as band conversion and amplification of a signal. That is, the RF processor 3910 up-converts a baseband signal provided from the baseband processor 3920 into an RF band signal, transmits the RF band signal through an antenna, and then down-converts the RF band signal received through the antenna into a baseband signal. For example, the RF processor 3910 may include a transmission filter, a reception filter, an amplifier, a mixer, an oscillator, a digital-to-analog converter (DAC), an analog-to-digital converter (ADC), and the like. Although FIG. 39 illustrates only one antenna, the UE may include a plurality of antennas. In addition, the RF processor 3910 may include a plurality of RF chains. Moreover, the RF processor 3910 may perform beamforming. For the beamforming, the RF processor 3910 may control a phase and a size of each of the signals transmitted/received through a plurality of antennas or antenna elements. The RF processor may perform MIMO and receive a plurality of layers when performing the MIMO operation. The RF processor 3910 may appropriately configure a plurality of antennas or antenna elements according to the control of the controller to perform reception beam sweeping or control a direction of a reception beam and a beam width so that the reception beam corresponds to a transmission beam.

The baseband processor 3920 performs a function for a conversion between a baseband signal and a bitstream according to a physical layer standard of the system. For example, in data transmission, the baseband processor 3920 generates complex symbols by encoding and modulating a transmission bitstream. In data reception, the baseband processor 3920 recovers a reception bit string through the demodulation and decoding of a baseband signal provided from the RF processor 3910. For example, in an OFDM scheme, when data is transmitted, the baseband processor 3920 generates complex symbols by encoding and modulating a transmission bitstream, maps the complex symbols to subcarriers, and then configures OFDM symbols through an IFFT operation and CP insertion. Further, when data is received, the baseband processor 3920 divides the baseband signal provided from the RF processor 3910 in units of OFDM symbols, reconstructs the signals mapped to the subcarriers through a FFT operation, and then reconstructs the reception bitstream through demodulation and decoding.

The baseband processor 3920 and the RF processor 3910 transmit and receive signals as described above. Accordingly, the baseband processor 3920 or the RF processor 3910 may be referred to as a transmission unit, a reception unit, a transmission/reception unit, or a communicator. At least one of the baseband processor 3920 and the RF processor 3910 may include a plurality of communication modules in order to support a plurality of different radio access technologies. In addition, at least one of the baseband processor 3920 and the RF processor 3910 may include different communication modules to process signals of different frequency bands. For example, the different radio access technologies may include an LTE network and an NR network. Further, the different frequency bands may include a super-high-frequency (SHF) (for example, 2.5 GHz and 5 GHz) band and a millimeter (mm)-wave (for example, 60 GHz) band.

The memory 3930 stores data such as a basic program, an application program, and setting information for the operation of the UE. The memory 3930 provides the stored data according to a request from the controller 3940.

The controller 3940 controls the overall operation of the UE. For example, the controller 3940 transmits and receives a signal through the baseband processor 3920 and the RF processor 3910. In addition, the controller 3940 may record data in the memory 3940 and read the data. To this end, the controller 3940 may include at least one processor. For example, the controller 3940 may include a communication processor (CP) that performs a control for communication, and an application processor (AP) that controls a higher layer such as an application.

Figure 40:
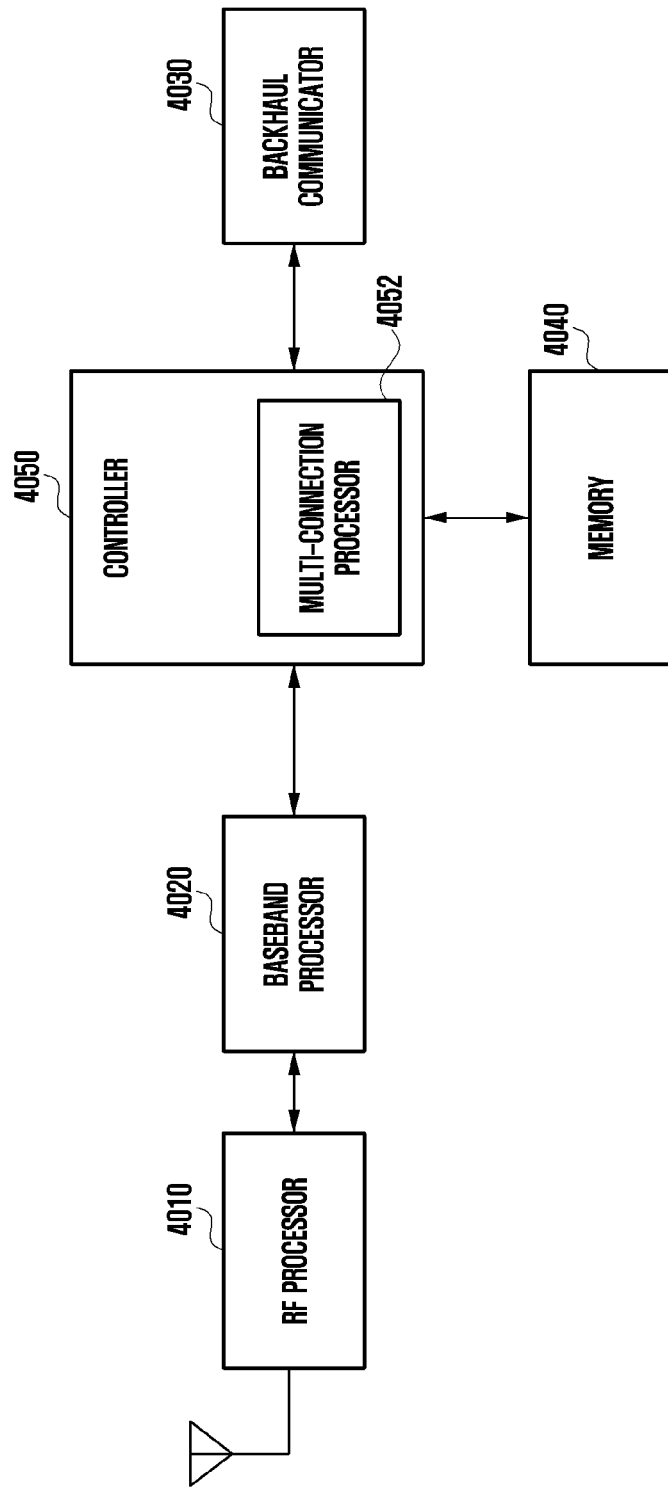
FIG. 40 illustrates a configuration of the eNB in a wireless communication system to which an embodiment of the disclosure can be applied.

FIG. 40 illustrates a configuration of a transmission and reception point (TRP) (interchangeable with the eNB) in a wireless communication system to which an embodiment of the disclosure can be applied.

As illustrated in FIG. 40, the eNB includes an RF processor 4010, a baseband processor 4020, a backhaul communicator 4030, a memory 4040, and a controller 4050.

The RF processor 4010 performs a function for transmitting and receiving a signal through a radio channel, such as band conversion and amplification of a signal. That is, the RF processor 4010 up-converts a baseband signal provided from the baseband processor 4020 into an RF band signal, transmits the RF band signal through an antenna, and then down-converts the RF band signal received through the antenna into a baseband signal. For example, the RF processor 4010 may include a transmission filter, a reception filter, an amplifier, a mixer, an oscillator, a DAC, and an ADC. Although FIG. 40 illustrates only one antenna, the eNB may include a plurality of antennas. In addition, the RF processor 4010 may include a plurality of RF chains. Moreover, the RF processor 4010 may perform beamforming. For the beamforming, the RF processor 4010 may control a phase and a size of each of the signals transmitted and received through a plurality of antennas or antenna elements. The RF processor may perform a downlink MIMO operation by transmitting one or more layers.

The baseband processor 4020 performs a function of performing conversion between a baseband signal and a bitstream according to a physical layer standard of the radio access technology. For example, in data transmission, the baseband processor 4020 generates complex symbols by encoding and modulating a transmission bitstream. In data reception, the baseband processor 4020 reconstructs a reception bit string through the demodulation and decoding of a baseband signal provided from the RF processor 4010. For example, in an OFDM scheme, when data is transmitted, the baseband processor 4020 generates complex symbols by encoding and modulating a transmission bitstream, maps the complex symbols to subcarriers, and then configures OFDM symbols through an IFFT operation and CP insertion. Further, when data is received, the baseband processor 4020 divides the baseband signal provided from the RF processor 4010 in units of OFDM symbols, reconstructs the signals mapped to the subcarriers through a FFT operation, and then reconstructs the reception bitstream through demodulation and decoding. The baseband processor 4020 and the RF processor 4010 transmit and receive signals as described above. Accordingly, the baseband processor 4020 or the RF processor 4010 may be referred to as a transmitter, a receiver, a transceiver, a communicator, or a wireless communicator.

The backhaul communicator 4030 provides an interface for communicating with other nodes within the network.

The memory 4040 stores data such as a basic program, an application, and setting information for the operation of the server. Particularly, the memory 4040 may store information on bearers allocated to the accessed UE and the measurement result reported from the accessed UE. Further, the memory 4040 may store information which is a reference for determining whether to provide multiple connections to the UE or stop the multiple connections. In addition, the memory 4040 provides data stored therein according to a request from the controller 4050.

The controller 4050 controls the overall operation of the main eNB. For example, the controller 4050 may transmit and receive a signal through the baseband processor 4020 and the RF processor 4010 or through the backhaul communicator 4030. In addition, the controller 4050 may record data in the memory 4040 and read the data. To this end, the controller 4050 may include at least one processor.

What is claimed is:

1. A method performed by a transmitter in a wireless communication system, the method comprising:
   identifying whether a packet data convergence protocol (PDCP) service data unit (SDU) corresponds to a service data access protocol (SDAP) control protocol data unit (PDU) or an SDAP data PDU;
   when the PDCP SDU corresponds to the SDAP control PDU:
      when an integrity protection is configured, calculating a message authentication code-integrity (MAC-I) based on the SDAP control PDU; and
      concatenating the MAC-I, the SDAP control PDU, and a PDCP header to obtain a PDCP PDU, wherein a ciphering is not applied to the SDAP control PDU, and a header compression is not performed for the SDAP control PDU; and
   when the PDCP SDU corresponds to the SDAP data PDU:
      when the header compression is configured, performing the header compression for the PDCP SDU;
      when the integrity protection is configured, calculating the MAC-I based on the PDCP SDU and concatenating the MAC-I and the SDAP data PDU;
      performing the ciphering except for an SDAP header; and
      concatenating the PDCP header to obtain the PDCP PDU; and
   delivering, to a lower layer, the PDCP PDU.

2. The method of claim 1, further comprising:
   identifying a PDCP configuration and an SDAP configuration,
   wherein the PDCP configuration includes a configuration on the integrity protection and a configuration on the header compression, and the SDAP configuration includes a configuration on the SDAP header and mapping information associated with a QoS flow.

3. The method of claim 1, wherein the identification is based on at least one of a size of the PDCP SDU or information indicating a format of an SDAP PDU.

4. The method of claim 1, wherein the SDAP control PDU includes information indicating a format of an SDAP PDU and a QoS flow ID (QFI), and
   wherein the SDAP control PDU has a size of 1 byte.

5. The method of claim 1, wherein the SDAP control PDU is generated when a configured mapping relationship between a QoS flow and a data radio bearer (DRB) is different from a stored mapping relationship between a QoS flow and a DRB.

6. A method performed by a receiver in a wireless communication system, the method comprising:

identifying whether a packet includes a service data access protocol (SDAP) control protocol data unit (PDU) or an SDAP data PDU;
when the packet includes the SDAP control PDU:
removing a packet data convergence protocol (PDCP) header from the packet;
calculating a computed message authentication code-integrity (X-MAC) based on the SDAP control PDU; and
when the X-MAC corresponds to a message authentication code-integrity (MAC-I) included in the packet, identifying that an integrity protection is successful, wherein a deciphering is not applied to the SDAP control PDU and a header decompression is not performed; and
when the packet includes the SDAP data PDU:
removing the PDCP header from the packet;
performing the deciphering except for an SDAP header;
when a header compression is configured, performing the header decompression for the packet;
calculating the X-MAC based on the SDAP data PDU; and
when the X-MAC corresponds to the MAC-I included in the packet, identifying that the integrity protection is successful.

7. The method of claim 6, further comprising:
transmitting a PDCP configuration and an SDAP configuration,
wherein the PDCP configuration includes a configuration on the integrity protection and a configuration on the header compression, and the SDAP configuration includes a configuration on the SDAP header and mapping information associated with a QoS flow.

8. The method of claim 6, wherein the identification is based on at least one of a size of the packet or information indicating a format of an SDAP PDU.

9. The method of claim 6, wherein the SDAP control PDU includes information indicating a format of an SDAP PDU and a QoS flow ID (QFI), and
wherein the SDAP control PDU has a size of 1 byte.

10. The method of claim 6, wherein the SDAP control PDU is generated and received when a configured mapping relationship between a QoS flow and a data radio bearer (DRB) is different from a stored mapping relationship between a QoS flow and a DRB.

11. A transmitter in a wireless communication system, the transmitter comprising:
a transceiver; and
a controller coupled with the transceiver and configured to:
identify whether a packet data convergence protocol (PDCP) service data unit (SDU) corresponds to a service data access protocol (SDAP) control protocol data unit (PDU) or an SDAP data PDU,
when the PDCP SDU corresponds to the SDAP control PDU:
when an integrity protection is configured, calculate a message authentication code-integrity (MAC-I) based on the SDAP control PDU, and
concatenate the MAC-I, the SDAP control PDU, and a PDCP header to obtain a PDCP PDU, wherein a ciphering is not applied to the SDAP control PDU and a header compression is not performed for the SDAP control PDU,
when the PDCP SDU corresponds to the SDAP data PDU:
when the header compression is configured perform the header compression for the PDCP SDU,
when the integrity protection is configured, calculate the MAC-I based on the PDCP SDU and concatenate the MAC-I and the SDAP data PDU,
perform the ciphering except for an SDAP header, and
concatenate the PDCP header to obtain the PDCP PDU, and deliver, to a lower layer, the PDCP PDU.

12. The transmitter of claim 11, wherein the controller is further configured to identify a PDCP configuration and an SDAP configuration, and
wherein the PDCP configuration includes a configuration on the integrity protection and a configuration on the header compression, and the SDAP configuration includes a configuration on the SDAP header and mapping information associated with a QoS flow.

13. The transmitter of claim 11, wherein the identification is based on at least one of a size of the PDCP SDU or information indicating a format of an SDAP PDU.

14. The transmitter of claim 11, wherein the SDAP control PDU includes information indicating a format of an SDAP PDU and a QoS flow ID (QFI), and
wherein the SDAP control PDU has a size of 1 byte.

15. The transmitter of claim 11, wherein the SDAP control PDU is generated when a configured mapping relationship between a QoS flow and a data radio bearer (DRB) is different from a stored mapping relationship between a QoS flow and a DRB.

16. A receiver in a wireless communication system, the receiver comprising:
a transceiver; and
a controller coupled with the transceiver and configured to:
identify whether a packet includes a service data access protocol (SDAP) control protocol data unit (PDU) or an SDAP data PDU,
when the packet includes the SDAP control PDU:
remove a packet data convergence protocol (PDCP) header from the packet,
calculate a computed message authentication code-integrity (X-MAC) based on the SDAP control PDU, and
when the X-MAC corresponds to a message authentication code-integrity (MAC-I) included in the packet, identify that an integrity protection is successful, wherein a deciphering is not applied to the SDAP control PDU and a header decompression is not performed,
when the packet includes the SDAP data PDU:
remove the PDCP header from the packet,
perform the deciphering except for an SDAP header,
when a header compression is configured, perform the header decompression for the packet,
calculate the X-MAC based on the SDAP data PDU, and
when the X-MAC corresponds to the MAC-I included in the packet, identify that the integrity protection is successful.

17. The receiver of claim 16, wherein the controller is further configured to transmit a PDCP configuration and an SDAP configuration, and
wherein the PDCP configuration includes a configuration on the integrity protection and a configuration on the header compression, and the SDAP configuration includes a configuration on the SDAP header and mapping information associated with a QoS flow.

18. The receiver of claim 16, wherein the identification is based on at least one of a size of the packet or information indicating a format of an SDAP PDU.

19. The receiver of claim 16, wherein the SDAP control PDU includes information indicating a format of an SDAP PDU and a QoS flow ID (QFI), and wherein the SDAP control PDU has a size of 1 byte.

20. The receiver of claim 16, wherein the SDAP control PDU is generated and received when a configured mapping relationship between a QoS flow and a data radio bearer (DRB) is different from a stored mapping relationship between a QoS flow and a DRB.

\* \* \* \* \*